(12) United States Patent
Ishii et al.

(10) Patent No.: US 8,010,516 B2
(45) Date of Patent: Aug. 30, 2011

(54) CONTENT SHARING SYSTEM AND CONTENT IMPORTANCE LEVEL JUDGING METHOD

(75) Inventors: Shinya Ishii, Tokyo (JP); Yuichi Abe, Tokyo (JP); Yoshihiro Manabe, Tokyo (JP); Takao Shimada, Tokyo (JP); Norikazu Hiraki, Kanagawa (JP); Kenichiro Nakamura, Saitama (JP); Ryoichi Imaizumi, Tokyo (JP); Takashi Totsuka, Tokyo (JP)

(73) Assignee: Sony Corporation, Tokyo (JP)

( * ) Notice: Subject to any disclaimer, the term of this patent is extended or adjusted under 35 U.S.C. 154(b) by 303 days.

(21) Appl. No.: 11/134,149

(22) Filed: May 19, 2005

(65) Prior Publication Data

US 2005/0251411 A1   Nov. 10, 2005

(30) Foreign Application Priority Data

Jun. 3, 2004   (JP) ................ P2004-166242

(51) Int. Cl.
*G06F 7/00* (2006.01)
*G06F 17/30* (2006.01)
(52) U.S. Cl. ............ 707/705; 707/749; 709/207
(58) Field of Classification Search ...... 705/1; 707/102, 707/705, 749; 709/207
See application file for complete search history.

(56) References Cited

U.S. PATENT DOCUMENTS

| | | | | |
|---|---|---|---|---|
| 6,438,579 | B1* | 8/2002 | Hosken | 709/203 |
| 6,711,586 | B1* | 3/2004 | Wells | 707/104.1 |
| 2003/0008661 | A1* | 1/2003 | Joyce et al. | 455/456 |
| 2004/0030567 | A1* | 2/2004 | Takeshita et al. | 705/1 |
| 2004/0098462 | A1* | 5/2004 | Horvitz et al. | 709/207 |
| 2004/0143636 | A1* | 7/2004 | Horvitz et al. | 709/207 |
| 2004/0243422 | A1* | 12/2004 | Weber et al. | 705/1 |
| 2005/0038717 | A1* | 2/2005 | McQueen et al. | 705/27 |
| 2006/0041583 | A1* | 2/2006 | Horvitz | 707/102 |

(Continued)

FOREIGN PATENT DOCUMENTS

JP        06-332820        12/1994
(Continued)

OTHER PUBLICATIONS

Japanese Office Action for corresponding JP2004-166242 issued on Feb. 23, 2010.

(Continued)

*Primary Examiner* — Apu M Mofiz
*Assistant Examiner* — Jared M Bibbee
(74) *Attorney, Agent, or Firm* — K&L Gates LLP

(57) ABSTRACT

A content sharing system and content importance level judging method are provided.
The content sharing system provides an importance level of arbitrary content is individually judged with respect to users and a notice message valuable for a user is appropriately notified to a client or the outside tool. Further, an access user is able to set the disclosure level of access record of a user accessed the content.
In the content sharing system, an importance level of content of multimedia data on a server shared with clients of a plurality of users is judged, in which the importance level of the content with respect to each user is individually calculated by interpreting existing data or a user environment, the client condition is judged, a notice rule setting is changed in accordance with the client condition or an instruction from the client, and a notice message is issued to an appropriate address based on the calculated importance level and a notice rule of the content.

30 Claims, 48 Drawing Sheets

U.S. PATENT DOCUMENTS

2007/0255829 A1* 11/2007 Pecus et al. .................. 709/225

FOREIGN PATENT DOCUMENTS

| | | |
|---|---|---|
| JP | 09-081099 | 3/1997 |
| JP | 10-247201 | 9/1998 |
| JP | 2001-142899 | 5/2001 |
| JP | 2002-007293 | 1/2003 |
| JP | 2003-101644 | 4/2003 |
| JP | 2003-122676 | 4/2003 |
| JP | 2003-208386 | 7/2003 |
| JP | 2003-223403 | 8/2003 |
| JP | 2003527656 | 9/2003 |
| JP | 2004005500 | 1/2004 |
| JP | 2004-102913 | 4/2004 |
| JP | 2002152655 | 12/2010 |

OTHER PUBLICATIONS

Japanese Office Action issued on Sep. 7, 2010 for corresponding Japanese Appln. No. JP 2004-166242.

* cited by examiner

FIG. 10

| User ID | Content ID | Reply Address Content ID | Contribution day/Time |
|---|---|---|---|
| U003 | C053 | C142 | 2004/1/1 0:03 |
| U005 | C142 | Null | 2003/2/19 10:26 |
| ... | ... | ... | ... |
| U005 | C022 | Null | 2003/12/29 16:34 |

FIG. 11

| User ID | Content ID | Browsing day/Time |
|---|---|---|
| U004 | C053 | 2004/1/2 9:31 |
| U001 | C142 | 2003/1/10 19:29 |
| ... | ... | ... |
| U031 | C142 | 2005/2/14 15:31 |

FIG. 13A

| User ID | Name | Sex | Age |
|---|---|---|---|
| U023 | Taro | Male | 29 |
| U028 | Hanako | Female | 26 |
| ⋮ | ⋮ | ⋮ | ⋮ |
| U034 | Jiro | Male | 33 |

FIG. 13B

| Group ID | Group Name | User 1 | User 2 | ... | User X |
|---|---|---|---|---|---|
| G048 | Tenitenis | U023 | U033 | ... | U103 |
| G095 | Ski Heil | U011 | U026 | ... | – |
| ⋮ | | | | | ⋮ |
| G101 | Nonbee | U014 | U015 | ... | U057 |

FIG. 13C

| User ID | Subject | Interest Level |
|---|---|---|
| U007 | U012 | 85 |
| U014 | G014 | 40 |
| U014 | Susi | 100 |
| U014 | Ski | 90 |
| ⋮ | ⋮ | ⋮ |
| U024 | Eel | 80 |

FIG. 19

| User ID | Informaion ID | Type | Data 1 | Data 2 | Data 3 | Data 4 | Day:Start | Day:End |
|---|---|---|---|---|---|---|---|---|
| U023 | 1 | Address | Japan | Tokyo | Tama City | Nagayama | 1974/11/15 | 1995/03/31 |
|  | 3 | Address | Japan | Kanagawa | Yokohama kouhoku | Shinyokohama | 1995/04/01 | 1999/02/28 |
|  | 4 | Address | Japan | Tokyo | Toshima | Ikebukuro | 1999/03/01 | – |
|  | 8 | Academic Career | A University | Science and Eng. | Information Eng. | – | 1993/04/01 | 1997/03/31 |
|  | 10 | Hobby | A University | A Tennis Club | – | – | 1993/04/01 | 1997/03/31 |
|  | 11 | Business Experience | A Company | ABC Div. | D Dep. | – | 1997/04/01 | – |
| U028 | 1 | Address | Japan | Miyagi | Sendai Aoba | Aoba | 1977/12/02 | 1996/03/21 |
|  | 2 | Address | Japan | Tokyo | Shibuya | Ebisu | 1996/03/22 | – |
|  | 3 | Academic Career | B Woman's University | Faculty of Literature | French Literature | – | 1996/04/01 | 2000/03/31 |
|  | 4 | Hobby | A University | A Tennis Club | – | – | 1996/04/01 | 2000/03/31 |
|  | 5 | Business Experience | B Company | BB Div. | BB Dep. | – | 2000/04/01 | – |
| ... |  |  |  |  |  |  |  |  |

FIG. 23

| Contnet ID | Position Information | Data |
|---|---|---|
| C001 | N Latitude △△ Degree, East Longitude □□ Degree | Image A |
| C002 | N Latitude ●● Degree, East Longitude ■■ Degree | Image B |
| ... | ... | ... |

FIG. 24

| Contnet ID | Importance Level (Distance(Km)) | Data |
|---|---|---|
| C001 | 0.01 | Image A |
| C002 | 20 | Image B |
| ... | ... | ... |

FIG. 26

| Type | Content |
|---|---|
| Importance Level | 3 |
| Issue Date | 2004-04-05 23:12:04 |
| The Term of Validity | 2004-04-06 23:12:04 |
| Data Depending on Type | Content ID |
| | |

FIG. 28A

Mail::Notice Rule 1

| Notice Address | aaa@bbb.com |
|---|---|
| Active Condition | On |
| Type | Content, Group, User |
| Importance Level Threshold | 1 |
| Notice Interval | 60 Min. |

FIG. 28B

Mail::Notice Rule 2

| Notice Address | aaa@bbb.com |
|---|---|
| Active Condition | On |
| Type | Content |
| Importance Level Threshold | 5 |
| Notice Interval | 0 |

FIG. 27A

| Notice Address | Client A |
|---|---|
| Active Condition | On |
| Type | Content, Group, User |
| Importance Level Threshold | 1 |
| Notice Interval | 0 |

FIG. 27B

| Notice Address | Client B |
|---|---|
| Active Condition | Off |
| Type | Content |
| Importance Level Threshold | 3 |
| Notice Interval | 0 |

FIG. 27C

| Notice Address | aaa@bbb.com |
|---|---|
| Active Condition | Off |
| Type | Content |
| Importance Level Threshold | 5 |
| Notice Interval | 5 Min. |

| Content Container | Point |
|---|---|
| CS1 | 3 |
| CS2 | 1 |
| CS3 | 2 |

| Content | Point |
|---|---|
| C1 | 5 |
| C2 | 4 |

| User | Point |
|---|---|
| U1 | 2 |
| U2 | 5 |
| U3 | 1 |

| Content Container | Point | User |
|---|---|---|
| CS1 | 3 | U3 |
| CS2 | 1 | |
| CS3 | 2 | U1 |

| Content | Point | User |
|---|---|---|
| C1 | 2 | |
| C2 | 3 | U2 |

Contribution address:home room of senior B,'90

Title:on trip

113

115

Text:I went ○○ ** today

FIG. 44

| ID | User ID | Command | Receiving Date/Time | Access Source | Permission ID |
|---|---|---|---|---|---|
| 1 | 1001 | GET(1343) | 2003-12-01 10:31 | foo.example.com | 1 |
| 2 | 1002 | GET(1134) | 2003-12-22 11:50 | bar.example.com | 2 |
| 3 | 1002 | PUT | 2004-01-01 22:10 | bar.example.com | 3 |

FIG. 45

| ID | Access Level 0 | Access Level 1 | Access Level 2 | Access Level 3 |
|---|---|---|---|---|
| 1 | 1001,1003,1134 | 2321 | * | NULL |
| 2 | * | NULL | NULL | 1001 |
| 3 | 2001,1151 | 1023 | NULL | NULL |

FIG. 46

| ID | Name | Mail Address | Telephone |
|---|---|---|---|
| 1001 | Joe | joe@example.com | 03-1234-5678 |
| 1002 | Ken | ken@example.com | |
| 1003 | Jane | jane@example.com | |
| | | | |

FIG. 47

| ID | Group Name | Owner | Member |
|---|---|---|---|
| 2001 | Ski | 1001 | 1001, 1003, 1025 |
| 2002 | Project A | 1002, 1003 | 1001, 1002, 1003 |
| 2003 | Family | 1135 | 1035, 1135 |

FIG. 48

```
POST /cgi-bin/upload.cgi  HTTP/1.0
Content-type:multipart/form-data,boundary=AaB03x
Content-length:1024
X-Access-Level-0:1001,1003,1134
X-Access-Level-1:2321
X-Access-Level-2:*
X-Access-Level-3:NULL --AaB03x
content-disposition: form-data; name="upload_file"; filename="null.jpg"
Content-Type: image/jpeg xxxxxxxxxxxxxxxxxxxxxxxxxxxxxxxxxxxxxxxxxxxxxx
xxxxxxxxxxxxxxxxxxxxxxxxxxxxxxxxxxxxxxxxxxxxxx
xxxxxxxxxxxxxxxxxxxxxxxxxxxxxxxxxxxxxxxxxxxxxx
xxxxxxxxxxxxxxxxxxxxxxxxxxxxxxxxxxxxxxxxxxxxxx
xxxxxxxxxxxxxxxxxxxxxxxxxxxxxxxxxxxxxxxxxxxxxx --AaB03x
content-disposition:form-data; name="title"
hello world.
--AaB03x
content-disposition: form-data; name="body"
how are you?
--AaB03x--
content-disposition: form-data; name="metadata"
longitude=135.23.11, latitude=43.34.12
--AaB03x--
```

FIG. 49

```
POST /cgi-bin/upload.cgi HTTP/1.0
Content-type:multipart/form-data,boundary=AaB03x
Content-length:1024

--AaB03x
content-disposition: form-data; name="upload_file"; filename="foo.jpg"
Content-Type: image/jpeg xxxxxxxxxxxxxxxxxxxxxxxxxxxxxxxxxxxxxxxxxxxxxx
xxxxxxxxxxxxxxxxxxxxxxxxxxxxxxxxxxxxxxxxxxxxxx
xxxxxxxxxxxxxxxxxxxxxxxxxxxxxxxxxxxxxxxxxxxxxx
xxxxxxxxxxxxxxxxxxxxxxxxxxxxxxxxxxxxxxxxxxxxxx
xxxxxxxxxxxxxxxxxxxxxxxxxxxxxxxxxxxxxxxxxxxxxx --AaB03x
content-disposition:form-data; name="title"

hello world.
--AaB03x
content-disposition: form-data; name="body"

how are you?
--AaB03x
content-disposition: form-data; name="metadata"

longitude=135.23.11, latitude=43.34.12
--AaB03x
content-disposition: form-data; name="permission"

access_level_0=1001,1003,1134
access_level_1=2321
access_level_2=*
access_level_3=NULL
--AaB03x--
```

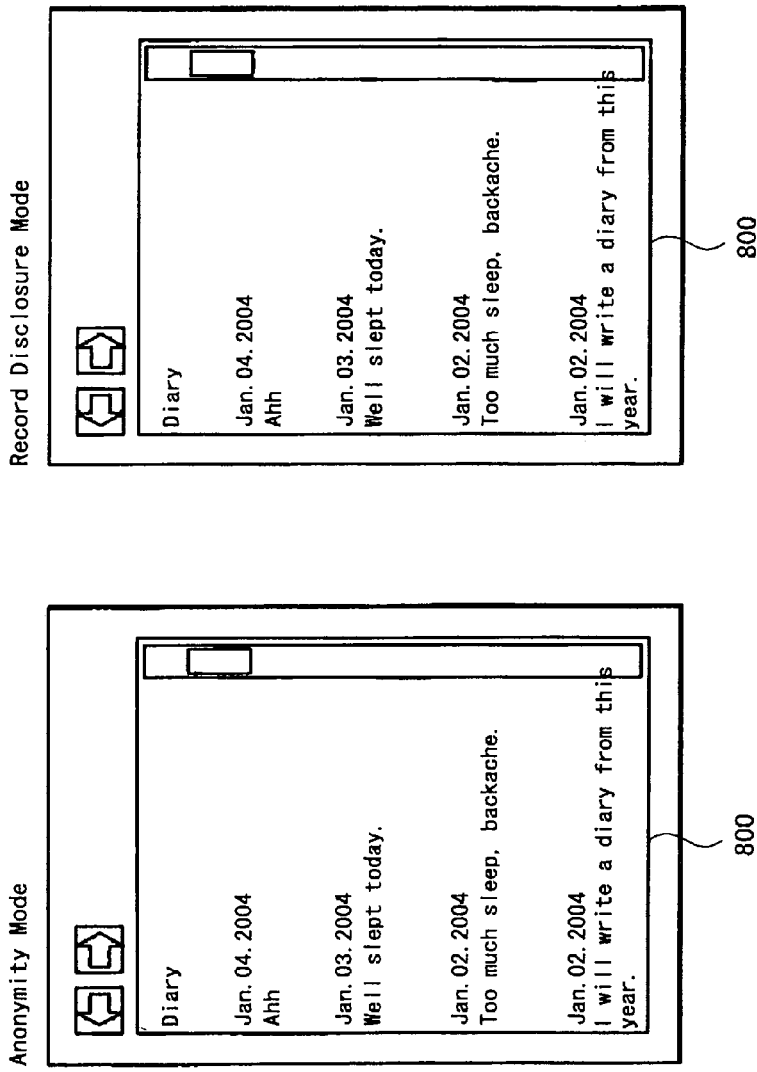

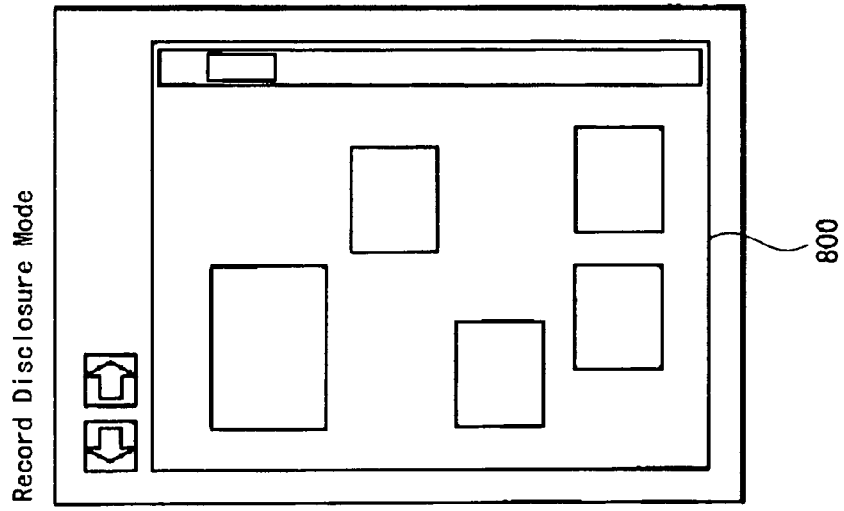
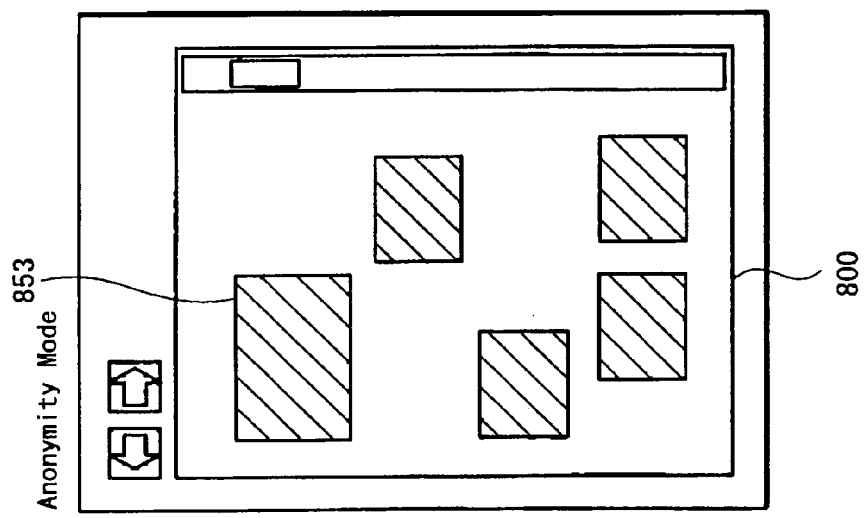

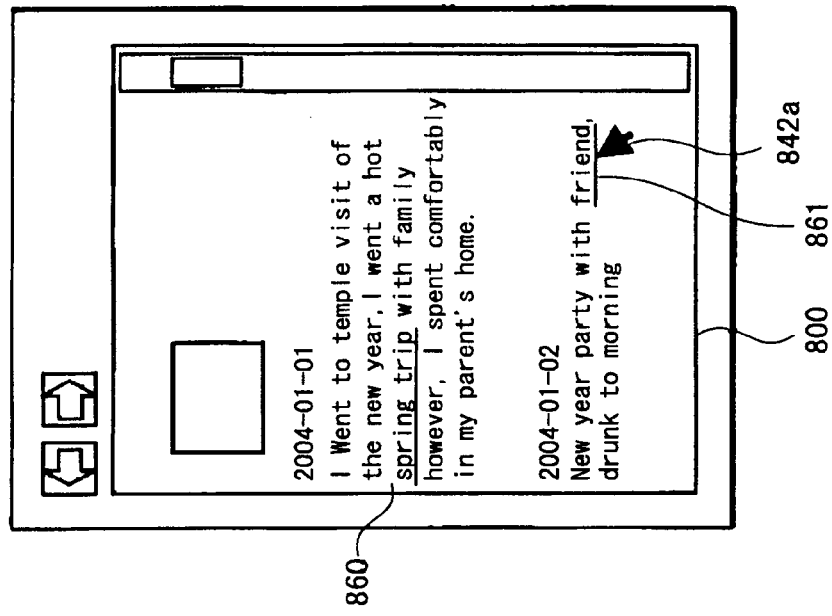
FIG. 66A Record of Link Address Disclosed
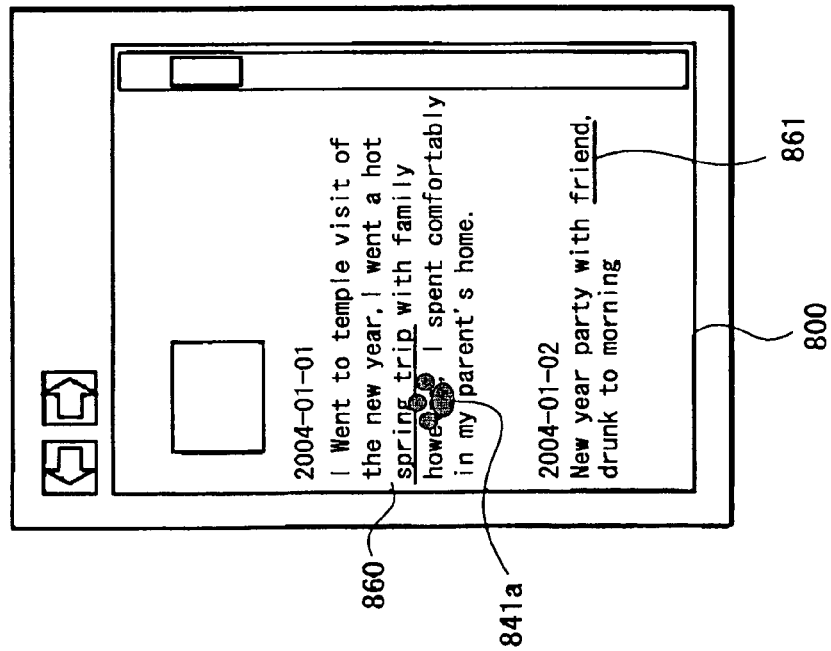
FIG. 66B Record of Link Address Undisclosed

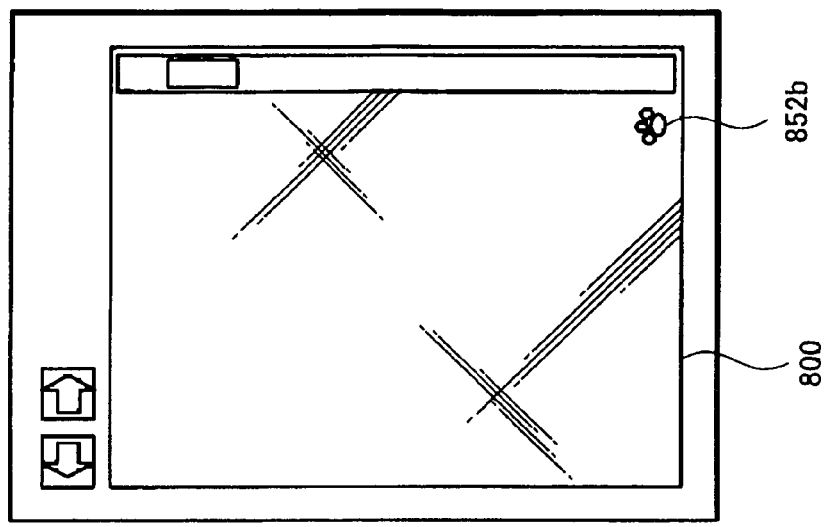
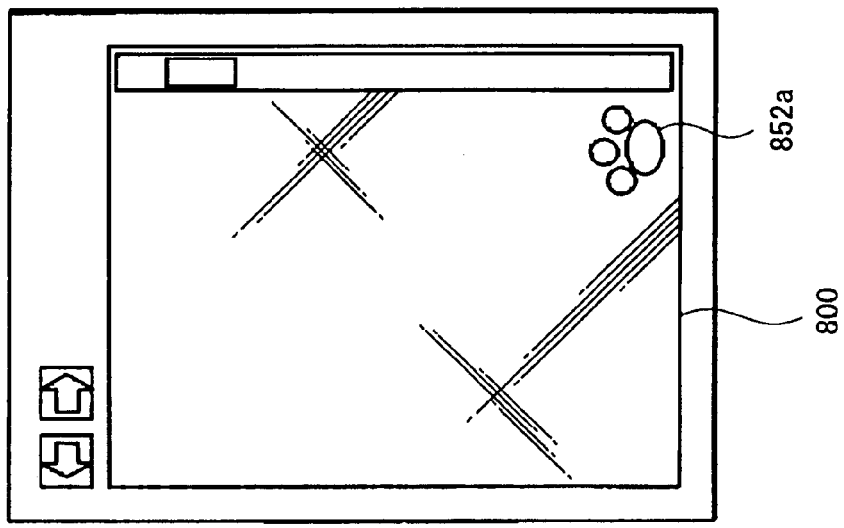

CONTENT SHARING SYSTEM AND CONTENT IMPORTANCE LEVEL JUDGING METHOD

CROSS REFERENCES TO RELATED APPLICATIONS

This application claims priority to Japanese Patent Document No. 2004-166242, filed on Jun. 3, 2004 with the Japanese Patent Office, which disclosure in its entirety is hereby incorporated by reference.

BACKGROUND OF THE INVENTION

The present invention relates to a content sharing system and content importance level judging method, and particularly to the content sharing system and the content importance level judging method, in which importance level of content is determined for each user and valuable notice message is sent to a user.

In related art, the content sharing system which shares content of multimedia data uploaded to server such as Internet with a plurality of users is provided. On the other hand, in order to keep the relations with a number of users and communities, more than the past, various tools and multimedia data have come to be used with the progress of technology in the multimedia and communication system. Therefore, the amount of content that appears on the content sharing system becomes voluminous. However, because the content not needed for a user becomes so-called noise, it becomes a factor that makes the confirmation of content needed for the user be difficult. At present, the method which extracts only contents of high importance level from many contents is being requested in these situations.

Further, relating to the above, a system which notifies a user: if there is a content of a high importance level for the user on the content sharing system, and if there was modification of that content, and others is desired. When a notice message was issued, a user who received that notice message can access a predetermined content according to the content recorded in that message, and can browse it.

As the one that extracts high importance level data, for example, the one used for text-based documents such as electronic mail and so on which prioritizes data using a text classifier and which generates and transmits warning based on the order of priority, as proposed in Japanese Translation of PCT International Application No. 2003-527656.

Further, as the system that notifies user, for example, a system which notifies the user by mail, when there was a modification of the content made to correspond to a user as proposed in Japanese Patent Application No. 2004-5500.

However, there are disadvantages in the system described in the patent document 1 such that only text-based documents are available and the communication record in the past is not reflected to the order of priority.

Further, because the one described in the patent document 2 does not have a concept of importance level in the notice mail, all of notices with respect to modification of content are sent to the mail addresses registered. Further, the content of notice and frequency may not be modified easily corresponding to a user condition. Further, the notice message may not be distributed appropriately when there are a plurality of clients. Furthermore, the start/stop of notice may not be controlled by the mail, and other disadvantages have been recognized.

On the other hand, in the instant messenger, notice is sent to a client who logs in. The ON/OFF of notice such as log-in of a member and reception of message/mail can be changed by every client. However, whether or not to notify is determined by only the ON/OFF setting on the user side, and the notice may not be sent to the other media such as mail.

Further, in all of those systems, whether or not to give a notice is set only by the judgment on the reception side of notice, and there is no such a system in which an interest level of a notice receiver and recommendation level of a content contributor are taken into consideration and whether or not to notify is judged.

At present, there is a WWW (World Wide Web) as content sharing system widely used, and a user places files such as HTML on a predetermined directory in the WWW to disclose those files. A user browses contents by using a Web browser in the WWW. At that time, access information on browsing user is recorded in a log by a HTTP server, such as Apache, IIS (Internet Information Server: produced by Microsoft Corporation), and the like.

A content producer can see the log directly and can visualize it by using appropriate tool, if he or she has access right to the server. Further, the number of users who access the content can be displayed by using an access counter and so on.

A disadvantage of these systems is that a user can not set a permission of access record. A browsing user has no information regarding who knows that the browsing user has accessed it, and also the browsing user can not control the information. In other words, whether or not a producer of web pages has a browsing permission of access log from a server is not clear for the browsing user.

A user can leave a comment by using CGI, and can send a utility level of that page by using a button, depending on a web page. Although it is understood that a reading user is sending a certain kind of access information in such a system, an owner of that page needs to set up the CGI and others, and also, a browsing user clearly needs to write a comment and to push a button. Hence, there is a disadvantage that a user may not easily notify the visit to the page.

SUMMARY OF THE INVENTION

The present invention addresses the above-identified, and other problems associated with conventional methods and apparatuses, and provides a content sharing system in which the importance level of arbitrary content is judged with respect to individual users and which appropriately notifies a client or an outside tool of a notice message that has a value for a user. Furthermore, it is desirable that an access user can set the disclosure level of access record that is the record of a user having accessed the content.

According to an embodiment of the present invention, an importance level of content, that is content of multimedia data on a server shared with clients of a plurality of users, is judged and, wherein the importance level of content for individual user is calculated by interpreting an existing data or user environment; the client condition is judged; a notice rule setting is changed in accordance with an instruction from the client or client condition; and a notice message is issued to an appropriate address based on the importance level and notice rule of content that were calculated.

As an embodiment of the present invention, information recorded into content itself is suitable to be utilized as the above existing data.

Furthermore, as another embodiment of the present invention, communication record information including a content browsing record and content contribution record of a user for example is suitable to be utilized as the above existing data.

According to an embodiment of the present invention, since an importance level of content is decided in a content sharing system using, for example, utility record, setting information, environment information and the like of user, content corresponding to an environment, situation, interest and others of a user can be proposed easily regardless of various media data and text data. Further, in the situation that a user uses a plurality of devices and clients, a notice message that has high value of the importance level can be appropriately notified to a client and the outside tool.

Further, only necessary notice can be received in accordance with the client or user condition. Furthermore, there is an advantage that a notice valuable for a notice receiver is detected in accordance with an interest level of the notice receiver and recommendation level of a content contributor with other relations add.

Additional features and advantages of the present invention are described in, and will be apparent from, the following Detailed Description of the Invention and the figures.

BRIEF DESCRIPTION OF THE FIGURES

FIG. 10 is a table showing contribution records according to an embodiment of the present invention.

FIG. 11 is a table showing browsing records according to an embodiment of the present invention.

FIGS. 13A to 13C are tables showing user setting information according to an embodiment of the present invention.

FIG. 19 is a table showing an example of profile information (attribute information) according to an embodiment of the present invention.

FIG. 23 is a table showing content data including position information according to an embodiment of the present invention.

FIG. 24 is a table showing the calculation result of an importance level using position information according to an embodiment of the present invention.

FIG. 26 is a table showing an example of a notice message according to another embodiment of the present invention.

FIGS. 27A to 27C are tables that show notice rules (one rule for one client) according to another embodiment of the present invention.

FIGS. 28A and 28B are tables showing notice rules (a plurality of rules for one client) according to another embodiment of the present invention.

FIG. 44 is a table showing access record data according to further another embodiment of the present invention.

FIG. 45 is a table showing a permission table according to further another embodiment of the present invention.

FIG. 46 is a table showing a user table according to further another embodiment of the present invention.

FIG. 47 is a table showing a user group table according to further another embodiment of the present invention.

FIG. 48 is a view showing an example of HTTP header expansion according to further another embodiment of the present invention.

FIG. 49 is a view showing an example of HTTP multi part post according to further another embodiment of the present invention.

FIGS. 63A and 63B are views showing access record displays (the letter of content altered) according to further another embodiment of the present invention.

FIGS. 65A and 65B are views showing access record displays (contents themselves) according to further another embodiment of the present invention.

FIGS. 66A and 66B are views showing access record displays of linked addresses according to further another embodiment of the present invention.

FIGS. 67A and 67B are views showing access record displays (temporal change) according to further another embodiment of the present invention.

DETAILED DESCRIPTION OF THE INVENTION

The present invention relates to a content sharing system and content importance level judging method, and particularly to the content sharing system and the content importance level judging method, in which importance level of content is determined for each user and valuable notice message is sent to a user.

Hereinafter, various embodiments of the present invention are explained with reference to FIGS. 1 to 24. An importance level of certain content can be judged individually with respect to users in a system that shares multimedia data with a plurality of users as described below in greater detail.

First, an outline of a content sharing system is explained using FIGS. 1 to 8. The content sharing system is a system in which a plurality of users can record and read multimedia data (for examples, still picture, moving picture, sound and text) through communication network such as the Internet, and the like. A basic configuration of this system includes a server on a communication network such as the Internet, etc and a plurality of clients operated by respective users.

Figure 1:
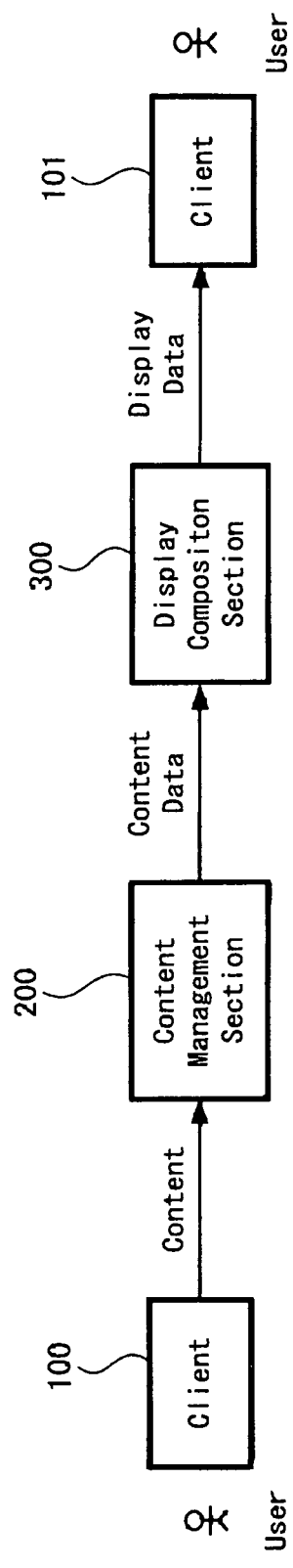
FIG. 1 is a schematic diagram for explaining a content sharing system.

FIG. 1 is a diagram schematically showing a configuration of the content sharing system. In FIG. 1, a content management section 200 is a module which manages content (refer to FIGS. 4A and 4B) that includes metadata and metadata described later on, and controls preservation of content, modification, comment addition and so on. In addition, only clients permitted can execute various kinds of operation by appropriate authentication means.

Further, clients 100 and 101 are application programs directly operated by users and provide functions of: user interface such as capture of media, text input and so on; acquiring metadata such as position information and so on; registering content to the content management section 200; and displaying content and so on. A user can perform operations through the clients, such as reading, registration, acquisition, deletion, modification and others of content disclosed on the system.

Further, a display composition section 300 is the one that acquires content data from the content management section 200 and lays it out to an appropriate form, and is stored in a server or client terminal. Various methods such as, for example, displaying contents of a plurality of users in the latest order; displaying only contents of a specific user and so on, may be applied thereto.

An example of a specific composition method of the content sharing system shown in FIG. 1 is the one that uses Java® Servlet as the content management section, and uses Java application program that operates on mobile phone as the display composition section and client.

A different example of the composition method of the content sharing system is the one that uses Java® Servlet as the content management section and display composition section and uses Web browser on a PC (personal computer) or the like as a client.

Both the client and server operate as program on a computer and data is recorded into recording medium thereof (not shown in the figure).

Figure 2:
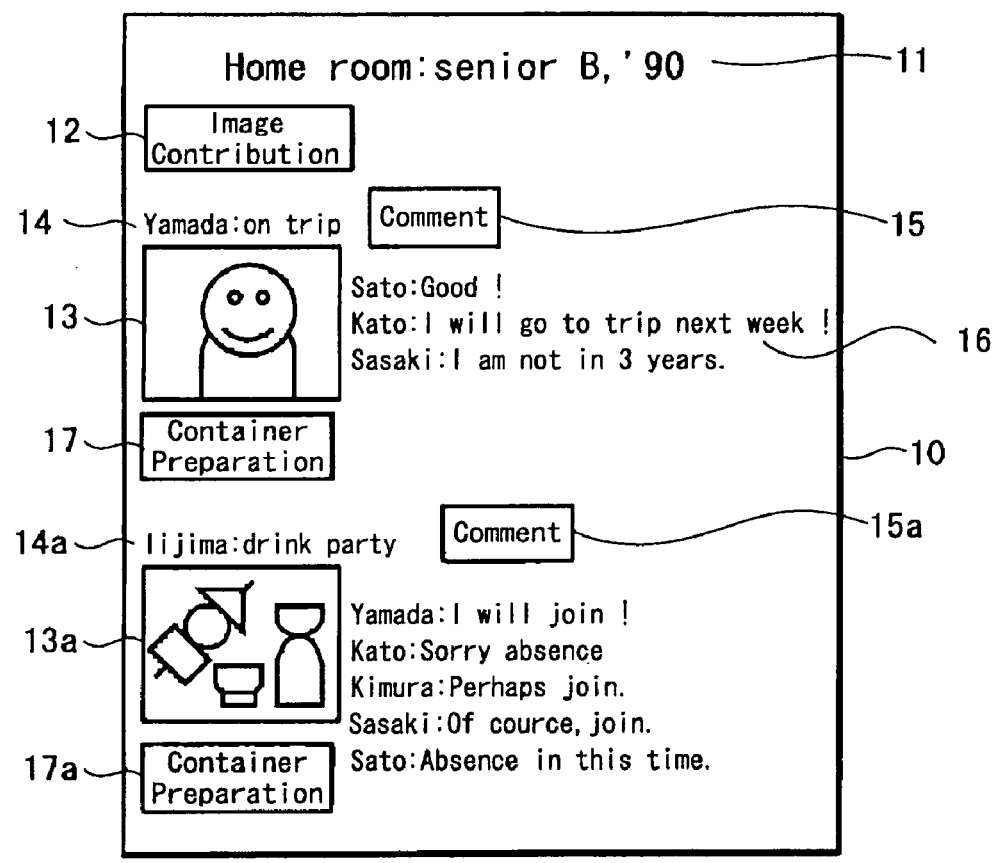
FIG. 2 is a view showing an example of a content container display screen.

Hereinafter, the content sharing system is explained using a more specific example. FIG. 2 is a screen of user use in an electronic bulletin board system that uses the content sharing system, for example, which is an example of a content container display screen. Here, six users (Yamada, Sato, Kato, Sasaki, Kimura and Iijima) are mutually sharing contents. In this system, a collection of specific contents is called a content container (or simply called as a container).

A plurality of users can write a plurality of contents into the content container and can read them out. Furthermore, an access right for each user can be set in the content container. In this example, in order to simplify the explanation, two methods are defined as the content write-in method.

One is an image contribution, and image data and the title thereof are defined as a write-in unit. The other is a comment contribution, and document by text data is defined as a write-in unit.

FIG. 2 shows an example in which users contribute images and comments in a content container 11 named "class room of 3rd grade-B, 1990". For example, an image data display 13 is an image contributed by a user named Yamada and a contributor's name and the title set by the contributor are displayed on a contributor/title display 14. A Contributor/comment display 16 displays the results of other users contributed comments to this Yamada's contribution. In the figure, though one comment is displayed by one line, not limited thereto.

Further, in FIG. 2, a reference numeral 12 denotes an image contribution button that is pushed when an image is contributed to this content container, a reference numeral 15 denotes a comment button that is used when a comment is contributed and a reference numeral 17 denotes a container making button that is used when a content container is made.

Next, a method in this system by which contribution, comment and reading are performed is explained. First, operation in the time when the image is contributed is explained with reference to FIGS. 2 to 6.

Figure 3:
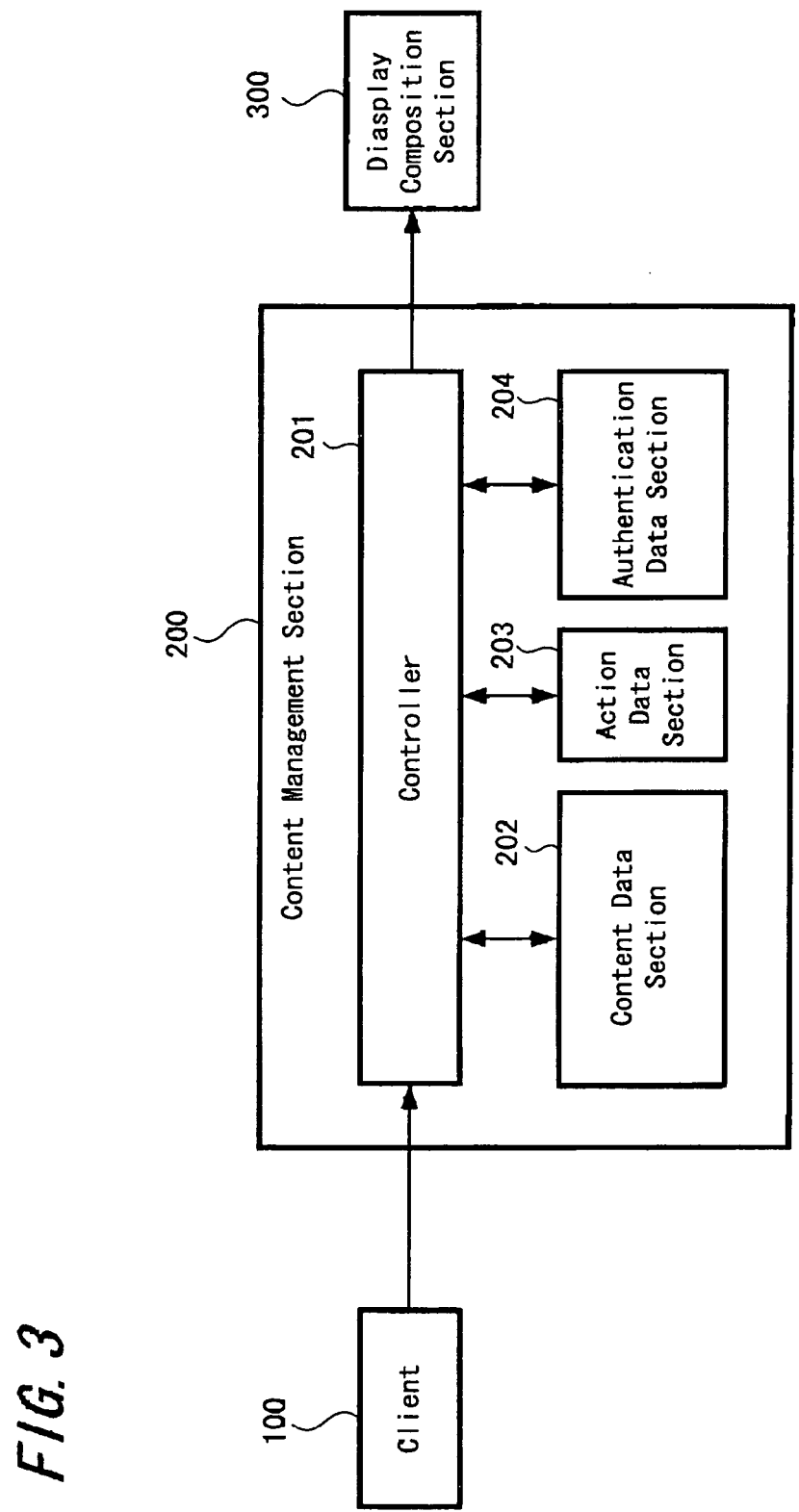
FIG. 3 is a diagram showing a configuration of a content management section of FIG. 1.

FIG. 3 shows a configuration within the content management section 200. A content management section 200 includes a controller 201, content data section (content preservation section) 202, action data section 203 and authentication data section 204.

In FIG. 3, the controller 201 in the content management section 200 receives various kinds of command from the outside; manages data inside; gives display instruction to the display composition section 300 and so on. Further, the content data section 202 preserves data on contents and a content container. Further, a code that performs certain processing; is preserved in the action data section 203. Furthermore, data that needs for authentication such as user data and a password is preserved in the authentication data section 304. This authentication data may be preserved outside.

Figure 4A:
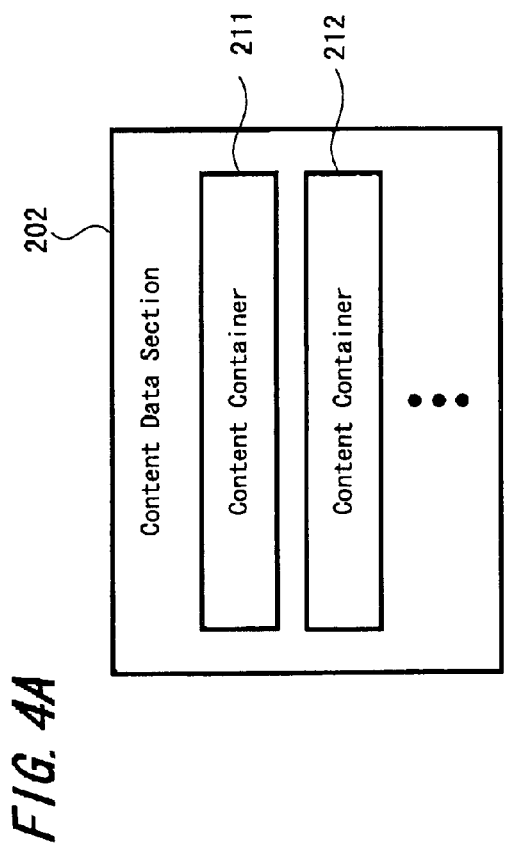
FIGS. 4A to 4C are a diagram showing a configuration of a content data section of FIG. 1.
Figure 4B:
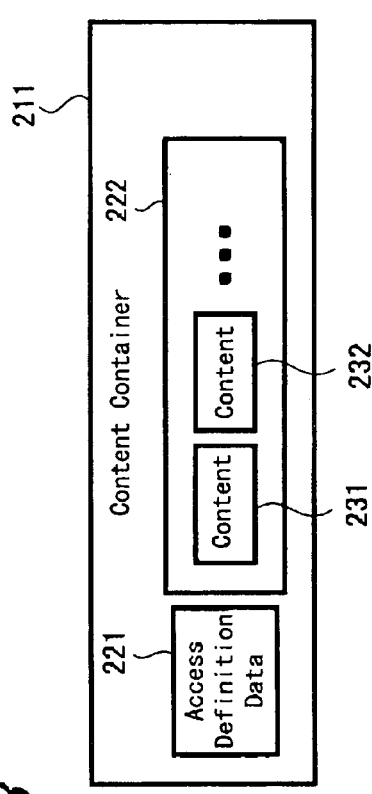
Figure 4C:
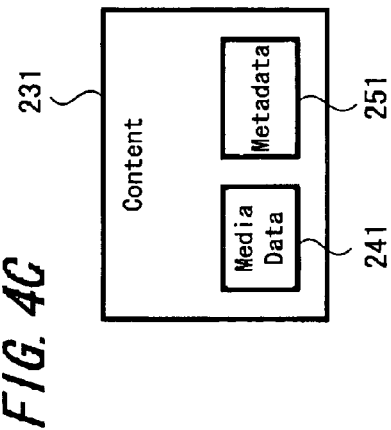

FIGS. 4A to 4C are diagrams showing a configuration of data in the contents data section 202. FIG. 4A shows a configuration of the content data section 202, FIG. 4B shows a configuration of a content container and, FIG. 4C shows a configuration of content. The content data section 202 preserves and manages a plurality of content containers 211, 212 . . . and so on, for example. Further, the content container 211 includes access definition data 221 and a content list 222 including a plurality of contents 231, 232 and so on. Further, the content container may not include contents when newly made.

Further, the content 231 includes media data 241 and metadata 251, and multimedia data is stored in the media data 241 and information about metadata is stored in the metadata 251. In this embodiment, image and comment are stored as one content.

Figure 5:
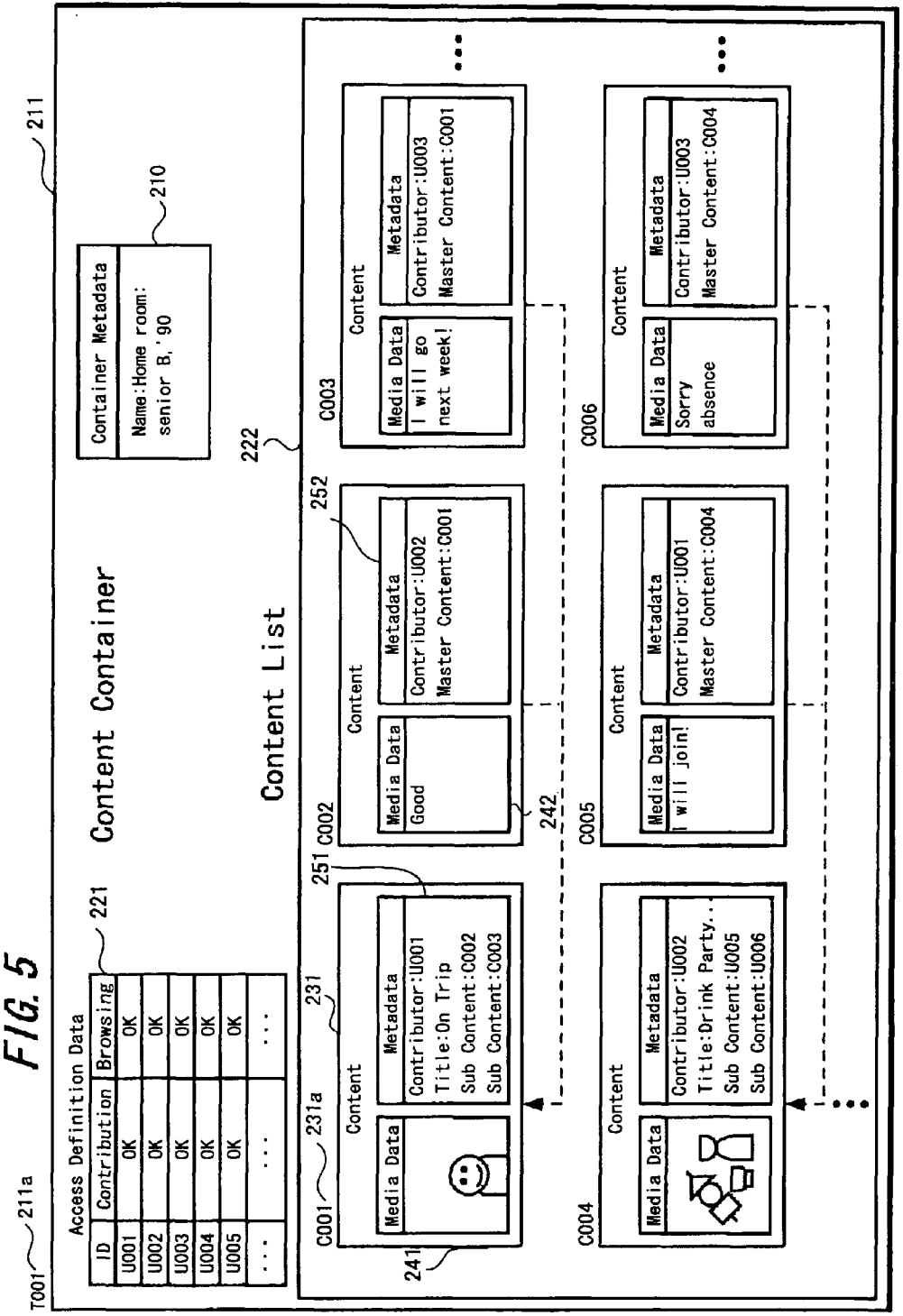
FIG. 5 is a diagram showing an example of a data storing structure of a content container.

FIG. 5 specifically shows a data storing structure in a content container with respect to FIG. 2, and container metadata 210 that shows the title of a container, access definition data 221 and a contents list 222 are stored therein.

As shown in FIG. 5, each user's contribution and reading permission information (access right) are registered in the access definition data 221. In this embodiment, U001 as ID (Identification) is assigned to Yamada, similarly U002 is to Sato, U003 is to Kato, U004 is to Sasaki, U005 is to Kimura and U006 is to Iijima. Further, with respect to the setting of access right, contribution permission and reading permission can be set individually.

Further, for example, in the image content 231 within the contents list 222, image data is stored in the media data 241 and a contributor's ID, title and sub content ID (0 or more) are stored in the metadata 251. On the other hand, in the comment content 232 that is the contribution comment to the image content 231, comment sentences are stored in the media data 242 and the contributor's ID and master content ID are stored in the metadata 252. Further, 211a is a content container ID that identifies the content container and 231a is a content ID that identifies content.

With respect to a specific contribution operation, a flow when the image data 13 shown in FIG. 2 is contributed is explained as an example.

First, an image contribution button 12 is selected and the image and tile are designated, when a user (Yamada) contributes. As a result, in FIG. 3, the client 100 transmits an image contribution command to the controller 201 of the content management section 200. The content of image contribution command includes a content container ID of contribution subject, contributor's ID, title and image data.

Figure 6:
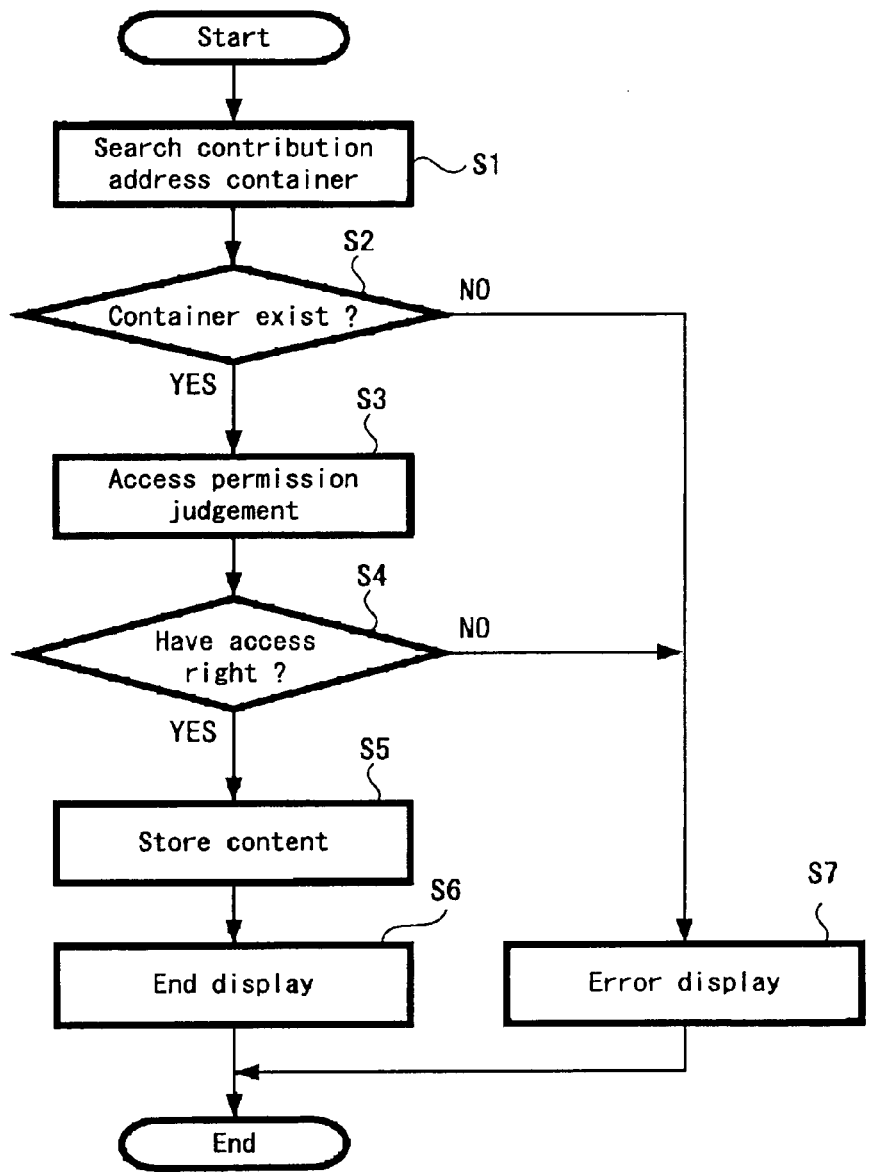
FIG. 6 is a flow chart showing a contribution command processing.

The controller 201 that received the image contribution command executes contribution command processing in accordance with a flow chart shown in FIG. 6. First, the controller 201 searches the content container of contribution address from the content data section 202 (Step S1). Whether or not there is a designated content container is judged (Step S2), and if there is the designated content container, access definition data 221 therein is verified and performs access permission judgment (step S3). The controller 201 refers to the access definition data 221 and confirms that Yamada (ID U001) who is a contributor has contribution permission (access right) (step S4), and contribution content is produced and data is stored, and the content ID (C001) is produced and stored in the contents list 222 (step S5). When the storing processing in the contents list 222 is ended, end of the contribution command processing is displayed on the screen (step S6), and the contribution command processing ends.

In the above judgment steps S2 and S4, if there is no container of a contribution address or a user has no access right, a message instructing that each has error is displayed (step S7), and the contribution command processing ends.

Note that, although FIG. 5 shows two sub-contents stored in the metadata 251 of the content 231, this item does not exist because there is no sub-contents in the content 231 in this stage.

Figure 7:
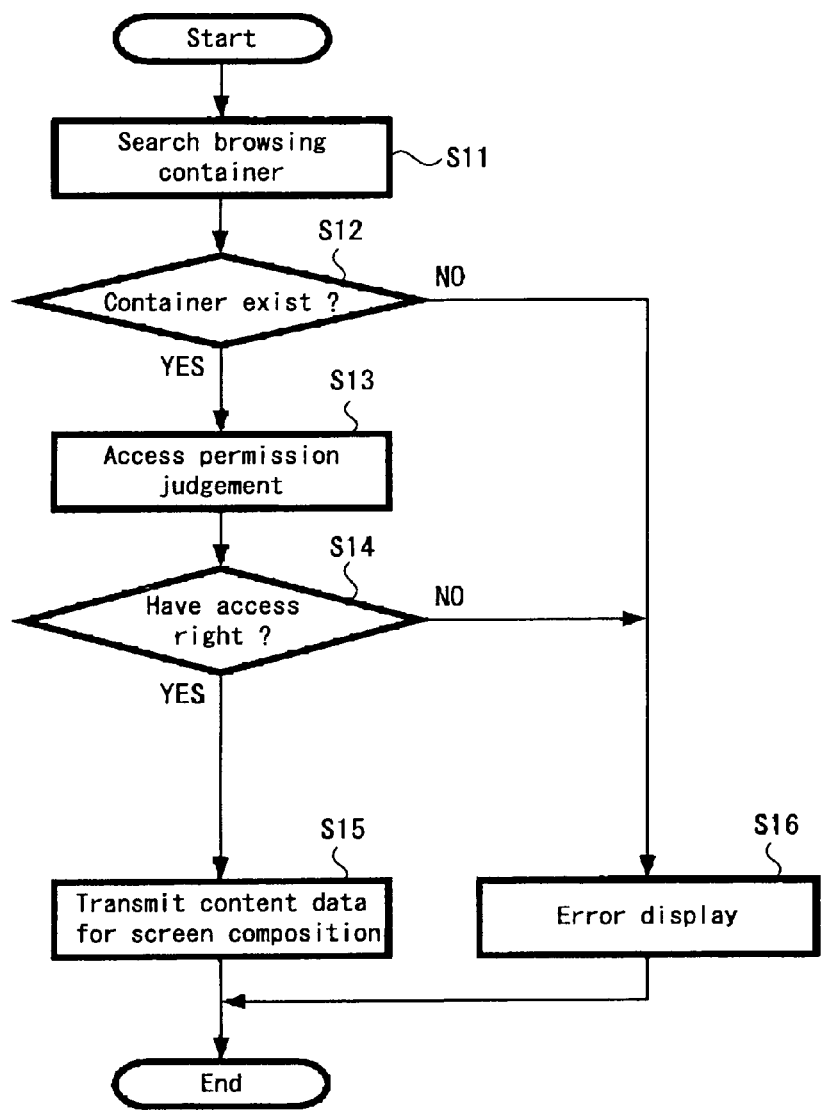
FIG. 7 is a flow chart showing a browsing command processing.

Next, processing when a user reads content of a content container is explained using FIGS. 2, 3 and 7. When a user performs the input operation on the client 100 (refer to FIG. 3) and makes an instruction to read the content container 211, the client 100 transmits a reading command to the controller 201. The content of the reading command includes in this time a content container ID of reading subject and a user ID of requester.

When receiving the reading command, the controller 201 executes the reading command processing in accordance with a flow chart shown in FIG. 7. First, the controller 201 searches the content container of reading subject (Step S11), and whether or not there is a content container of reading subject is judged (Step S12). If there is a content container of reading subject, similarly to contribution, an access definition data 221 therein is verified and access permission decision is performed (step S13). The controller 201 refers to the access definition data 221 and confirms that requester has reading permission (access right) (step S14), and if requester is permitted to read (OK for reading), content data used for screen composition is transmitted to the display composition section 300 (step S15) and the reading command processing ends.

In the above judgment steps S12 and S14, if there is no container of contribution address or the user has no access right, a message notifying that each has error is displayed (step S16) and the contribution command processing ends.

The display composition section 300 analyzes contents data and produces screen composition data. The display composition section 300 extracts the title, contribution content, comment and content from content data, and arranges those as shown in FIG. 2. Further, one image contribution button and a comment button 15 for each contribution (image data) are arranged. Screen composition data is formed using, for example, HTML or the like.

Figure 8:
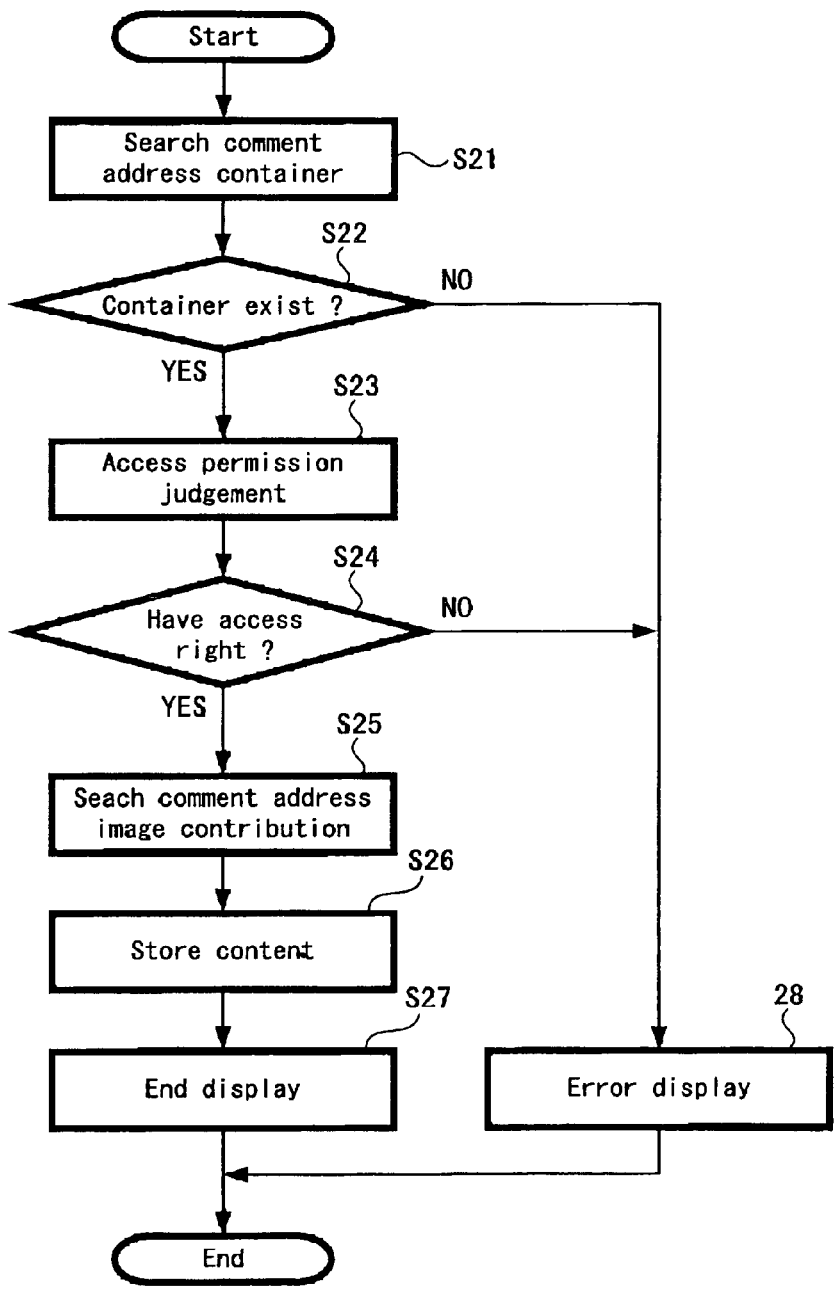
FIG. 8 is a flow chart showing a comment command processing.

Next, the case where a user sends comment for content that the user read is explained using FIGS. 2, 3 and 8. In FIG. 2, the case where a user (Sato) comments for the image data display 13 is described.

When a user (Sato) selects the comment button 15, a comment contribution command is issued to the controller 201 from the client 100 (refer to FIG. 3). The content of the comment contribution command includes a requester ID, content container ID, content ID and comment text.

When receiving the comment contribution command, the controller 201 executes the comment contribution processing in accordance with a flow chart shown in FIG. 8. First, similarly to when contribution is made, the controller 201 searches the content container of comment destination (Step S21) and whether or not there is a content container of comment destination is judged (Step S22). If there is the content container of comment destination, similarly to when contribution is made, an access definition data 221 therein is verified and access permission judgment is performed (step S23). The controller 201 refers to the access definition data 221 and confirms that the requester has reading permission (access right) (step S24), and if the requester is permitted to read (OK for reading), then the image content, that becomes destination of comment, is searched (step S25) and content is stored (step S26). Then, a message indicating that the command execution processing is ended is displayed (step S27) and the processing ends.

In the step 26 of contents storing, as shown in FIG. 5, comments are stored as contents. At that time, content ID (C001) of image content is stored in the item of master content in metadata 252 of comment content 232, for example and also ID (C002) of comment content stored is stored in the item of sub-content in metadata 251 of content 231 that becomes destination of comment. When reading, the display composition section 300 analyzes metadata of image content and extracts sub-content as comment of that image, and produces screen composition data.

Further, in the above decision steps 22 and 24, if there is no container of comment destination or user has no access right, a message indicating that each has error is displayed (step S28) and the comment command processing ends.

The above is the basic explanation of a content sharing system. In this embodiment, a display content decision section which calculates an importance level of content data corresponding to each user and selects display data in accordance with the importance level is provided. In the embodiment described hereinafter, decision of the importance level of content and selection of the content displayed to client in this importance level judgment section are described.

Figure 9:
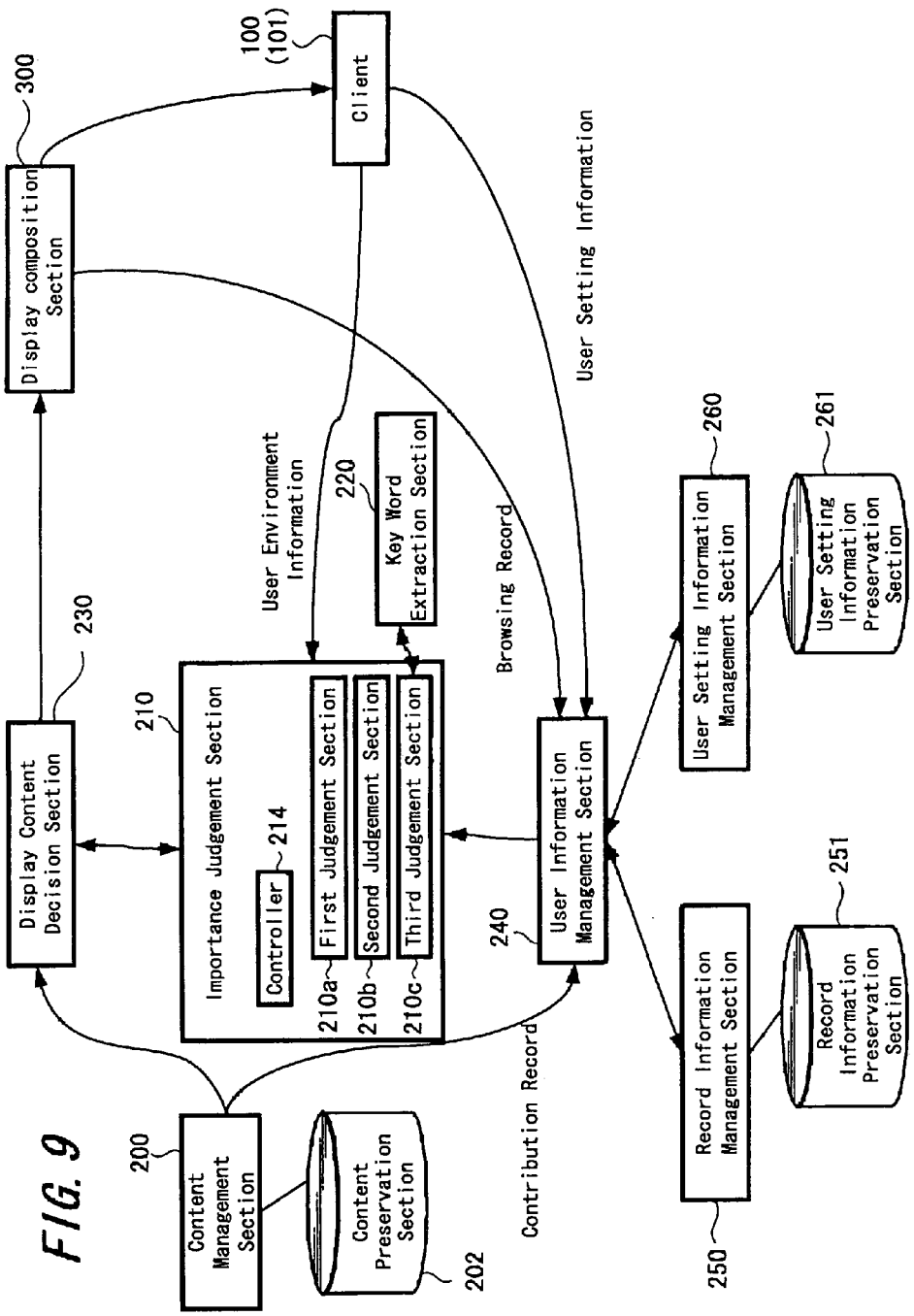
FIG. 9 is a diagram showing a system configuration according to an embodiment of the present invention.
Figure 12:
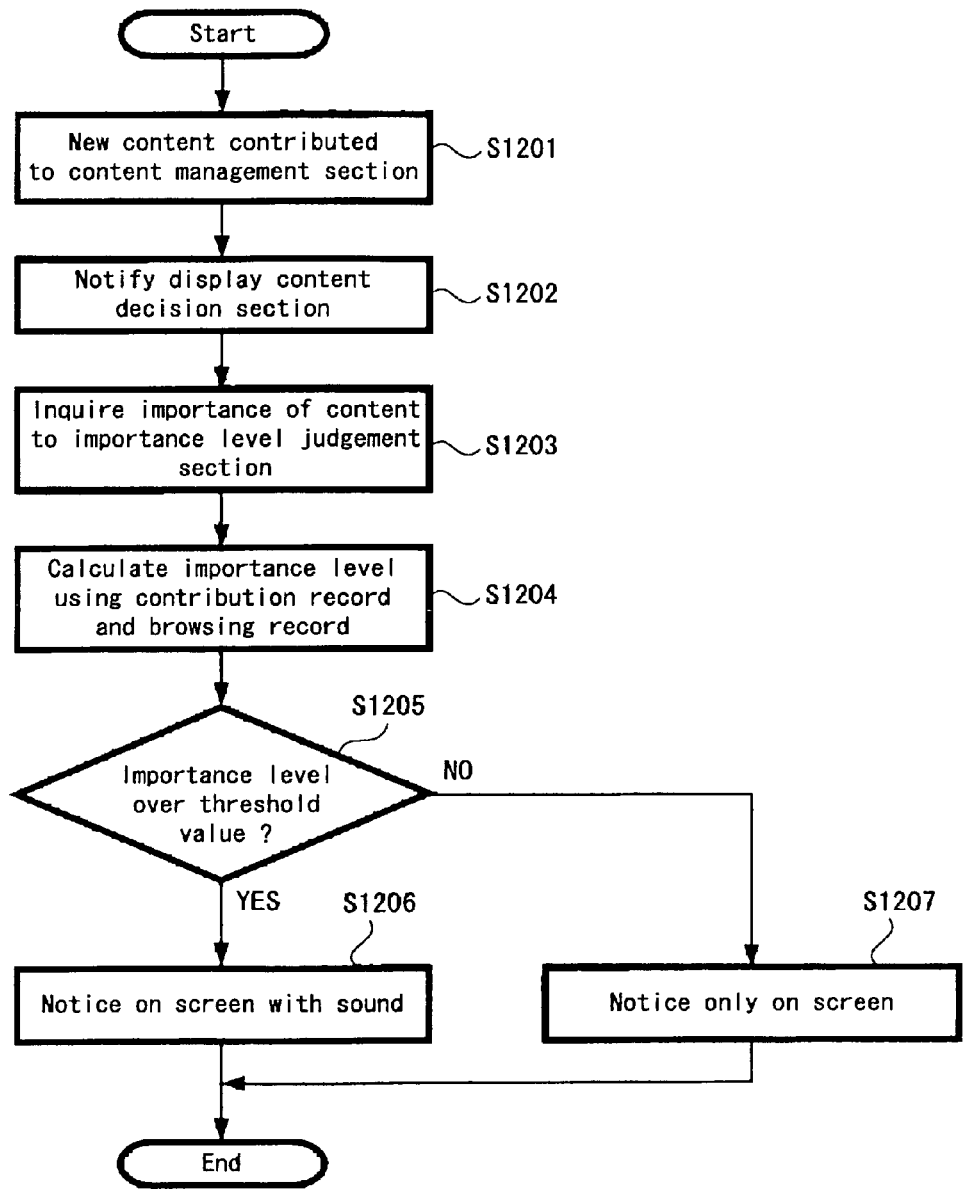
FIG. 12 is a flow chart showing a notice processing to a user with respect to newly contributed content according to an embodiment of the present invention.
Figure 14:
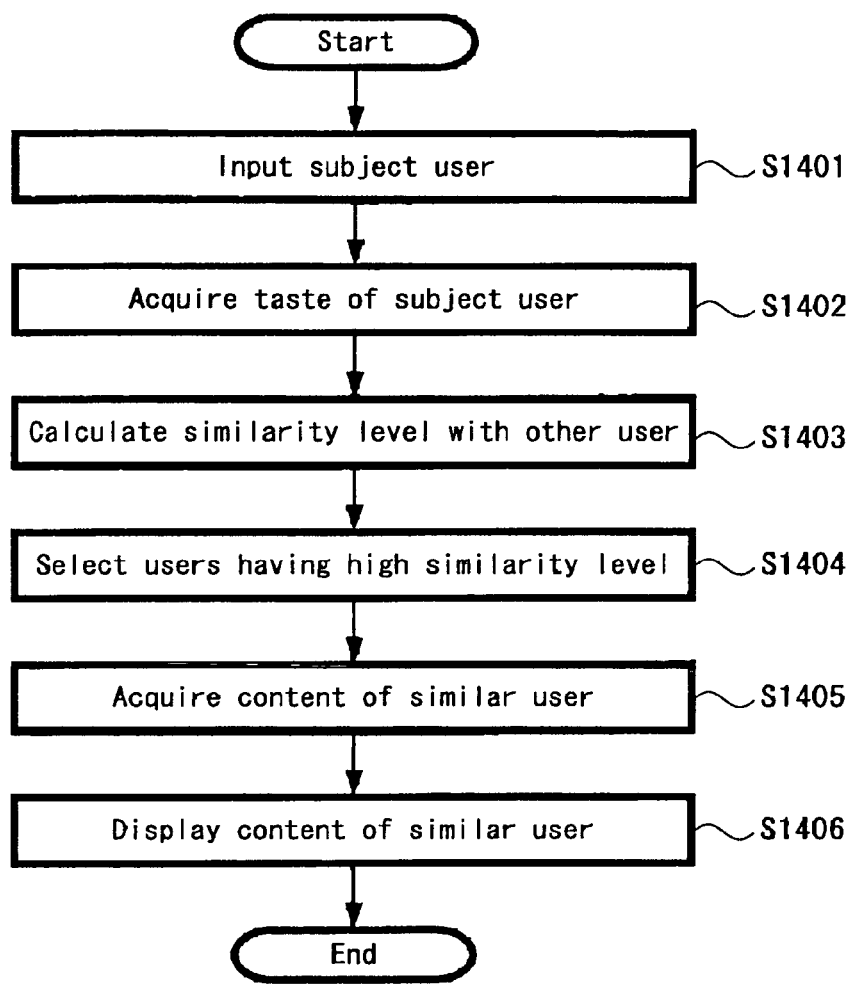
FIG. 14 is a flow chart showing content processing of a user having similar taste according to an embodiment of the present invention.

FIG. 9 is a diagram showing a system configuration of an embodiment of the present invention. In FIG. 9, in comparison with FIG. 1, an importance level judgment section 210, keyword extraction section 220, display content decision section 230, user information management section 240, user setting information management section 260 and record information management section 250 are further provided.

The importance level judgment section 210 as shown in FIG. 9 judges the importance level of content by using user environment information and user setting information described later on. The importance level judgment section 210 includes a controller 214 that controls each function and various kinds of judgment sections 210a, 210b and 210c. Furthermore, each of judgment sections extracts a keyword from acquired data, depending on necessity, by using a keyword extraction section 220 that extracts a specific string. The operation and so on of the importance level judgment section 210 is later on described in detail.

Further, a display content decision section 230 acquires content data from a content management section 200, transmits data to the importance level judgment section 210, and decides content data displayed by the client 100 (101) using the importance level of each content acquired.

Further, the user information management section 240 handles various kinds of information relating to users such as contribution record information and reading record information by user that are preserved in the record information preservation section 251; and the user setting information preserved in the user setting information preservation section 261, and data related to the contribution record information and reading record information is exchanged with the record information management section 250 and data related to the user setting information is exchanged with the user setting information management section 260.

The record information management section 250 can perform operations of registration, acquisition, deletion, modification, and so on of record information such as contribution record information and reading record information, to the record information preservation section 251. The detail of record information is described later on.

The user setting management section 260 can perform operations of registration, acquisition, deletion, modification, and so on of user setting information, to the user setting information section 261. The detail of user setting information is described later on.

All the blocks except for a client explained in an embodiment of the present invention described later on basically operate on a server, however, each block may disperse on a network, or information dependent on user who operates the client and a part of function may be included in the client. Further, each block may be a service on the network that operates on the different server, may be a program that operates on the same server, or may be a library in the same program.

Both of the client and server operate as program on a computer and data is recorded in a recording medium thereof (not shown in the figure).

As an index of an importance level of content data in the importance level judgment section 210 shown in FIG. 9, an example of an importance level judgment method using communication record is provided. In other words, in the importance level judgment section 210, an importance level of each content for a user is calculated using communication record among users in the past. Here, the contribution record information and reading record information by a user are used as the communication record. Needless to say, other record information than those, for example, the record information of mail, instant messenger, telephone and so on may be used.

Hereinafter, the processing of importance level judgment section 210 based on the communication record is explained, showing a specific example that uses the contribution record information and reading record information.

First, when content is contributed to the content sharing system shown in FIG. 9, the contribution information is registered in the record information management section from the content management section 200 through the user information management section 240. Information such as user ID of contributor and content ID of contributed content, and in the case where the contribution is the reply to different contribution, further content ID of reply address, contributed day and time and so on is stored in the contribution record information preservation section 251.

The user ID described here is a string that is determined uniquely to a user, and the present system assigns the ID. Further, the content ID is a string that is determined uniquely to the contributed content data, and the present system assigns the ID when newly contributed.

A specific example of contribution record information is shown in FIG. 10. There are user ID, content ID, content ID of reply address and contributed day and time. FIG. 10 is only an example and other information such as contribution address and so on may also be included.

Further, when a user requests the reading of certain content, the reading information is registered in the record information management section 250 from the display composition section 300 through the user information management section 240. User ID of a reader, content ID of read content, time when user read and so on are stored in the reading record information.

A specific example of reading record information is shown in FIG. 11. There are user ID, content ID of read content and contributed day and time. Similarly to the example of contribution record information, FIG. 11 is only an example and other information such as contribution address and so on may also be included.

A contribution record and reading record used in this embodiment may be a utility record of the present system as described above, and may be utility records of this system, content of which is used by outside applications such as electronic mail and instant messenger (chat), for example.

In the importance level judgment processing using the communication record, the importance level of each content is calculated based on contribution record information and the reading record information that were stored in the past. Any method of calculating importance level may be used and, for example, calculation may be made such that the importance level of content that includes the same user ID in metadata registered in content becomes high. The specific calculation in detail of an importance level is explained later on.

By calculating the importance level of content for a user, for example, the contents can be used for a variety of usage of the user, by treating the ascending order (or descending order) of the importance level.

As an example of the above, a service in which a notice is issued to a user when content is newly contributed to this system is considered. In such service, a new contribution of content that user may have an interest in, is desired to be notified soon, but a new contribution of content that user may not have an interest in, is not frequently desired to be notified. However, if the notice method can be modified in accordance with the importance level, it is convenient for a user. Hereinafter, procedure that modifies the notice method based on the record of the past is explained, referring to a flow chart of FIG. 12.

First, a user contributes a new content to the content sharing system of FIG. 9. The contributed content is stored in the content management section 200 (step S1201).

The content management section 200 transmits the contribution of a new content and the content data together to the display content decision section 230 (step S1202). The display content decision section 230 may be provided for each user of notice address, or one display content decision section may perform processing for all users of subject.

The display content decision section 230 inquires, with parameters of a user ID of notice address and newly contributed content, the importance level of the importance level judgment section 210 (step S1203).

The importance level judgment section 210 acquires the contribution record information and the reading record information of the past from the record information management section 250 using the user ID of user of notice destination, and calculates the importance level of newly contributed content (step 1204). As a specific method of calculating the importance level, for example, there is a method in which the percentage of the contents, contributed in the past by the same contributor as the relevant content, read by the user of notice destination is calculated to be made an importance level. Further, a method in which the percentage of the whole contents, contributed in the past by the same contributor as the relevant content, replied to by the user of notice destination is calculated to be made an importance level is also conceivable. Needless to say, not only the reading probabilities and reply probabilities, but also other calculation method using contribution record information and reading record information or combination thereof may be used.

Further, the importance level judgment section 210 includes a plurality of judgment sections based on different reasons of importance as described above, and an optimal result may be returned together with a reason of judgment from among them. In other words, information used to calculate importance level may be one or more. Furthermore, a selecting method is conceivable in which in the importance level judgment section 210, optimal information is selected from the importance level information obtained from a plurality of information items and the selected importance level information is used as the one for the content. Further, it is also conceivable that the information used for the calculation of the importance level such as information from which the importance of content was judged is notified to user as the reason.

The display content decision section 230 selects the notice method corresponding to the importance level obtained from the importance level judgment section 210 (step S2105). For example, in the case of content with high importance level, a thumbnail display of the image together with sound are notified if the content is image data (step S1206), and in the case of content with low importance level, only existence of new content is notified by simple display and so on (step S1207). The notice method is not limited thereto.

As described above, the importance level of content is decided by using communication record, and the content provided for a user is selected based on that, whereby the example described above can be used as the notice method for new contribution of content.

In addition thereto, when the important level is judged using communication record, "Good relationship" and "common interest" among users, for example can be known and it may also be used for communication progress between users.

Next, the case in which the importance level is judged using the setting information by a user oneself and is provided to the user, is explained.

The importance level judgment section 210 of this system can extract the relationship between users using the system from the setting information of user, and also judges the importance level based on the setting information. Consequently, for example, when content data similar to each setting information of users who are communicating is provided for both the users, the communication can be activated. Hereinafter, the processing of the importance level judgment section 210 using the setting information of a user is explained by referring to specific examples.

First, registration of user setting information is explained. Each user registers information about himself/herself as the user setting information. An example of user setting information registered is shown in FIGS. 13A to 13C. As shown in FIGS. 13A to 13C, the user setting information is mainly classified as: profile information (FIG. 13A); group information (FIG. 13B); and taste information (FIG. 13C).

User ID, name, sex, age and so on are stored in the profile information (refer to FIG. 13A). Here, user ID is the one for the user setting information management section 260 to manage easily and is defined with a unique number or a string to each user.

Group ID, group name, user ID list of users that belong to the group and so on are stored in the group information (refer to FIG. 13B). Here, the group is a concept that summarizes a plurality of users such as: friends who like playing tennis; and colleagues who like skiing, and is managed as the user setting information. These may be registered explicitly by a user, or users permitted to read contents of himself/herself may be registered as a group. Furthermore, the information may be registered automatically from address book such as of mail software. Further, each user may not belong to a group and may belong to a plurality of groups.

User ID, subject, interest level and so on are stored in the taste information (refer to FIG. 13C). Subject is the subject in which a user has an interest, that is, other users, groups, keywords and so on. The interest level is defined with the strength of interest and is represented by the numerical value from 0 through 100, for example. Further, each user may not have the taste information, or may have a plurality of taste information items.

The above user setting information can be acquired by carrying out questionnaire when a user joins a content sharing service. Alternatively, user setting information may be registered using the user information already registered in the other service. Further, user may edit the user setting information once set in accordance with the occasion at the time, or the system itself may learn and modify the taste information and so on when user uses the system.

Next, extraction of users who have a similar taste is explained. For example, users who have a similar taste are extracted using the user setting information registered in advance, and content information that the users have can be read. Hereinafter, the processing which displays contents of users who have a similar taste is explained, referring to a flow chart of FIG. 14.

First, the importance level judgment section 210 is provided with the input of searching a user whose taste is similar to someone. If it is the user himself, user ID is acquired from the user setting information management section 260 (step S1401). If it is other user, user ID is acquired from the user setting information management section 260 using the user name selected (or input) by the user.

Next, the importance level judgment section 210 acquires taste information of user from the user setting information management section 260 using user ID acquired in the above step S1401 (step S1402).

Further next, the importance level judgment section 210 compares the taste information of the user acquired in the above step S1401 with the taste information of other users that is managed in the user setting information management section 260, and calculates a similarity level (step S1403). The similarity level, here, is equal to the importance level of content. Hereinafter, the similarity level is treated as the importance level of content. The similarity level can be calculated from the subject of taste and interest level. For example, in the taste information stored in the user setting information management section 260, if x kinds of subject of all users exist, an array of x dimension with reference to the interest level of each subject as element is made, and a cosine of that and the array of subject user can be the similarity level.

Based on the similarity level calculated in the above step S1403, a user who has higher similarity level is selected (step S1404). A plurality of users may be selected and may be selected in accordance with the input from the user after proposing candidates based on the similarity level to the user. In this embodiment, although it is judged that selecting a user of high similarity level is high importance level, a user of low similarity level may be selected, depending on the subject.

The display contents decision section 230 acquires content of a user designated by the content management section 300 by providing the display contents decision section 230 with the user information selected in the above step S1404 (step S1405). Alternatively, the importance level judgment section 210 may directly acquire the content of the user designated by the content management section and gives the content to the display contents decision section.

With respect to the content of the user acquired by the display contents decision section 230 in the above step S1305, appropriate display composition data is generated in the display composition section 300 and is sent to a client (step S1406). Accordingly, the user can understand contents that a user having the similar taste to himself stores. For example, the user who has the same hobby of music sees contents that other users store and can understand what kinds of music that the user is listening to, and the user who likes trips sees the photograph of the trip which other user who likes a trip stored and can understand where the user went.

Figure 15:
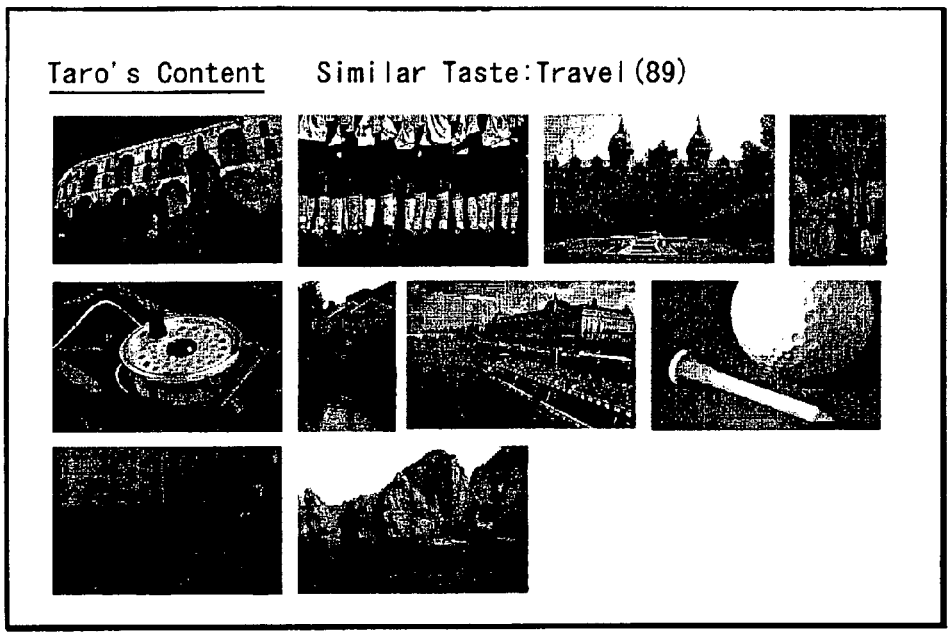
FIG. 15 is a view showing a first example of content display of a user having similar taste according to an embodiment of the present invention.

FIG. 15 is a view showing a (first) example of content display of a user who has similar taste. In FIG. 15, "Taro" is searched as the user who likes a trip and displays contents of "Taro". Further, the contents of "Taro" and what kind of taste is resembling and how much it is resembling, subject of taste (trip in this case), and similarity level (89 in this case) may be displayed at the same time. The user understands: Taro went to a trip; and Taro has other interest than a trip, by seeing contents of "Taro". For example, there are photographs of trip and photographs of golf, soccer and fishing at the same time, in FIG. 15 and it is understood that "Taro" has an interest in sport, other than trip.

Figure 16:
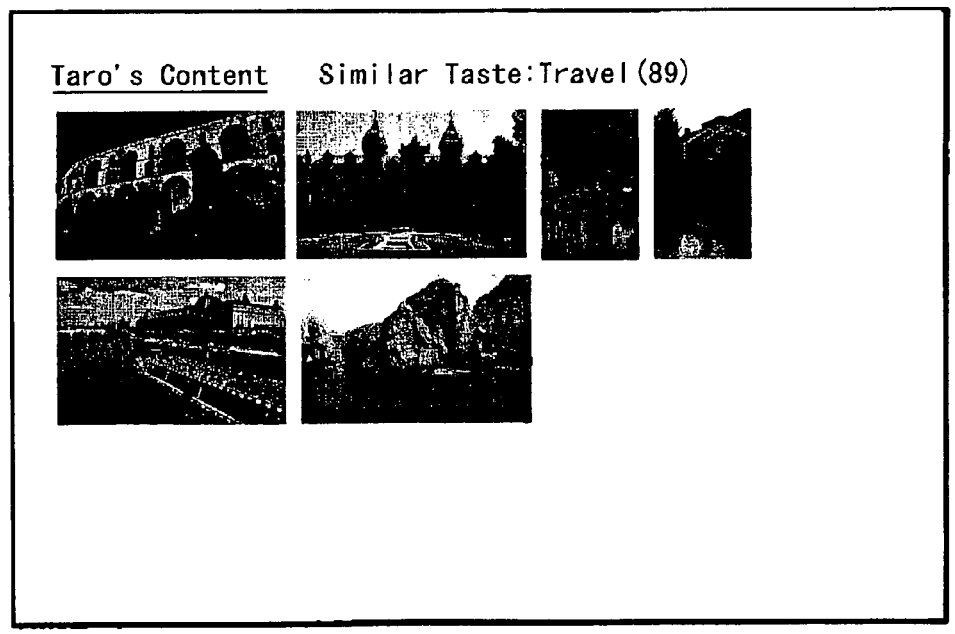
FIG. 16 is a view showing a second example of content display of user having similar taste according to an embodiment of the present invention.
Figure 17:
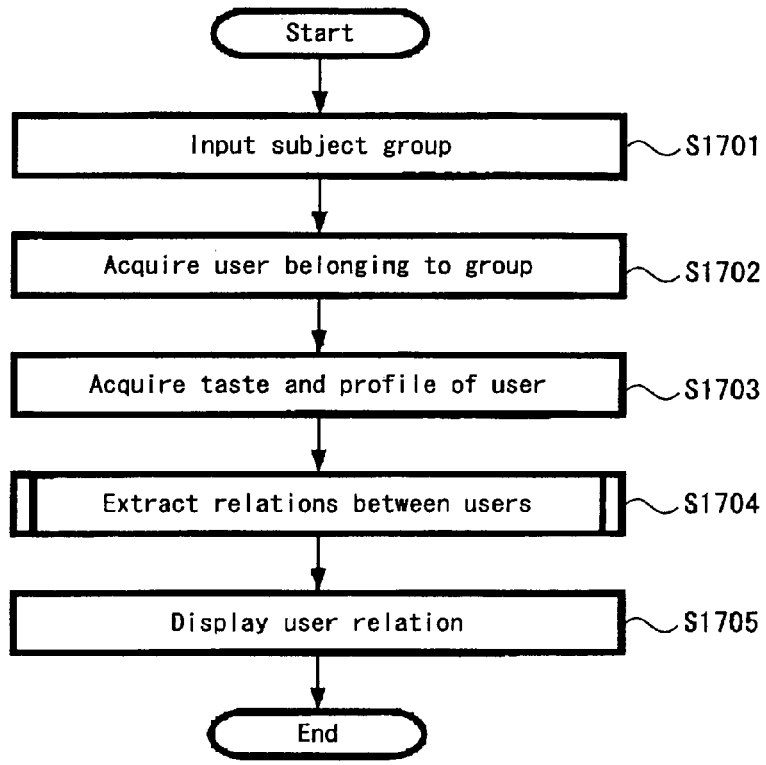
FIG. 17 is a flow chart showing a display processing of relationships in human network inside a group according to an embodiment of the present invention.

Further, the contents displayed may be limited to the content that the taste resembles. For example, in the case that a user has the taste for "trip", the contents relating to other than "trip" in the contents of the user who has a similar taste are deleted, because it is judged that there is no similarity of taste for the contents other than trip. A (second) example of display is shown in FIG. 16. That is, only contents with reference to "trip" from contents of "Taro" shown in FIG. 15 are displayed and, other than those, the contents of soccer, fishing, golf and so on are deleted. At this time, the judgment of whether or not to display may be done by determining an appropriate threshold of similarity level.

Which contents does correspond with user taste can be judged from metadata that each content includes. Metadata can be added by designating the kind of content (for example; "trip", "music", "meal" and so on) when a user stores contents. Alternatively, the place and time that the image was taken and others may be automatically added by using GPS and timer. Furthermore, information such as: what is the subject (human, things, scenery and so on, what type of picture is it (warm, cool, throb impression and so on), can be added as metadata.

Further, the user who owns contents can add the intention desiring other user to see the contents as metadata. For example, when a user owns content that is wanted to be seen by other users, a "recommendation level" to the content is set as metadata. The other user confirms the "recommendation level" as metadata and contents of a higher "recommendation level" is displayed preferentially. The "recommendation level" may be manually set when the user registers contents of subject, and may be automatically added by some method and any method may be used.

Alternatively, in the case where a title, comment and so on are added to the contents when a user stores contents, keywords are extracted from the title and comment by the keyword extraction section 220, and it may be judged whether or not the content corresponds to the taste of user. Further, not only the keyword of text data but also image data is extracted and, for example, the similarity level of taste such as preferable color and so on may be judged by matching the image or the like, or the sound data is extracted and, for example, the similarity level of taste such as preferable music so on may be judged by matching or the like by the sound signal processing. In this embodiment, only similarity level that used text data is a decision material.

The taste information managed in the user setting information management section 260 may be set from the contents information of a user. In other words, the user who stores contents relating to "trip" is judged as the one who has an interest in "trip" and, the interest level of "trip" is set to high. Accordingly, not only the taste information at the time when user joined the service, but also the taste information at present, becomes possible to maintain.

Next, the method by which a human network between users is extracted using system of this embodiment is explained. For example, what kind of connection is formed in the group and how about present relationship is, can be understood by extracting a human network of the user who belongs to a certain group. That is, a relation between human beings is judged as the importance level. Hereinafter, the processing which displays human networks within a group is explained, referring to a flow chart of FIG. 17.

First, the user selects a human network of a group to be extracted (step S1701). Group ID is acquired from the user setting information management section 260 when the group name is designated. A method is employed in which the group may be selected from the groups registered in advance in the user setting information management section 260 or may be input manually. Further, the human networks may be proposed to the user when a user newly joins a group.

Next, based on the group ID input in the above step S1701, user IDs of all users who belong to the group are acquired from group information managed in the user setting information management section 260 (step S1702).

Further next, with respect to each user ID acquired in the above step S1702, the profile and taste information that are managed in the user setting information management section 260 are acquired (step S1703). The profile such as academic career and business experience can be utilized to extract objective relationships in a human network. Namely, the relationships in the human network can be understood by extracting objective information such as senior or junior of university and colleague of company from the profile.

Figure 18:
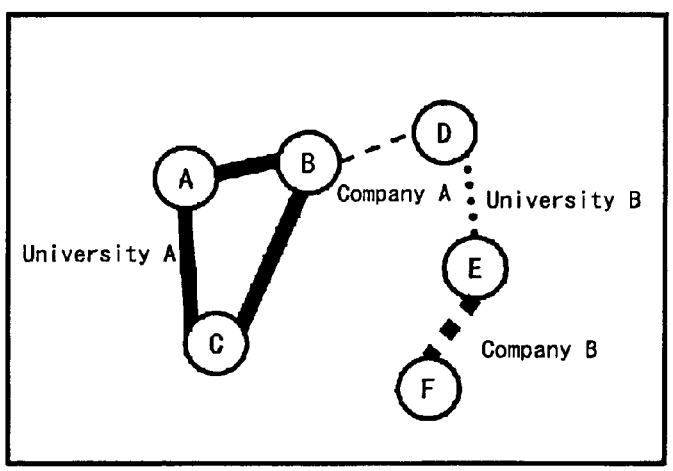
FIG. 18 is a view showing an objective relationship between human networks according to an embodiment of the present invention.

FIG. 18 is a view showing an example that expresses the relationships between human networks using only profile information. As shown in the figure, it can be understood that: a user A, user B and user C are the same university A graduates; a user B and user D are employees of the same company A; a user D and user E were in the same university B; and a user E and user F are employees of the same company B, and the use of the profile is useful to grasp the relationship between human networks.

Further, if the taste information instead of the profile information is used, it can be used to grasp objective relationship in human networks such as: with who whose relations well; with who whose relations bad; and whose taste resembles with who.

Further, the relationship between users is extracted using the taste and profile information acquired in the processing of the above step (step S11704). For example, attribute information shown in FIG. 19, other than the information shown in FIG. 13A, is managed in the user setting information management section 260 as the profile information.

In FIG. 19, the attribute information is a profile such as address, academic background, business experience and so on, which relates to the group and area that the user is belonging to up to now. The attribute information includes user ID, information ID, type, layered data, start date, end date and so on. The user ID is the same as the profile information of FIG. 13A and is the ID to specify the user. The information ID is the ID to easily manage the attribute information that each user owns. The type represents a type of attribute information such as "academic career", "business experience", "hobby" and so on. The layered data (data 1 to data 4) is data structure to easily manage the attribute information, and it becomes more detailed attribute information in the lower class. Generally, the attribute information such as: address, academic career, business experience and so on is usually made as the layered structure, however the attribute information not having the layered structure can also be managed as data of one layer (only data 1 in FIG. 19). The processing that extracts the relationship of users from the specific attribute information is described later on.

Further, the relationship between users can also be extracted using the interest level of taste information shown in FIG. 13C. In other words, the relationships in human networks may be extracted at the view points: who has the interest to who; and who and who have a similar interest. Alternatively, the relationship of user may be extracted by using both of profile information and taste information.

The relationship of users extracted in the above step S1604 is processed into appropriate display composition data in the display composition section 300 through the display content decision section 230 (step S1705). Display may be a graphical one that is shown in FIG. 18, or who and who have what kind of relation may be displayed with text data.

Figure 20:
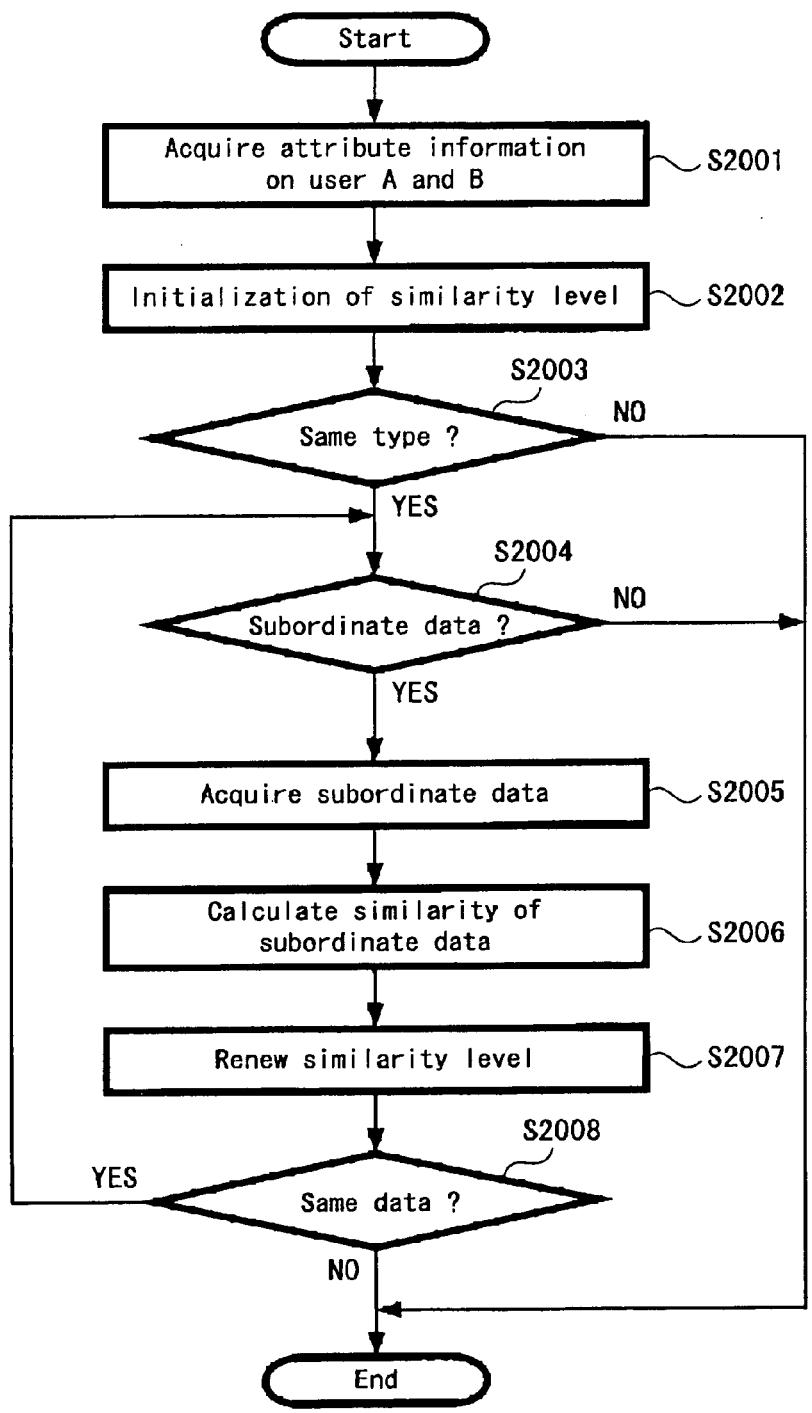
FIG. 20 is a flow chart showing an extraction processing of a relation between users (user A and user B) according to an embodiment of the present invention.

Here, the processing that extracts the relationship between users, particularly processing that derives a relationship from the attribute information stored in the user setting information management section 260 in the step S1704 (refer to FIG. 17) of the display processing flow chart of relationships in human networks in the above group, is explained referring to a flow chart of FIG. 20. In this example, although a relationship between two people of user A and user B are extracted, the relationship among three or more can also be extracted similarly. Further, here, the relationship between users is calculated quantitatively as the similarity level between users.

First, attribute information of two users of A and B is extracted respectively from the user setting information management section (step S2001).

Next, the similarity level of two users is initialized (step S2002). For example, the similarity level is set to 0.

Further next, whether or not the attribute information acquired belongs to the same type is judged (step S2003). If it is the same type, processing proceeds to the step S2004, and if it is not the same type, the processing ends.

Furthermore, with respect to data on two users referred at present, it is judged whether or not there is subordinate data (step S2004). Since there is no reference data in the initial state, it is judged if there is upper class data. For example, in the data of 10 (information ID) in U023 (user ID) of FIG. 19, "university A" of data 1 becomes high class data and "tennis club A" becomes subordinate data to "university A". Further, since there is no data after data 3, there is no subordinate data to "tennis club A". If there is no subordinate data, the processing ends.

The subordinate data of the two users judged in the above step S2004 is acquired (step S2005) and the similarity level of the subordinate data of the two users is calculated (step S2006). The similarity level may be a discrete value 0 or 1 and may be analogue value. For example, it is evaluated by whether it corresponds or not, such as: the similarity level between "university A" and "university A" is 1; and the similarity level between "university A" and "university B" is 0. Alternatively, "university A" and "junior college A" are the same affiliates, but are not the same university, and accordingly the similarity level may be 0.5, in this case. Further, in the case that data is geography information, the geographical distance may be used as the similarity level.

Further, the similarity level calculated in the above step S2006 is added to the similarity level of the two users (step S2007). At this time, the lower the class data is, the higher the ratio of addition is set. For example, assuming that "sum" is the similarity level of the two users, "value" is the similarity level calculated in the step S2006, "level" is the layer level calculated in the step S2006 and "ratio" is the predominance level of low class level, the similarity level of the two users can be renewed as:

sum=sum+level*ratio*value

For example, in the case that ratio=10 and the similarity level of the first and second layers from the top is 1, and the same, 10 is added to the similarity level of the first layer and 20 is added to the similarity level of the second layer. Accordingly, the more similar the low class data is, namely, the more similar the detailed attribute information becomes, the higher the evaluation of similarity level becomes.

At last, it is judged whether or not the data of the two users calculated in the step S2006 are the same (step S2006). If it is the same, the processing proceeds to the step S2004 to calculate the similarity level of further lower class data. If it is different, the processing ends.

In the flow chart shown in FIG. 20, although the similarity level of the attribute information of two users was explained, this processing is performed with respect to all combinations of attribute information that two users have. The similarity level finally calculated may be a maximum value of similarity level among those combinations, or may be a value in which all the similarity levels are added.

Further, a method of calculating a similarity level (importance level of content) is not limited to the method described above, but any method can be used. Further, the method of selecting content is not limited to selecting the high similarity level, and there is a case in which when selecting the low similarity level, favorable effect for user may be obtained. For example, in the case that the distance in the geography information is used as the similarity level, the short distance, namely content of lower similarity level is usually more useful.

Next, a method by which the importance level of content to a user is judged by using information on an environment where the user performing communication is placed is explained. For example, the communication is more activated when raising importance level of the content that the partner user has interest in and so on, by using information of the partner user who is communicating. Hereinafter, processing in the importance level judgment section 210 using the environment information of a user is explained referring to specific example.

Figures 21, 22:
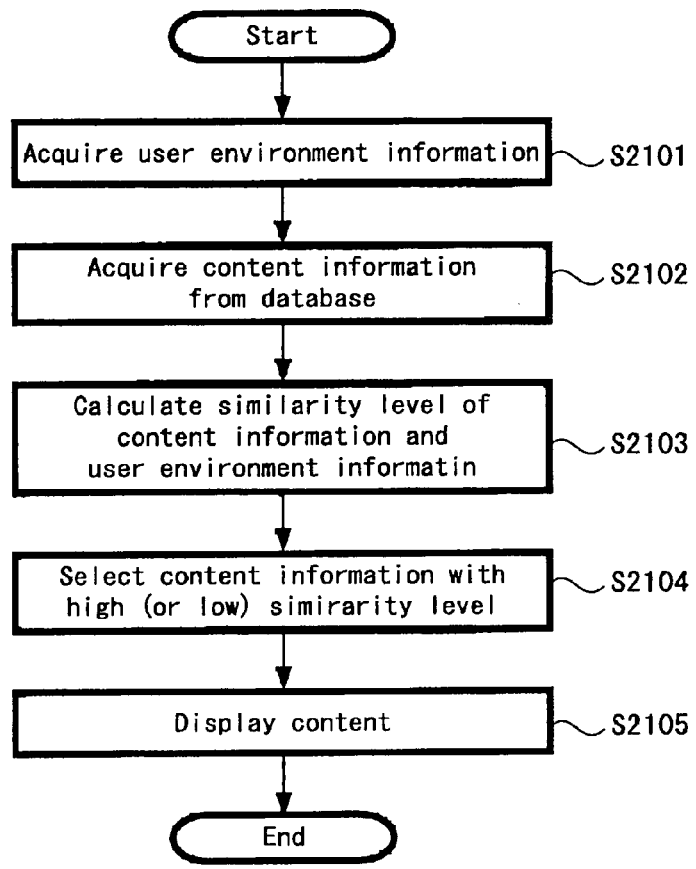
FIG. 21 is a flow chart showing importance level judgment processing using environment information of a user according to an embodiment of the present invention.
FIG. 22 is a table showing present position information of a user according to an embodiment of the present invention.

The method using user environment information, by which the judgment of an importance level is made and content of a high importance level is provided for user is explained along a flow chart shown in FIG. 21.

First, the importance level judgment section 210 acquires the environment information of a user using this system (step S2101). The specific content of the user environment information is described later on. Any method of acquiring the user environment information is employed, depending on the kind of environment information on acquisition subject. For example, it may be acquired using certain communication means from a client 100, and may be acquired from other application that the user is using simultaneously.

Next, the importance level judgment section 210 acquires content from database (contents preservation section 202) managed by the content management section 300 through the display content decision section 230 (step S2102). At this time, the environment information of the user acquired in the step S2102 is used as the key information of contents acquisition, and content in which metadata that is the same type as the key information is registered is acquired. However, data that is the subject of judgment of importance level is not necessarily included in metadata added to the content. Furthermore, as the condition of contents acquisition, for example, only contents that user contributed before may be a subject and so on.

Further, in this embodiment, although the importance level judgment section 210 receives content data through the display content decision section 230, content data may be directly acquired from the content management section 300.

Next, the similarity level is calculated using: content information acquired in the above step S2102 and metadata included in the content information, and the user environment information acquired in the step S2101 (step S2103). The method of calculation is described later on.

The display content decision section 230 judges the importance level of content from the similarity level obtained in the above step S2103 to be selected (step S2104). In other words, the importance level in this embodiment means the similarity level between metadata, included in the environment information, relating to that content and the input user environment information. Further, there is the judgment method in which the higher the similarity level is (namely it resembles), the higher the importance level becomes, and there is the decision method in which the lower the similarity level is (namely it does not resemble), the higher the importance level becomes.

Further, content data selected by the display content decision section 230 in the above step S2104 is arranged in appropriate layout in the display composition section 300 and is displayed in the client (step S2105).

By the above procedure, the importance level of each content is judged based on the environment information of a user and, contents that may be useful for the user can be provided.

Next, kinds of environment information of user are explained using specific examples.

For example, the present position information can be used as the environment information on the user. The importance level judgment processing in this case is explained along a flow chart shown in FIG. 21.

First, in the step S2101, the present position information on user is required using position information acquisition apparatus such as GPS. Further, any method of acquiring position information is used and the position information may be input manually, after a user searches the information with some method, for example.

In the above step S2102, content which has the position information as metadata is acquired from the contents database 202 included in the content management section 200 using the position information as the key.

Next, in the step 2103, the similarity level between position information on the content acquired and position information acquired in the step S2101. In this example, the distance between the present position of the user and the position information of the content information is set as the similarity level.

Finally, in step S2104, the calculated distance is treated as the importance level and the content of short distance (or long distance) is selected, and is displayed in the processing in step S2105. Needless to say, a plurality of contents to may be selected.

The specific data using position information is shown as FIGS. 22 and 23, for example. FIG. 22 shows the present position information received from a client, and includes user ID and the present position information. FIG. 23 shows content data in which position information is added as metadata, and such data can be content of subject of importance level judgment using position information.

The distance is calculated from the position information of FIG. 22 and position information on each content of FIG. 23, and the result shown in FIG. 24 is obtained. In the case that the calculation result of similarity level as shown in FIG. 24 is obtained, the importance level of content of the image A whose content ID is C001 is judged higher. This example is the one in which the smaller the value is, the higher the importance levels becomes, however another example in which the more the distance is, the higher the importance level becomes is also possible. The importance level is judged depending on the content of data of subject.

As described above, in the case that the method which judges the importance level of content using the position information as the user environment information is used, the content of the institution which exists in the position near the present position of the user, the photograph taken by himself and friends at that place in the past can be easily provided. As a more simplified example, map data around the present invention can be displayed based on the position information from a content data base in which map data is stored.

Not using the present position information on the user as described above, the importance level judgment method of content corresponding to a designated position information instead of the present position of the user is of course possible, such as to designate a position information when a map application and the like are used, for example. In other words, for example, certain map application is used and position information of displayed map is designated as the key information, and the importance level of content that includes the position within the area displayed as metadata is set high, whereby content within the area of the map is provided for a user.

As described above, information of other application (here, position information of map application) that a user is using simultaneously, is also treated as the user environment information and can be used as the key information of importance level judgment of content.

As the coordination with other application and other example that uses position information, there is a method that uses position information of the virtual world. For example, online game in which a user moves freely in the virtual world is considered as a subject. When performing the importance level judgment using position information in the virtual world as the user environment information, for example, the importance level of content data of the screen shot image acquired in the neighborhood and preserved in the contents database 202, is set high, and can be displayed on the screen and so on.

As the coordination with other application, for example, information that a user is communicating with other user by using a communication tool (for examples, chat, instant messenger and so on) can be used to the judgment of the importance level as the user environment information. In other words, by adding information on the communication partner to the importance level judgment, it becomes possible to make contents relating to the partner user display simultaneously while communicating, and the effect that communication is more activated can be expected.

Hereinafter, the importance level judgment method using the information on the communication partner as the user environment information is shown along a flow chart shown in FIG. 21. Here, one to one communication is to be a subject.

First, in the step S2101, information on the partner user whom the user is communicating is acquired as the environment information of the user. Any acquisition method can be employed, and for example, the user may manually input the information of the partner explicitly and the connection information may be acquired from the application by which communication is performed.

Next, in the step S2102, content is acquired using the user information on the connection partner as the key information. At this time, for example, the content in which the user information such as user ID and so on is added as metadata becomes a subject. Instead of using the unique information related to the connection partner such as user ID and so on, the content information may be acquired using metadata of the above attribute information or the above taste information.

In the step S2103, the similarity level is obtained using content information acquired in the step S2102 and the user information acquired in the step S2101. The calculation method of similarity level may be the same method as the case where the above attribute information or taste information is used. For example, various methods such as: the similarity level of content that includes user ID of the connection partner becomes high; the similarity level of content that includes the taste information of the connection partner becomes high; or the similarity level of content that includes both of taste information of the connection partner and taste information of self becomes high, can be used. Needless to say, the calculation method of similarity level is not limited to the methods that are described above, and any other method may be used.

Further, content is selected based on the similarity level in the step S2104, and the display composition data is made in the step S2105 and is provided for user.

By doing the judgment of importance level like this, the judgment that raises the importance level of content such as: photograph data taken with the connection partner and comment (text data) received from the connection partner, becomes possible, for example, and contents highly relating to the connection partner can be provided for the user preferentially.

In the above example, the importance level of content is obtained using the information of the connection partner that was registered in advance. Not only that, but also the information that becomes the key is acquired from among the data being communicated at present, and can also be a material of importance level judgment.

For example, when a user connects to a certain partner using the communication tool such as an instant messenger and chat and performs communication, a keyword is extracted from input text data by the keyword extraction section 220 and, the keyword or the keyword and user information of the connection partner can also be used as the key information to judge the importance level of content.

Here, although a keyword, namely text data is used as the key information, image data and sound data may be used as the key information. In other words, when the image data is given as the key information, the importance level judgment section 210 extracts from the contents database 202 content including image data and obtains the similarity level by doing matching and so on of the image. Similarly in the case where the sound data is given as the key information, also the content that includes sound data is extracted and the similarity level can be obtained by sound signal processing. In the case that the image data and sound data are used, any method can be used as the calculation method of the similarity level.

With the methods described above, the content corresponding to the situation of a user can be provided by deciding the importance level of content stored in the contents database using information such as: situation in which the user is placed; connection situation of the user; and others.

For example, in the case that a plurality of pictures are contributed to the contents database, only the pictures of an event (trip for example) performed by a certain group are collected to be made as an album, are printed, and are made them into a slide show; and the application services as such can be easily performed.

In the embodiments having described, the methods in which the importance level of content is obtained using the contribution record information and reading record information of content, the user setting information and user environment information, however some or all of those can be combined to judge the importance level of content.

In other words, for example, in FIG. 9, judgment is made using the contribution record and reading record of content in the first judgment section 210a within the importance level judgment section 210, the judgment is made using the user setting information in the second judgment section 210b and in the third judgment section 210c, the importance level is obtained and judged using the user environment information or using a keyword by means of the keyword extraction section 220; and also all of those are combined to obtain the importance level of content.

According to the embodiment described above, the importance level of content is decided using utility record and setting information of a user and environment information in the content sharing system, so that contents that corresponded to interest, situation, environment and others of the user can be provided easily regardless of text data and various media data.

Next, another embodiment of the present invention is explained. This embodiment is to notify a notice message that is valuable for a user to a client and an outside tool appropriately, in the condition in which a user uses a plurality of devices and clients in a content sharing system.

Figure 25:
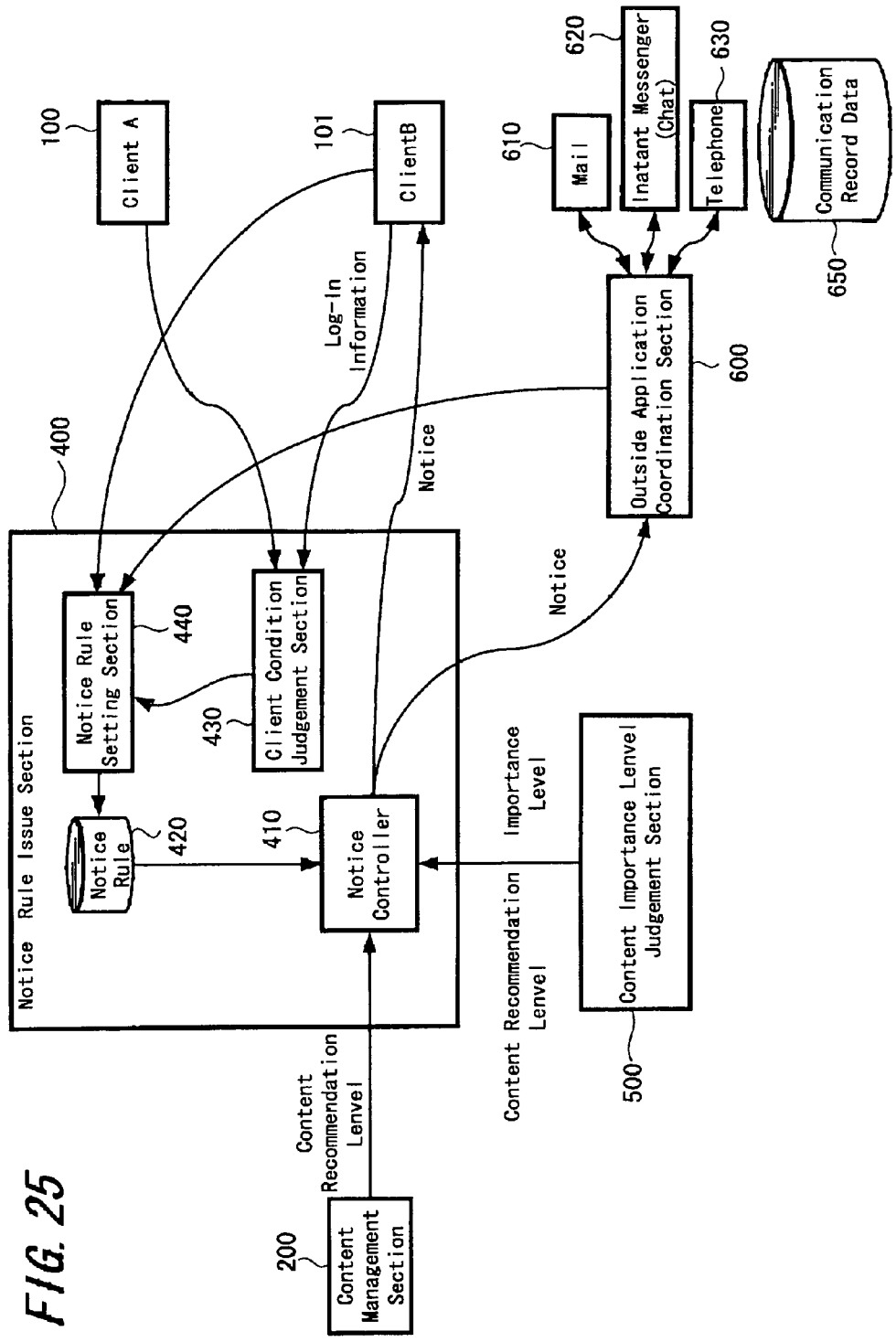
FIG. 25 is a diagram showing a system configuration according to another embodiment of the present invention.

FIG. 25 shows a system configuration of another embodiment of the present invention. The configuration of FIG. 25 is obtained by adding a notice issue section 400 and content importance level judgment section 500 to the system shown in FIG. 1. The notice issue section 400 may be added to the system shown in FIG. 9; or a function of the notice issue section 400 is included in the display content decision section 230. Note that, in FIG. 25, the display composition section 300 shown in FIG. 1 is omitted.

The notice issue section 400 shown in FIG. 25 includes: a notice controller 410 which controls each function and issues a notice message to an appropriate address according to a notice rule; a notice rule preservation section 420 which preserves the notice rules; a client condition judgment section 430 which judges a client condition; and a notice rule setting section 440 which modifies notice rule setting corresponding to an instruction from a client condition or client.

Further, an outside application coordination section 600 is the one that takes correspondence between the notice controller 410 and outside application software (hereinafter called "application"), and notifies the mail 610, instant manager (chat) 620, telephone 630 and so on of the notice message, for example based on the instruction from the notice controller 410.

An example of a notice message processed in this embodiment is shown in FIG. 26. The notice message includes: type; importance level; issue date; the term of validity; and type dependent data.

Here, the type shows an event notified in the content sharing system. As a kind of notice,
  contribution of a comment or image to his/her own content container or a container of interest;
  a comment after the comment by himself/herself;
  content that is active;
  contribution of the person who contributes after long time;
  activity of the group;
  the relationship with other users (such as: there is no communication recently); and so on
are conceivable, but not limited thereto.

Further, the importance level is an index set to all notice messages and shows how much value the notice has for a user who receives the notice. The importance level of notice is a value calculated by the content importance level judgment section 400 and other modules, and it may be a binary value as 0 or 1, or may be 256 stages of evaluation as 0 through 256. In this embodiment, in order to simplify the explanation, six stages of evaluation as 0 through 5 is used, where it is defined that 5 is most important and 0 is the one that needs not to notify.

Further, the term of validity may have a structure in which if the notice is not issued within the term of validity by some reasons such as; if the notice is not notified within renewal intervals or is notified neither to client nor mail temporarily, the term of validity is discarded.

An actual notice message includes data relating to the notice content (type dependent data) corresponding to the type of the notice, and that content may include: ID that designates content; hyperlink; metadata of content; and the media data.

Next, the notice rule of this embodiment is explained. The notice rule is set to all users and is the setting information relating to the notice set to a client or outside tool individually or the notice set to all clients in common. All the notices are issued to clients or to outside tools based on the notice rule. For example, in the case that the notice rule is set to each of clients or outside tools, the one shown in FIGS. 27A to 27C is conceivable.

FIGS. 27A to 27C show examples of notice rules in the case that each client has each notice rule, in which FIG. 27 is of a client A; FIG. 27B is of a client B; FIG. 27C is of a mail system.

Here, a notice destination is a client or outside tool to which the notice is issued. Further, an active condition is the condition that indicates whether or not the notice is issued to a client and is represented as ON or OFF. This active condition may be exclusive or may be redundant with respect to other rules. Further, an importance level threshold is the threshold to decide the importance level of the notice to be issued and, for example, it is used such that the notice of an importance level 3 or more is issued.

Furthermore, a notice interval is the interval when the notice is issued. For example, the notices by mail can be collected in fixed intervals to be notified. In the case of a pull type client or pseudo-push type client, that can be a polling interval thereof. The notice interval may be preserved in the client if the client is the pull type or pseudo-push type.

The type, importance level threshold and notice interval may be common to all clients.

Further, a notice to one client or one outside tool may include a plurality of notice rules. For example, the one shown in FIGS. 28A and B is conceivable. In this example, in the notice rule 2 (FIG. 28B), the one that is important (equal to or more than 5 of importance level) is notified instantly, and in the notice rule 1 (FIG. 28A), the notice is notified to the mail address designated as the notice destination by mail once an hour.

In the notice controller 410 in the notice issue section 400, the notice is practically issued to an appropriate client according to the notice rule. A flow chart of basic processing performed in the notice controller 410 is shown in FIG. 29 and is explained in the followings.

Figure 29:
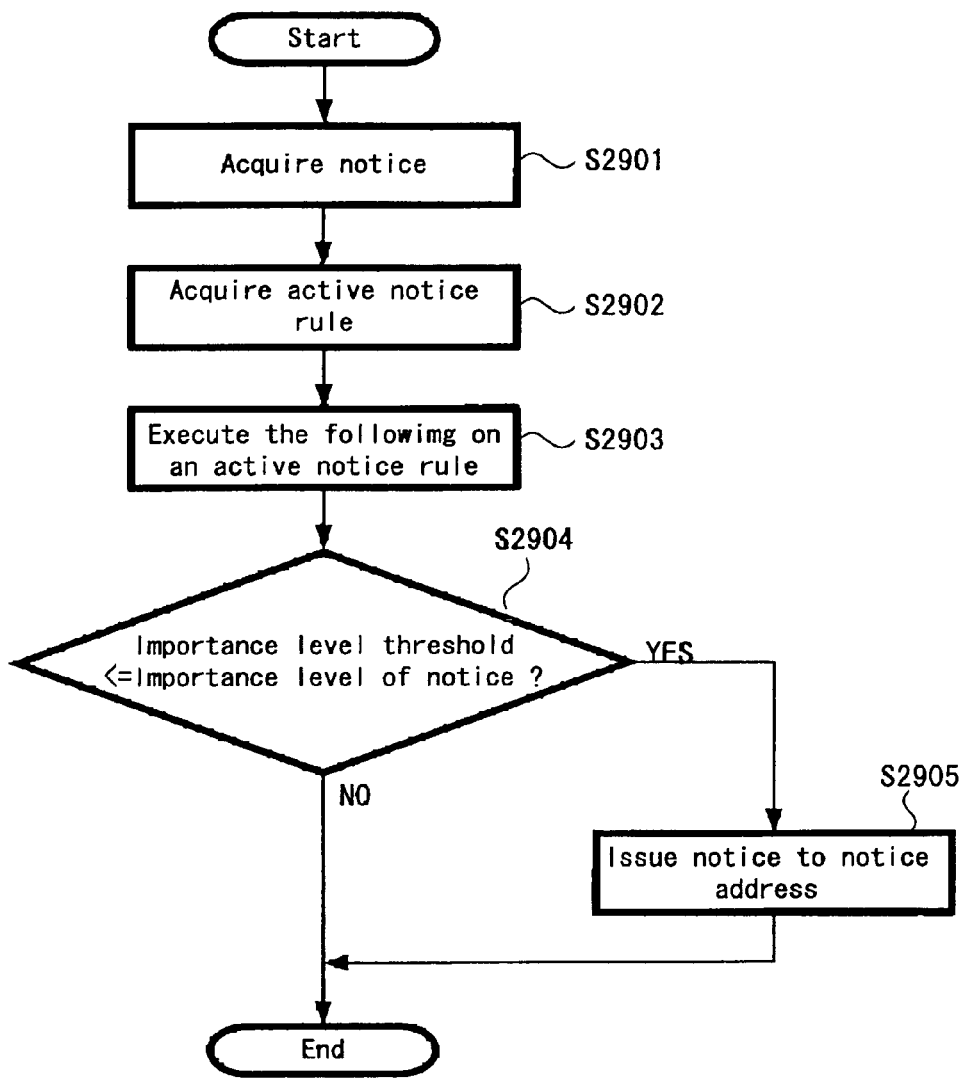
FIG. 29 is a flow chart showing basic processing of a notice issue section according to another embodiment of the present invention.

In FIG. 29, at first, a notice as described above is acquired (step S2901). Here, the notice may be detected with an action of contribution of comment and image as a trigger, or one to be notified may be polled in a fixed interval. As an example of the method that detects the notice having the importance leve, there is a method based on the user taste data, which is explained later on.

Next, an active notice rule is acquired and decides a notice destination (step S2902). This is sufficient to see the active condition of the notice rule. A method by which the active condition is changed is conceivable as follows.

First, there is a method in which log-in information of a client is acquired in the client condition judgment section 430 and the notice rule corresponding to all clients who log in is activated. Alternatively, there is a method in which only the notice rule of a client who logged last is activated.

Further, if there is no client who logs in, a notice is issued by mail in coordination with the outside application coordination section 600. A mail address to which the user notifies can be set as the notice rule in advance. One user may set a plurality of mail addresses as the notice rule respectively. In that case, the notice may be sent to all the mail addresses or to one of the addresses selected in advance.

As the other means that uses a mail, the notice may be issued to the outside application such as an instant messenger 620 and so on, for example. Further, a method that uses the telephone 630 (for example, so-called one call and cut) instead of the notice is conceivable. In this case, the transmission source may be changed depending on the importance level.

Furthermore, the notice destination may be decided dynamically by the user operation (manual operation) on the client. For example, the notice rule corresponding to the latest client is automatically activated. Further, if a notice destination change button is pushed, the notice is made thereto. Alternatively, the destination is selected from the notice destination list. The above is considered.

Furthermore, the notice destination may be changed by the outside tool. For example, after sending a mail to a specific mail address (for example, "user name"-start@lifechannel.net) of each user, the notice to the transmission source (From:) of that mail is started.

Figure 30:
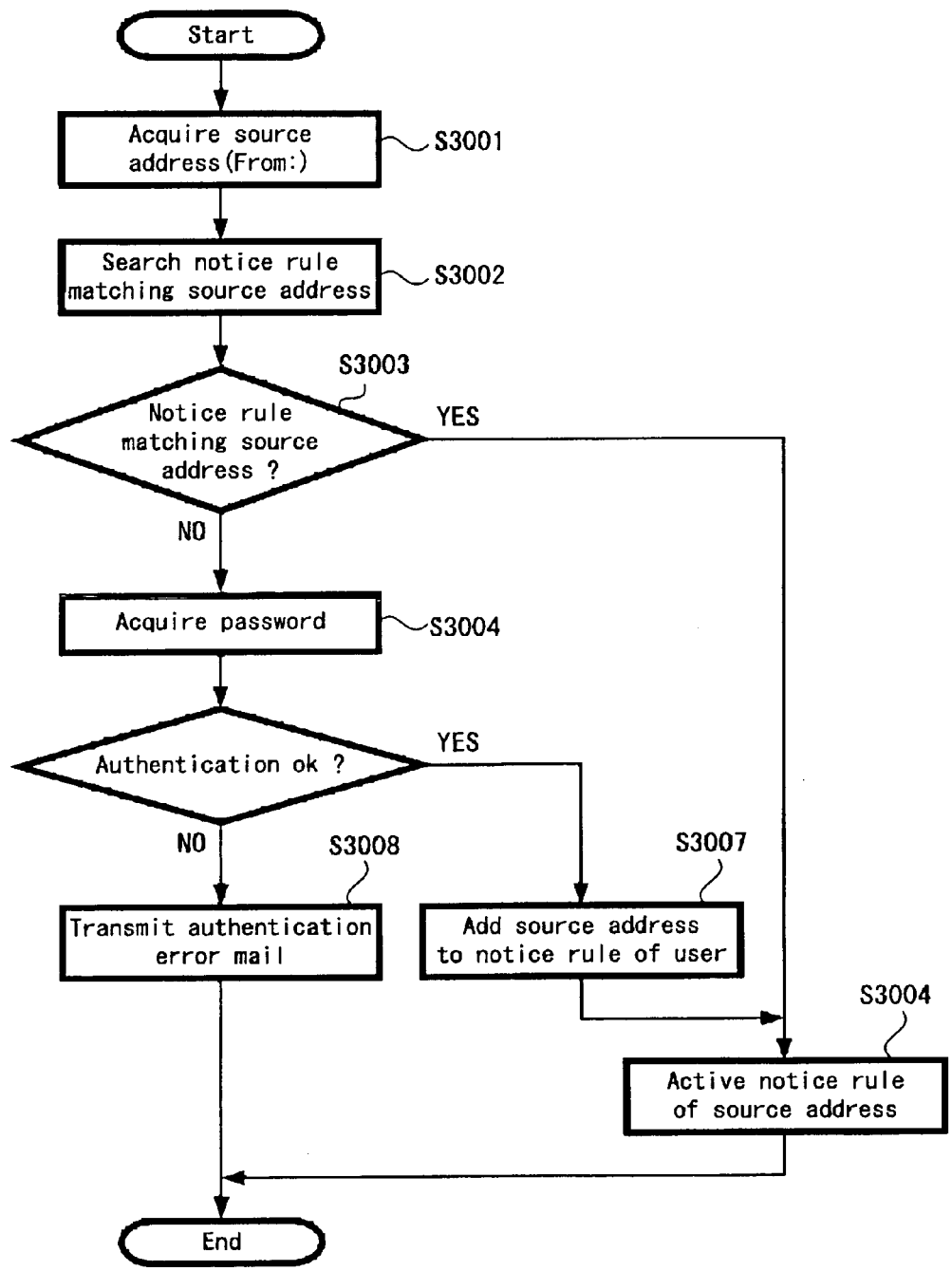
FIG. 30 is a flow chart showing modification processing of an active condition by mail according to another embodiment of the present invention.

FIG. 30 is a flow chart in the case that the notice destination (active condition) is set by mail. First, the system shown in FIG. 25 analyzes the transmission source (From:) of the acquired mail, when receiving the mail (step S3001). The notice rule that matches the transmission source is searched (step S3002), and whether or not there is the notice rule that matches the transmission source is judged (step S3003).

If this transmission source is registered as a notice rule of the user, the notice rule is activated (step S3004), and the processing ends. If this transmission source is not registered, a password written in the text (body) of mail is acquired for example (step S3205), and authentication is performed (step S3206). If authenticated, the transmission source is registered as the transmission source of the user that is indicated by the user name (step S3207) and the operation flow proceeds to the step S3004 and the notice rule is made to the active condition.

The default notice rule of may be used as the notice rule and the existing notice rule may be copied. If the authentication fails, the authentication error message is sent (step S3208). In this case, the method of writing the password is included.

The notice rule corresponding to the transmission source of that mail is made inactive after sending mail to a specific mail address (for example, "user name" lifechannel.ne.jp) of each user.

When the notice mail is received, the notice rule corresponding to the mail address is made inactive or is made inactive temporarily, after replying to that mail.

Further, the change of active condition may be controlled by a command buried in the text (body) or the subject. Furthermore, the transmission source of mail is common to all the users and the user name may be included in the subject or text.

If the active notice rule is specified in the above step S2902, the following processing is performed on each notice rule (step S2903). Comparing the importance level of the notice message (refer to FIG. 26) and the importance level threshold of the notice message, and if the importance level of the notice is more than the importance level threshold of the notice, the notice rule is actually notified to the destination (step S2904).

In the notice of an actual notice message, the notice message may be temporarily stored in a predetermined notice spool and is sent therefrom. The spool may be unique to a notice rule or may be common to all notice rules. In the case that the spool is unique to each notice rule, after judging a notice based on the notice rule, the notice is stored in the spool. In the case that the spool is common to all notice rules, after being stored in the spool temporarily, all notices are actually notified based on the notice rule.

For example, in the case that the notice interval is not prompt; after storing the notice message in the spool temporarily, the notice is actually notified in the timing of next notice. Further, in the case that one user is using a plurality of clients (devices) for example; the message may not be issued to the other clients when a message is issued to any one of clients.

Next, the change of a notice rule is explained. First, an automatic modification of the notice rule data by the feed back from a user who is notified is conceivable. As described in the change of an active level of the notice mail, there is a method in which by replying to the mail after a user has received a notice mail, the notice rule corresponding to the mail address is made inactive or is temporarily made inactive, for example. Further the change of the active condition may be controlled by a command buried in the subject or text. Further, the transmission destination may be common to all the users and the user name is included in the subject or text.

Next, a method in which the notice rule is automatically set based on the communication record, namely according to the activity of a user, is explained. This method is the one in which the importance level threshold of the notice rule of client who uses frequently or the importance level threshold of all notices are temporarily lowered to promote the activity, when the activities of comment and image contribution decrease.

Further, as another method, a method that changes the importance level threshold of the notice rule automatically based on the client condition is conceivable. As an example, an operation on the client is detected and the importance level threshold is changed. For example, the importance level threshold is set low if there is frequent access on the client and that is set high if there are few accesses on the client. Accordingly, only the important one comes to be notified when it is in background. Further, when seeing the load average of PC, the importance level threshold is lowered if the load average is low. Alternatively, when seeing the kinds of active PCs, the importance level threshold is changed and other settings are considered.

It is possible to persuade the user to see certain content, and to refrain from the notice message inversely depending on the activity condition of the client, by these notice rules. For example, when the load average value is high, PC may be executing many programs and namely it is expected that user is also busy and the judgment can be done such that user may not want to receive a notice except for ones of very important notice.

Figure 31:
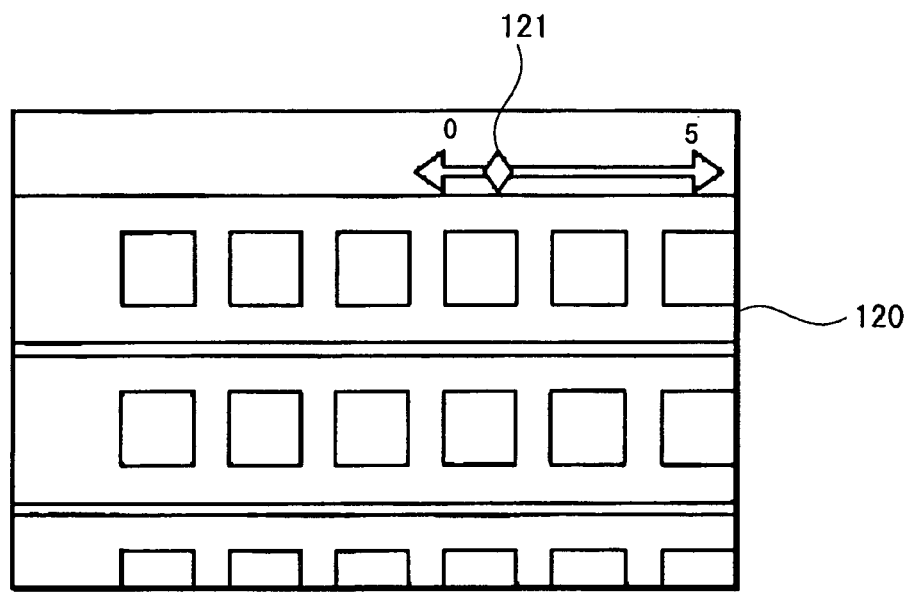
FIG. 31 is a view showing a slide bar for modification of an importance level threshold according to another embodiment of the present invention.

On the other hand, a method which modifies manually the importance level threshold of the notice rule is conceivable as follows. First, the one in which a slide bar used for the importance level change is provided on a user interface of client is conceivable. An example of the importance level change slide bar is shown in FIG. 31. In FIG. 31, a reference numeral 120 denotes a user interface of a client and in this example, the importance level can be changed by six stages from 0 through 5 by shifting a pointer of the importance level change slide bar.

Figure 32:
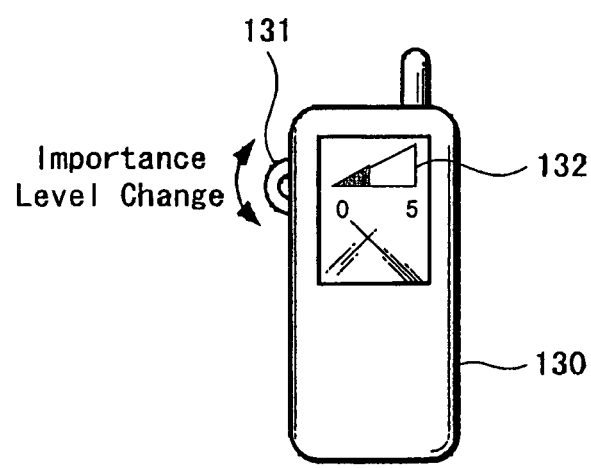
FIG. 32 is a view showing a jogdial for modification of an importance level threshold according to another embodiment of the present invention.

As a second method, a jogdial for the importance level change is installed in a portable apparatus such as mobile phone unit. FIG. 32 shows an example of a jogdial for the importance level change. An importance level change jogdial 131 is provided at a predetermined portion of a casing of a mobile phone unit 130 and an importance level display 132 can be changed by operating the jogdial 131.

Figure 33:
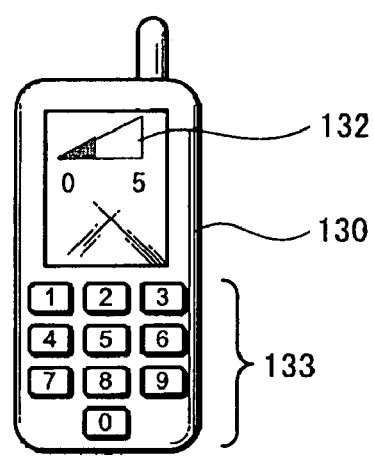
FIG. 33 is an explanatory view of modification of an importance level threshold by ten keys according to another embodiment of the present invention.

As the third method, a ten-key is used. FIG. 33 is a view for explaining the importance level change by the ten-key. For example, on a mobile phone unit 130, buttons of numbers of a ten-key 133 is mapped to the importance level threshold as it is. For example, the importance level threshold display 132 changes such that: if "0" is pushed, the notice rules becomes inactive; if "1" is pushed, the importance level threshold is set to "1"; and if "5" is pushed, the importance level threshold is set to "5". Needless to say, it may be a ten-key of a keyboard and so on.

Figure 34:
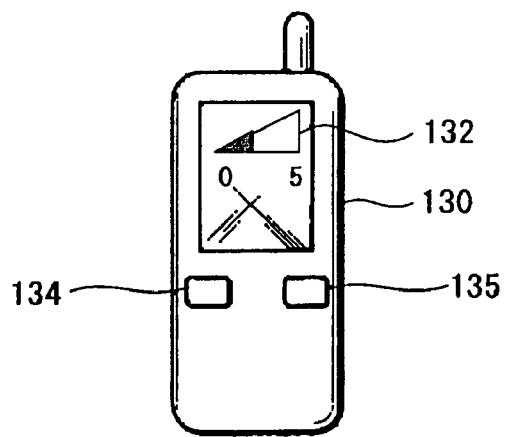
FIG. 34 is an explanatory view of modification of an importance level threshold by performing a long push of button according to another embodiment of the present invention.

Alternatively a method of pushing a physical button for a long time is conceivable. FIG. 34 is a view for explaining change of the importance level threshold by pushing a button for a long time. For example, the importance level threshold is set by a time in which a physical button such as a specific button on a mobile phone 130 is pushed. For example, the importance level threshold is made high if an importance level threshold button 134 is pushed long, and there is no notice if the button is pushed not long. Further a notice stop button 135 may be provided and a notice stop setting may be set.

Further, the notice rule is registered in a template such as "work mode", "home mode" and so on, and may be selected from the list. In this case, the template can also be changed by the method as described above.

Furthermore, a method in which the notice rule is changed by the outside tool is conceivable. This is the one in which commands to change the importance level threshold and the above notice rule template are buried in the text of mail and the notice rule to that transmission source is changed.

Further, the change of notice rule data to a certain client may influence the notice rule data of other clients. For example, when the importance level to a certain client is lowered, the importance level of another client is increased.

Further, when the notice rule is changed, whether or not a notice that matches a new notice rule exists may again be detected.

Next, a method which modifies content of a notice message in accordance with a client and the kind of outside tool is explained. In this method, content of a notice message is modified corresponding to a client of notice destination and the outside tools such as mail. For example, only text such as a title or body is employed in mail, or it is summarized and sent, in case of mailing in a fixed interval. For example, it is summarized so that data capacity of mail becomes lower than a predetermined value (a few KB, for example).

Further, a method that changes the notice method corresponding to the importance level is explained. An action (means) that tells the arrival of notice may be changed corresponding to the importance level on the client side. For example, the followings are conceivable:

- the strength of vibration is changed corresponding to the importance level;
- level, tempo, musical interval, tune and so on of sound are changed corresponding to the importance level;
- strength, color, flickering pattern and so on of light such as LED (Light Emitting Diode) are changed corresponding to the importance level;
- time of popup, size thereof, transparency, color, animation and so on are changed corresponding to the importance level;
- electricity stimulation and others.

Further, a method to set another user as a notice destination is explained. The notice destination may be another user who is different from a user who contributed. For example, when another user gave comment to a content that a certain user contributed, a notice message can be sent not only to the user who contributed the original content but also to the user who commented. Alternatively, furthermore, the notice message can be sent to a third party, and may be used for questionnaire and so on.

Figure 35:
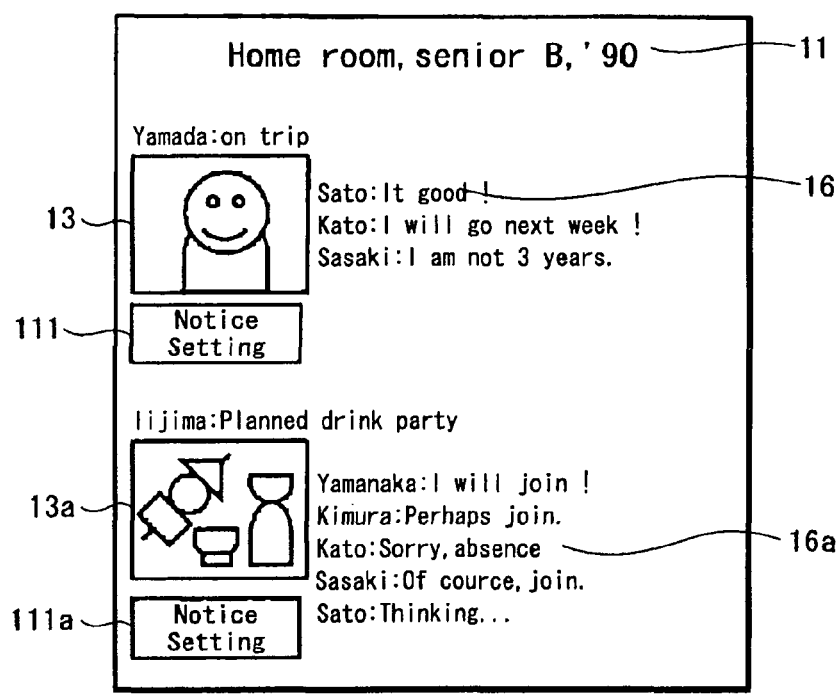
FIG. 35 is a view of an example of a content container display screen according to another embodiment of the present invention.

FIG. 35 shows an example of a content container display screen in which another user can be set as a notice destination. The notice setting buttons 111 and 11a that make respective groups are arranged and a contents producer pushes this button to display the notice setting, and thereby a notice message is also sent to the user who contributed a comment. In this case, a comment contributor knows in advance that a notice message is delivered. Further, instead of pushing a setting button, right-clicking for the content can be used.

Next, the case in which content of a notice message is modified corresponding to the notice subject event is explained. The content or method of notice message is modified corresponding to an event that caused the notice. For example, the notice is performed by the message and notice method prepared beforehand, in accordance with whether or not a specific string is included in a comment for the content.

By combining the notice method to another user that was described above, for example, the followings can be obtained:
  preparing quiz, with a certain user contributing contents;
  replying to the quiz, with another user contributing contents;
  delivering a notice that is a correct answer or incorrect answer to the user who set questions and to another user who set a reply; and
  delivering the same notice to a third party to set for making up total.

Next, a method that judges the content importance level based on content information and taste data of a user (content container, contents and other users) is explained.

Figure 36:
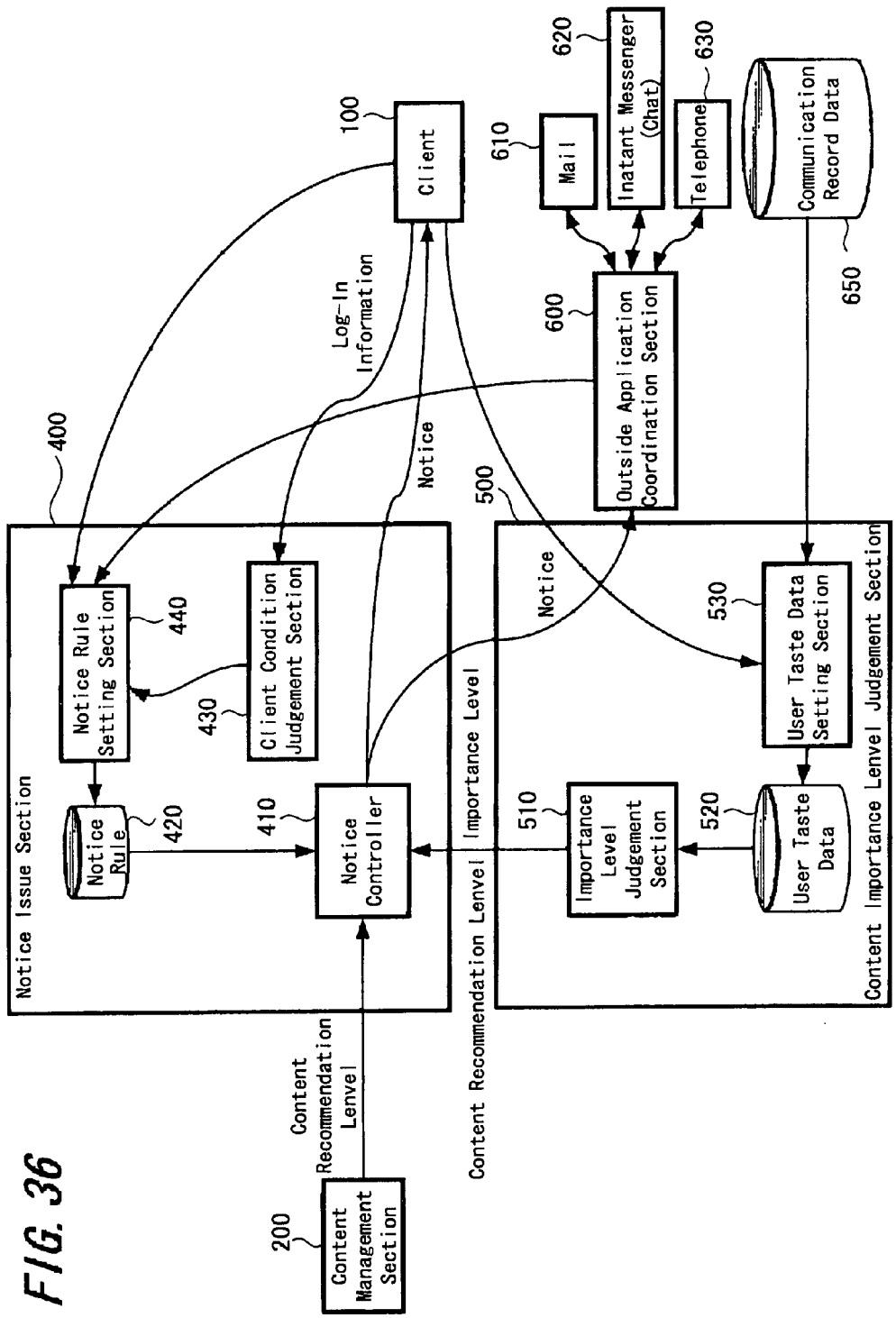
FIG. 36 is a diagram showing a system configuration according to further another embodiment of the present invention.

FIG. 36 is a system configuration according to further another embodiment of the present invention and represents a detailed block configuration within the content importance level judgment section 500 shown in FIG. 25. The content importance level judgment section 500 includes an importance level judgment section 510, user taste data preservation section 520 and user taste data setting section 530.

The importance level judgment section 510 constituting the content importance level judgment section 500 judges the importance level of content from the user taste data stored in the user taste data preservation section 520 and the contents information sent from the notice controller 410, and the judgment result is transmitted to the notice controller 410.

The user taste data preservation section 520 can preserve a content container, contents, and user taste data with respect to other users.

Further, the user taste data setting section 530 sets and modifies user taste data based on various information items that are described later on.

Figures 37A, 37B, 37C, 38:
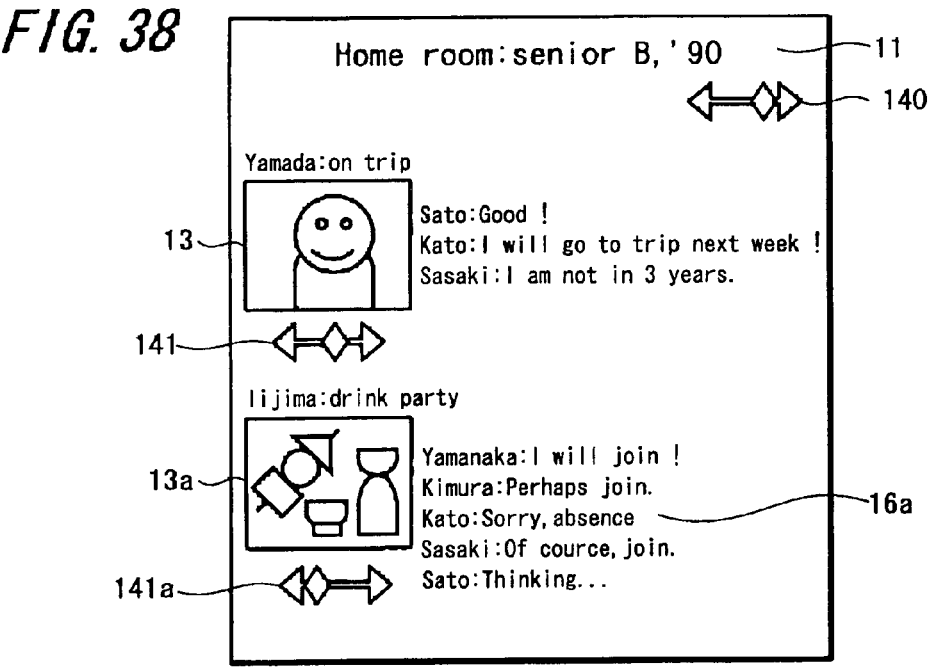
FIGS. 37A to 37C are tables showing an example of user taste data according to further another embodiment of the present invention.
FIG. 38 is a view showing an example of an interest level slider according to further another embodiment of the present invention.

Hereinafter, a method to set user taste data is explained. FIGS. 37A to 37C show an example of user taste data and, in which FIG. 37A is of a content container, FIG. 37B is of contents, FIG. 37C is of taste point for a user, respectively. In this example, 3 is the taste point for a content container CS1. Similarly, 5 is the taste point for a content C1 and 2 is the taste point for user U1. The numerical value of the taste point becomes large as the interest of user in the subject becomes higher.

These user taste data can be set manually using a user interface screen as shown in FIG. 38, for example. In this example, an interest level slider 140 to set a taste point for the whole content container and interest level sliders 141 and 141a to set the taste point for individual contents are used respectively, and a taste point can be set by shifting each pointer of slide bars toward the right and left. In addition, other methods than this, such as using dial, button and so on which sets numerical values may also be used.

Further, as a method that sets user taste data, it is also conceivable to modify user taste data temporarily depending on a client condition. For example, in the case that the present position information of a client can be acquired from GPS and so on, the user taste data setting section 530 may modify the taste point for content that includes position information close to the present position of the client to temporarily become high, and so on.

Next, a method that automatically modifies user taste date based on the communication record is explained. This is the one that modifies user taste data based on the operation contents of the user in the past. First, the user taste data setting section 530 acquires the past operation information of the user from communication record data. The following information items are obtained from the operation information in the past, for example.

In the case that a user newly contributes content:
  the content;
  the content container to which the content is belonged; and
  the day and time when the content is contributed.

In the case that a user gives comment to existing content:
  the content;
  the content container to which the content is belonged;
  a user who first contributed the content; and
  the day and time when user gives comment to the content.

In the case that a user marks "favorite" on the content, content container or the user.

For example, in the case that a user newly contributes content, the user taste data setting section 530 automatically sets the point of taste data high for the content and content container. Accordingly, the user may keep the interest high for the content and content container to which he/she has contributed.

Further, the user taste data setting section 530 can gradually change the point of taste data to be low automatically for the content and content container depending on the time lapsed from day/time when content was contributed. Accordingly, for the content and content container that was contributed by the user himself/herself, the user can have a high interest immediately after contribution and gradually the interest thereof is changed to be low.

Next, in the case that a user gives a comment to existing content, the point of taste data for the content, content container and user who contributed contents, is increased automatically by the user taste data setting section 530. Accordingly, the user can keep the interest high in the content to which he/she gave comment, content container, and the user.

Further, the point of taste data for the content, content container and user who contributed the content, is changed automatically gradually low by the user taste data setting section 530, depending on the time lapsed from day/time when content is contributed. Accordingly, for content that is contributed by self, content container and the user, the user can keep the interest high immediately after contributing and the interest is gradually changed to be low.

A user can register a certain content and content container or a specific user as "favorite" of himself/herself. The contents and content containers or specific users registered as favorites, are later able to be referred to easily. The taste data point for the content and content container or specific user is automatically increased by the user taste data setting section 530, if registration by the user of a content and content container or specific user as favorites is detected.

The user taste data setting section 530 can request confirmation for a user when the point of user taste data is automatically changed. Accordingly, the change of user taste data that is not intended to can be prevented.

Next, a method that automatically modifies user taste data based on the feed back of a user for a notice is explained. When user receives a notice, a reply with respect to the notice is made before actually reading contents. Further, the user taste data setting section 530 modifies the user taste data automatically based on a reply of the user. The operation flow is as follows.

First, a notice is issued to a client from the notice controller 410 in the notice issue section 400. At this time, the notice at least includes the followings. Namely, those are the content, content container and information on a user who has contributed.

A user evaluates whether or not the notice was useful before actually reading contents, when receiving the notice. If the user does not want to receive similar notices to this, a reply indicating that the notice is not necessary is made. Further, if the user wants to receive similar notices to this willingly, a reply indicating that notice is welcome is made. A reply is not necessary if it is neither of them.

The reply of user is delivered to the user taste setting section 530. The user taste setting section 530 increases or decreases the taste point of user taste data, corresponding to the content of reply from the user.

Next, a method in which a contents producer sets the recommendation level to the content information is explained. In the case of this method, the recommendation level to users can be set for each of contents or content containers in addition to each user taste data. The recommendation level of a content and the recommendation level of a content container can be set with respect to a specific user or can be set with respect to unspecified users.

Figures 39A, 39B, 40:
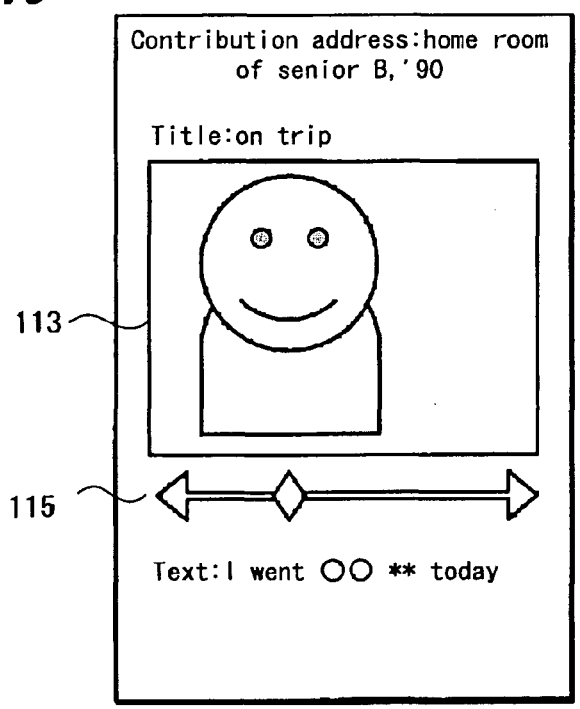
FIGS. 39A and 39B are tables showing an example of user recommendation data according to further another embodiment of the present invention.
FIG. 40 is a view showing an example of recommendation level setting according to further another embodiment of the present invention.

FIGS. 39A and 39B show an example of data type of the user recommendation level, in which FIG. 39A shows a content container recommendation level and FIG. 39B shows a content recommendation level, respectively. As shown in FIGS. 39A and 39B, the user recommendation level data includes each taste point and subject user.

In this example, for example, there is included the information that 3 is the recommendation level of the content container CS1 in FIG. 39A for a user U3, and 1 is the recommendation level of the content container CS2 for all the users. In the content of FIG. 39B, similarly, there is included the information that 2 is the recommendation level of the content C1 for all the users, and 3 is the recommendation level of the content C2 for a user U2, for example.

The content recommendation level and content container recommendation level may be designated as follows, for example:
- a subject user and recommendation level are designated simultaneously when a user contributes contents;
- with respect to the existing content, a user later designates a subject user and recommendation level; and
- the contents controller 200 sets a subject user and recommendation level automatically, based on the number of comments added to contents and the number of times the content read.

FIG. 40 shows an example of a user interface that performs recommendation level setting. In this example, a slider 151 that can set the recommendation level of contributed content including picture 113 is provided and a user can set the recommendation level freely by shifting a pointer of the slider toward the right and left. This recommendation level setting slider is identified in the content container of contribution destination.

Figure 41:
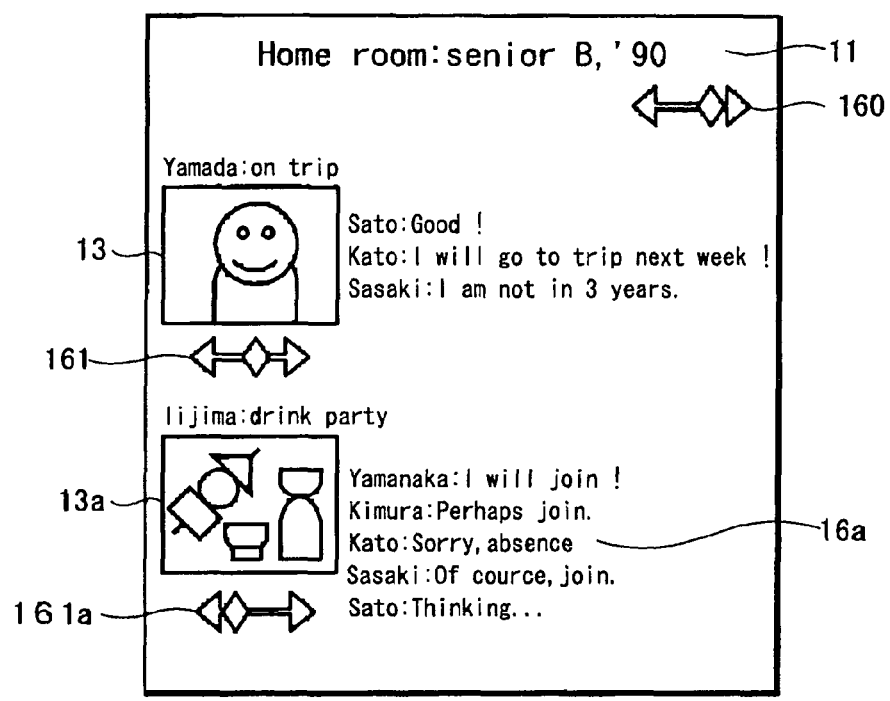
FIG. 41 is a view showing a recommendation level slider according to further another embodiment of the present invention.

FIG. 41 shows an example of a content container display screen in which content is contributed as shown in FIG. 40. In this example, a slider 160 that sets the recommendation level to all the content containers and sliders 161 and 161a that set the recommendation level for individual contents are used; however, various other methods than this, such as dial, button and so on, can be used as long as it is a method that a numerical value is set.

Next, a method that sets a notice rule when content is prepared is explained. When a user contributes content, the user can set an action when comment to the content is attached. For example, following actions are conceivable:
- selecting whether or not notify to himself/herself that there is a comment;
- sending a message to the user who gave the comment when there was a comment; and
- sending a different message corresponding to content of the comment to the user who gave the comment when there was a comment.

Figure 42:
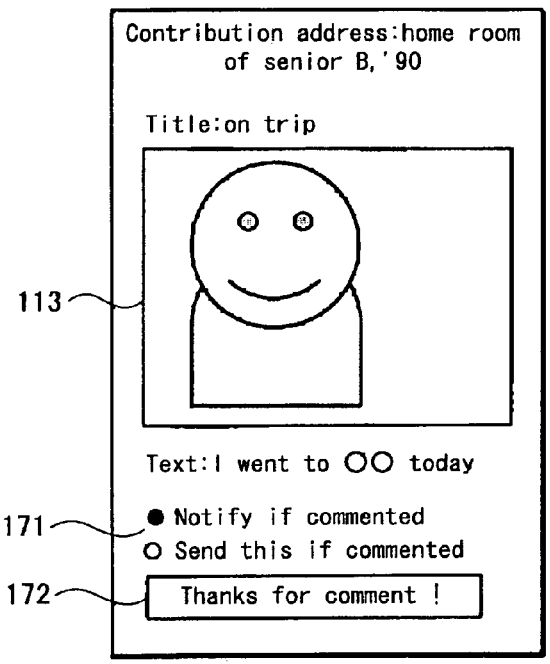
FIG. 42 is a view showing an example of action setting according to further another embodiment of the present invention.

FIG. 42 is an example of a user interface of setting the action. In this example, with respect to content contributed including a picture 113, an action definition 171 of whether or not notice is received when a comment is attached and a setting 172 of whether or not a designated message is sent to the user who gave the comment can be set.

Next, a method that calculates the content importance level based on the content recommendation level and user taste data is explained. The importance level indicating how important certain content is for a user can be calculated based on the taste data of a user and recommendation level of a content or content container.

The importance level can be calculated as follows, for example. First, the notice controller 410 (refer to FIG. 25) in the notice issue section 400 designates content whose importance level is wanted to know, and asks the importance level judgment of the importance level judgment section 510. The importance level judgment section 510 searches a taste point with respect to the designated content from user data. If it is found, the taste point is set as an initial value of an importance level. If it is not found, the taste point is set to 0.

Further, the importance level judgment section 510 inquires the recommendation level with respect to the designated content of the content management section 200. The recommendation level of the content is added to the importance level, if it is found. At last, the normalization is performed such that the importance level is placed within 0 to 5 in accordance with the necessity. The importance level obtained by the above calculation is sent to the notice controller 410 as a designated content importance level.

For example, in the case that content C1 is designated, the importance level judgment section 510 calculates the importance level as follows.

1. First, the taste point 5 is extracted from user taste data (FIG. 37B) and is set as an initial value.
2. If content C1 belongs to content container CS3, the taste point 1 of the content container CS3 is further added to the importance level.
3. If a user who prepares the content container CS3 is U2, the taste point 5 is further added to the importance level.
4. Content recommendation level 2 is obtained from the content controller and further is added to the importance level.

5. If the user himself/herself is U1, content recommendation level 2 of the content container CS3 is obtained from the content controller and further is added to the importance level.

6. In order to place the importance level within 0 to 5, 9 of the calculation result is divided by 5 of the number of kinds of point (content taste point, content container taste point, user taste point, contents recommendation level and content container recommendation level) and consequently 1.8 of the importance level is obtained.

Further, the notice controller 410 can ask the search of the high importance level content of the importance level judgment section 510, without designating content. In that case, first, the importance level judgment section 510 acquires content recommendation levels from the contents controller 200 with respect to all the contents registered in the user taste data. Each importance level is obtained by adding each content taste point thereto. Further, content and importance level are returned to the notice controller 410 by ascending order of importance level.

In another method, first, the importance level judgment section 510 inquires the high importance level content of the content controller 200. The content controller 200 returns some contents and the recommendation levels thereof by ascending order of recommendation level. With respect to each content retuned, the importance level judgment section 510 investigates whether or not the taste point is registered in the user taste data, and if it is found, the taste point is added to the content recommendation level to be the content importance level. Further the content and importance level are returned to the notice controller 410 by ascending order.

Further, here, an example of the calculation method in which importance level is the average value of user taste data and recommendation level of content is shown, however, other calculation methods than the above can be used freely. Further, a plurality of calculation methods may be prepared and a method can be switched among those methods depending on the necessity.

As described above, according to the configuration explained using FIGS. 25 to 42, a valuable notice message to user can be issued to an appropriate client. Further, only necessary notice can be received corresponding to a client or to a user condition. Further, a valuable notice message to a notice receiver can be detected, corresponding to the recommendation level of content's contributor and the interest level of a notice receiver with other relation added.

Next, further another embodiment of the present invention is explained. In this embodiment, when a user who saw a notified message from the content sharing system of the above described embodiment reads the content, an access user himself/herself can set the disclosure level of the access record to content of the user.

Figure 43:
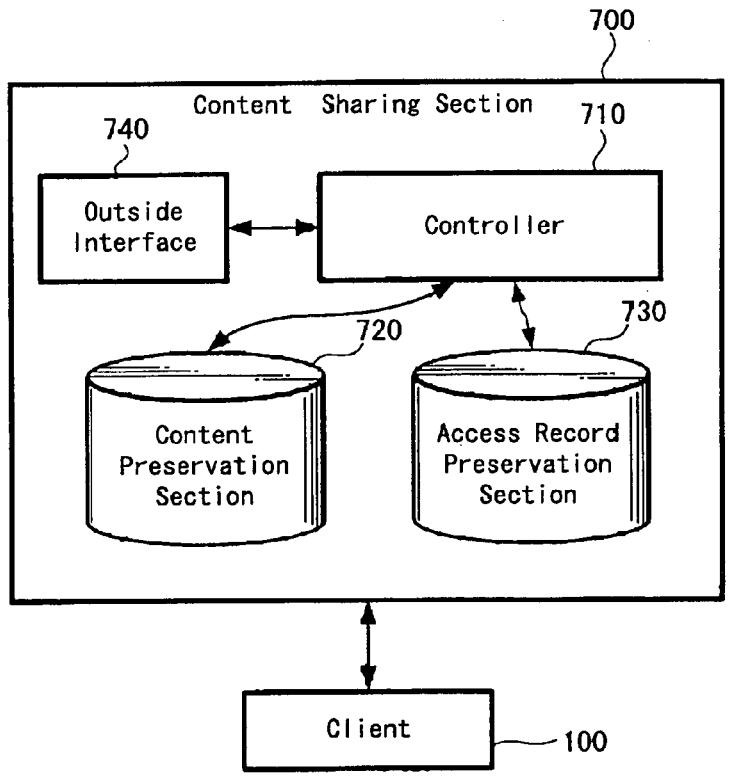
FIG. 43 is a diagram showing a system configuration according to further another embodiment of the present invention.

FIG. 43 is a diagram showing a system configuration of further another embodiment of the present invention. A system of this embodiment includes a content sharing section 700 and a client 100 and, for example, the content sharing section 700 is a web server that operates on a network and the client is a web browser.

The content sharing section 700 includes a controller 710, a content preservation section 720, an access record preservation section 730 and an outside interface 740.

The controller 710 performs operations such as registration, modification, deletion, acquisition, and so on with respect to content in the content preservation section and preserves those command records in the access record preservation section 730. The outside interface 740 receives commands from the outside such as registration request and acquisition request of content, and sends those to the controller 710, and also returns the results sent from the controller 710, to the outside. Further, content itself, the metadata thereof and access right data with respect to each content are preserved in the content preservation section 720. The controller 710 judges permission or non-permission using the access right of content.

A database structure of the access record preservation section 730 is explained referring to FIGS. 44 to 47.

FIG. 44 is a table showing access record data. It is a table of request command record from a client. For example, with respect to data ID=1: ID of user who accessed is "1001"; the request command thereof is "GET (1343)"; time of command received is "2003-12-01 10:31"; and host name of access source is "foo.example.com". Furthermore, ID of permission of this data itself is 1.

FIG. 45 is a permission table. To whom and which level of access is permitted, are preserved in this table. For example, the permission information of ID=1 permits access_level_0 to a user or group indicated with IDs 1001, 1003 and 1134, and permits access_level_1 to a user or group indicated with ID 2321, and permits access_level_2 for other users or other groups indicated with "*". Further, NULL shows that setting does not exist.

Here, access level is the permission information with respect to access record information. For example, as for access_level_0, who, when, and how accessed is understood by disclosing all the information such as a name, time and number of times of user who accessed and other contents (record) that was accessed. As for access_level_1, for example, the number of users accessed is judged by disclosing only user IDs, though user's name is unknown. Further, as for access_level_2, user ID is not disclosed and only the event that was accessed is disclosed simply, thereby, although the user who accessed may not be identified, at least whether or not one user accessed thereto can be recognized. Furthermore, as for access_level_3, all the information is not disclosed, so that accessing itself is unknown.

FIG. 46 is a table of user data, and preserves each user ID and attribute information on the user. The attribute information of this embodiment includes user's name, mail address and telephone number.

FIG. 47 is a table of user group data. The information on each user group is preserved in this table and, for example, a group of ID=2001 has the group name "ski", and the owner of the group is user ID=1001, users 1001, 1003 and 1025 are members. Here, an owner is a user who has authority that can modify group information such as a group name, members and so on.

With the above data structure, to whom and which level a certain access record is disclosed, can be set.

Next, an example of an actual interface between a client and server is shown. A client set a data structure of the above access record preservation section 730 using an appropriate network interface. For example, the permission information of access record can be included in an HTTP header (entity header). A specific example is shown in FIG. 48. As shown in an example of expanded HTTP header of FIG. 48, the access control information is transmitted to a header portion with the form of X-Access-Level-#. Further, in the case that the HTTP header is used, similarly, access control of the request can be set similarly, with respect to other methods such as GET and so on.

Next, as parameter of CGI (Common Gateway Interface), a method that sets the permission information of access record is explained. FIG. 49 shows an example of HTTP multipart post. As shown in FIG. 49, when file is uploaded using multipart/form-data, the permission information can be added to one of multipart/form-data.

Furthermore, as another example, an appropriate interface may be made to SOAP (Simple Access Protocol) or XML-RPC (eXtesible Markup Language-RPC) that is a general RPC (remote procedure call) frame (for example, example of expansion of BloggerAPI).

Figure 50:
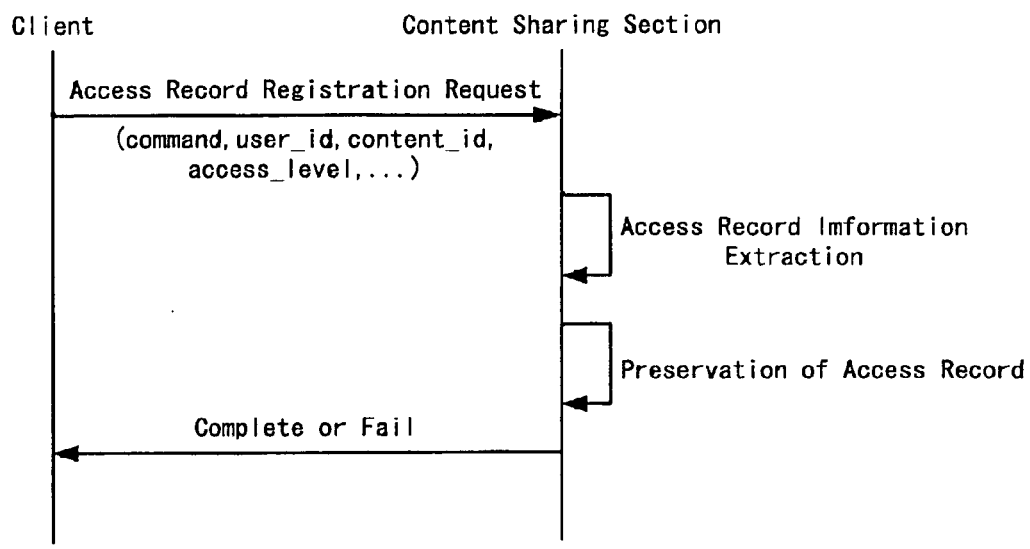
FIG. 50 is a diagram showing access record registration sequence of according to further another embodiment of the present invention.
Figure 51:
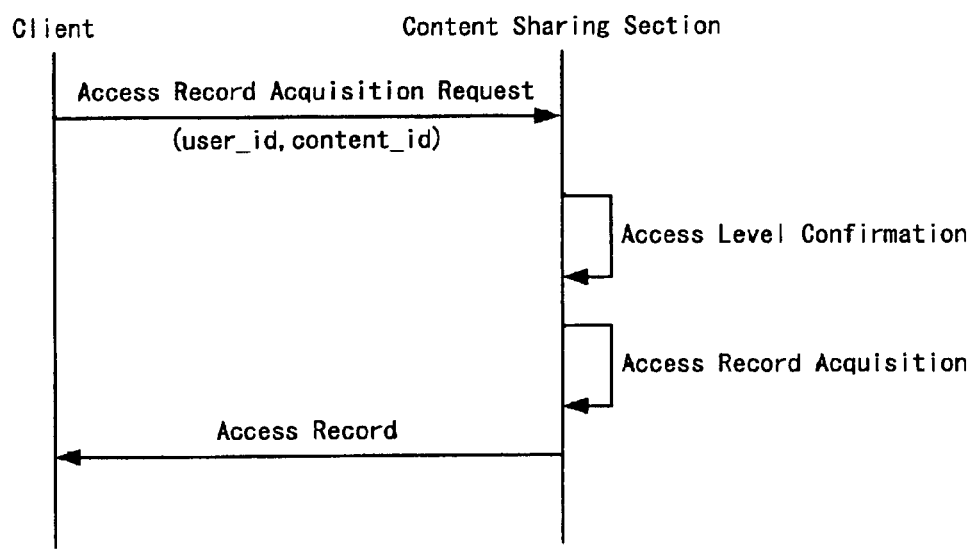
FIG. 51 is a diagram showing access record browsing sequence according to further another embodiment of the present invention.

Next, a flow of processing between the client 100 and the contents sharing section 700 of FIG. 43 is explained referring to FIGS. 50 and 51.

FIG. 50 is a sequence showing a flow of processing with respect to the access record registration. First, the client 100 asks the access record registration of the content sharing section 700. At this time, a command such as GET, PUT and so on, user ID (user_id) that specifies client, content ID (content_id) showing access to which content it is, access level that is permission information to access record information and so on that show access types are transmitted to the content sharing section 700. Actually, the content sharing section 700 is asked by such a form explained in FIGS. 48 and 49.

The contents sharing section 700 extracts the access record information from the access record registration request received. In other words, only information with respect to the access record is extracted from information shown in FIGS. 48 and 49. Next, the access record information extracted is preserved, and preservation completion or failure is sent to the client 100. At this time, preservation destination and reason for the preservation failure (for example, preservation rejection, absence of access record information, memory full of content sharing section 700 and so on) may be sent simultaneously. Alternatively, the result may not be returned to the client 100.

FIG. 51 is a sequence showing a flow of processing with respect to the access record reading. First, the client 100 notifies the content sharing section 700 of the access record acquisition request. At this time, user ID (user_id) and content ID (content_id) are sent simultaneously. Here, the access record acquisition request may be notified together with the content acquisition request of content information simultaneously.

The content sharing section 700 confirms whether or not a user of the user ID can acquire the access record information of content of the content ID, with respect to the received access record acquisition request. In other words, an access level preserved in the permission table is confirmed. If access is permitted, access record information corresponding to the access level is acquired and sent to the client 100. On the other hand, if access is not permitted, the fact of which is sent.

With the processing as described above, the access record can be registered and the access record set can be read.

Next, a user interface in the case that the client 100 sets an access record is explained referring to FIGS. 52 to 56.

Figure 52:
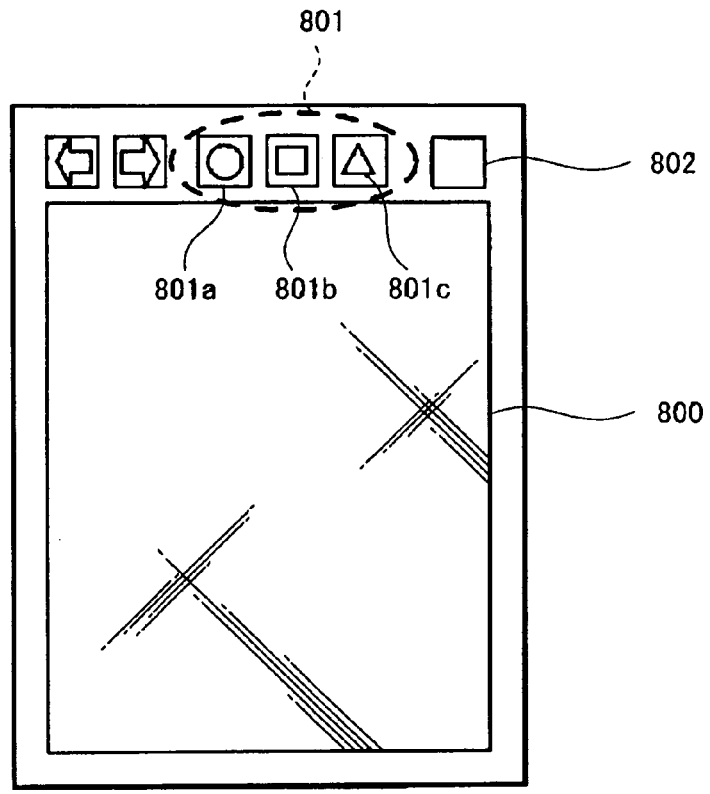
FIG. 52 is a view showing an example of a client user interface according to further another embodiment of the present invention.

FIG. 52 is an example in which permission information to access record (access level) is set simply by a specific button. As shown in the figure, permission information is classified into a plurality of categories and the results are assigned to buttons, so that permission information can be set easily. For example, a button 801a functions as a disclosure setting of disclosure level and, a button 801b functions as an anonymity setting with ID, and a button 801c functions as an anonymity setting. The operation of this access record permission setting buttons 801 and the access record registration request may be performed simultaneously. Namely, a registration request that includes access record information is sent to the content sharing section 700 simultaneously, when a button is pushed. Further, a reference numeral 802 denotes a button that sets the details of access record permission.

Figure 53:
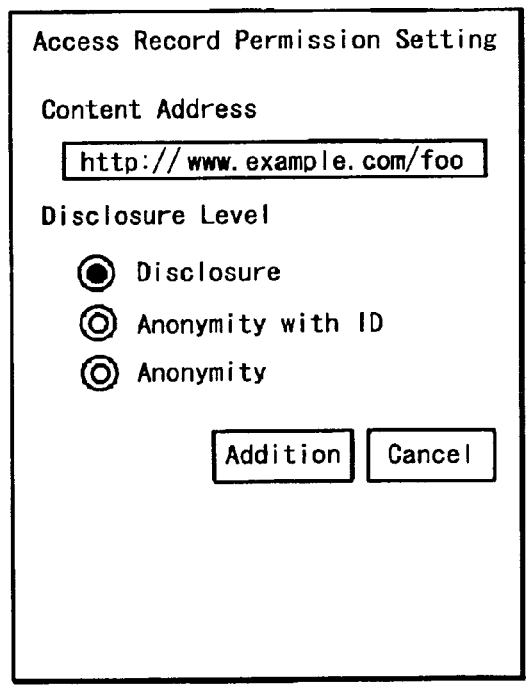
FIG. 53 is a view showing an access record permission setting according to further another embodiment of the present invention.

Further, an example of an interface in which access record permission setting is designated by access destination (content) is shown in FIG. 53. In FIG. 53, a content address input column is provided and access record can be set to each content. Here, content may be a HTML file in WWW and may be a part of HTML file such as text or image in the HTML file. Further, it may be a part designated with an area or position in the HTML file. Alternatively, in the case that data stored is an image or text, it may be a part of the text and image designated with area or position. Alternatively, it may be the one in which images and text are summarized, such as album.

Figure 54:
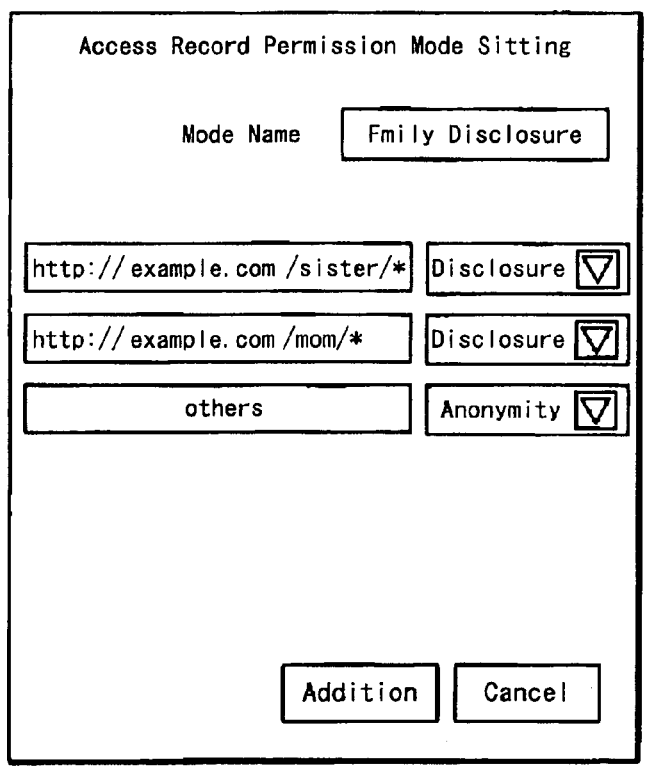
FIG. 54 is a view showing an access record permission mode setting according to further another embodiment of the present invention.
Figure 55:
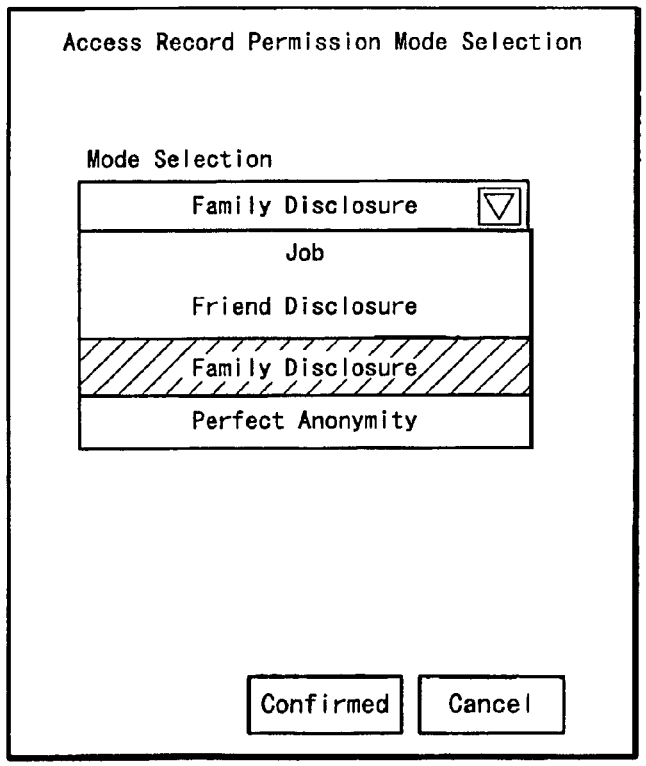
FIG. 55 is a view showing an access record permission mode selection according to further another embodiment of the present invention.

As described above, permission of access record can be set to each content. However, it is bothersome to set permission of access record with respect to each content that a user desires to preserve access record, such as; to which users the record is disclosed or to which users the record is not disclosed. Therefore, a mode (template) is prepared to set permission setting all together. FIG. 54 shows an example of preparation of mode. FIG. 55 shows an example in which access record permission is set by selecting a mode.

FIG. 54 is a user interface for access record permission mode setting. For example, a field to input URL and a disclosure level of content is added by pushing a button of "add". For example, access record to the content that sister and mom have is set to "disclosure" and access record to others is set to "anonymity". Further, it is possible to register those settings as a mode (mode name "family disclosure"). In other words, it is possible to eliminate an inconvenience that access record permission is set one by one to every content, by using a registered mode.

FIG. 55 is a user interface of access record permission mode selection. Since the access record permission mode setting prepared in FIG. 54 is displayed as a selection list, a desirable mode is selected and a confirmation button is pushed. In this example, since a family disclosure mode was selected, by pushing the confirmation button, an access record permission setting of family disclosure mode set in FIG. 54 for example is obtained.

In this way, it is possible to set the access record permission by registering permission information that is different to each user, as a mode.

Figure 56:
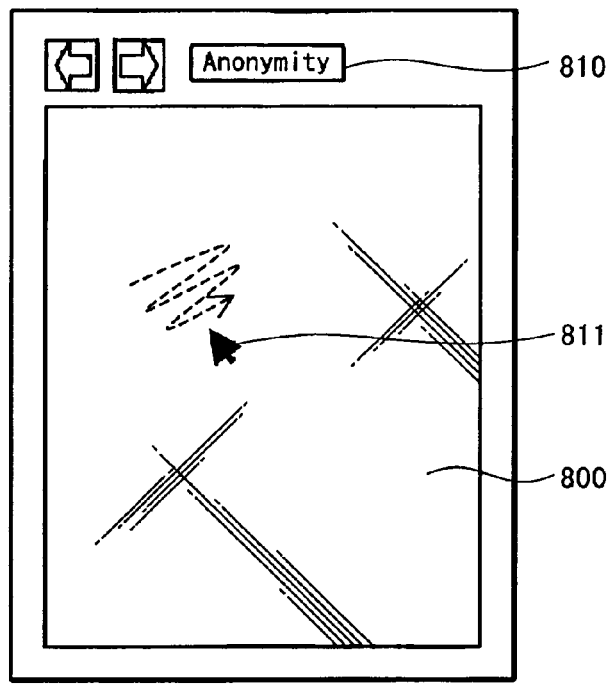
FIG. 56 is a view showing an access record permission setting (mouse gesture) according to further another embodiment of the present invention.

Further, a certain specific operation may be corresponded to an access record permission setting. FIG. 56 is an example showing an access record permission setting (mouse gesture) and, a reference numeral 800 denotes a content display section, and a reference numeral 810 denotes an access record permission display section that displays an access record permission setting, and a reference numeral 811 denotes a mouse pointer.

Further, in FIG. 56, the gesture of mouse corresponds to an access record permission setting. In other words, if some action (for example, moves toward right to left and to right) is performed by a mouse, an access record permission setting corresponding to that move is performed. Furthermore, a click of the mouse may correspond to an access record permission setting. For example, it is possible to make a click, double clicks, left click to right click to left click, simultaneous click and so on correspond. These may be set using a mode explained in FIGS. 54 and 55 or an access record permission setting set last time may be applied to.

Figure 57:
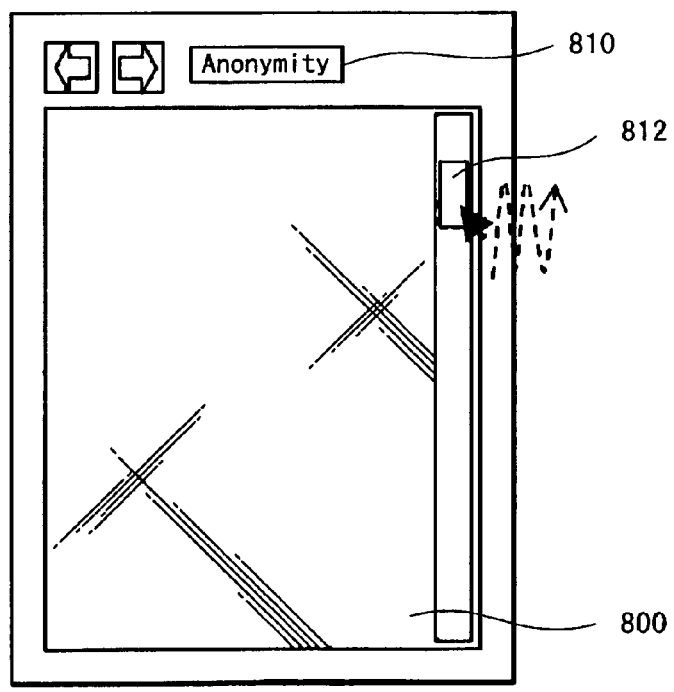
FIG. 57 is a view showing an access record permission setting (scroll gesture) according to further another embodiment of the present invention.

Similarly, a scroll of screen may correspond to an access record permission setting. FIG. 57 shows an example of access record permission setting (scroll gesture) and, a reference numeral 812 that was shown in FIG. 57 denotes a scroll key. For example, if a scroll key 812 moves upward to downward and to upward, an access record permission setting corresponding thereto is executed.

Further, access record permission setting may correspond to a physical button such as a keyboard and a key button of a mobile phone unit and so on.

Figure 58A:
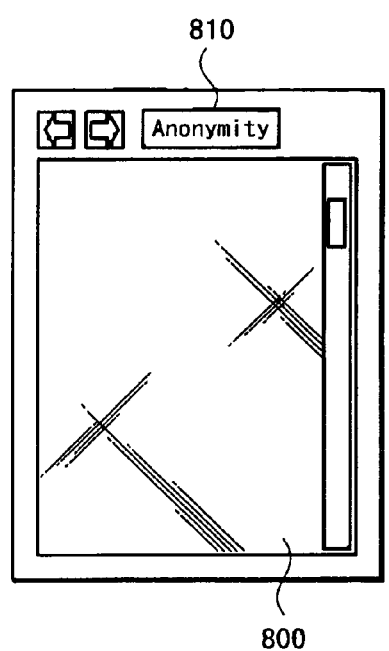
FIGS. 58A to 58C are views showing an access record permission setting (hardware) according to further another embodiment of the present invention.
Figure 58B:
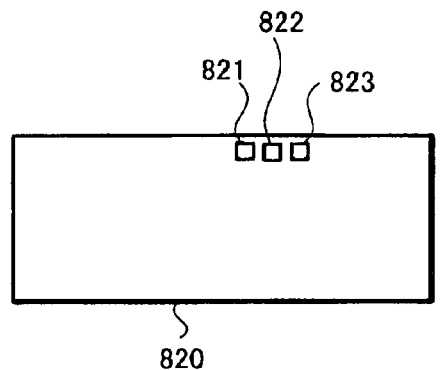
Figure 58C:
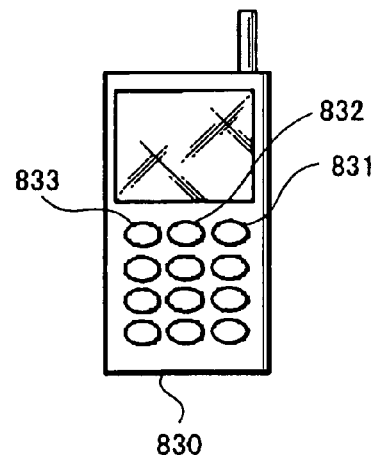

FIGS. 58A to 58C are an example of access record permission setting (hardware), in which FIG. 58A shows a usual content display section, FIG. 58B shows a keyboard, and FIG. 58C shows a mobile phone unit. In FIG. 58B, a button for anonymity setting 821, a button for anonymity setting with ID 822 and a button for disclosure setting 823 are provided on a keyboard 823, as buttons for access record permission setting. Further, in a mobile phone unit 830 shown in FIG. 58C, predetermined buttons of operation buttons on a main screen correspond to a button for anonymity setting 831, a button for anonymity setting with ID 832 and a button for disclosure setting 833 in access record permission setting buttons, respectively.

Next, a user interface is explained referring to FIGS. 59 to 67, in the case that a client reads access record. These can be applied not only to the case of reading the access record already set, but also to the case of confirming the access record that the user sets up (or set up).

Figure 59:
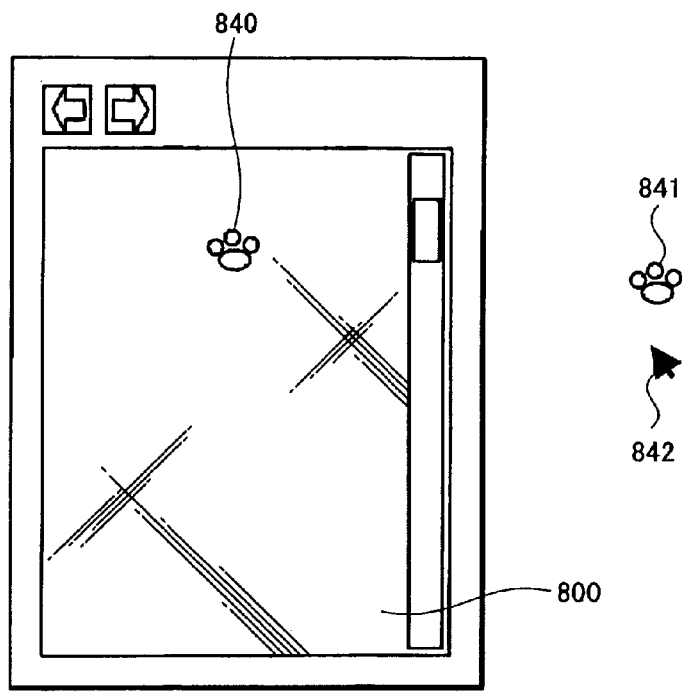
FIG. 59 is a view showing an access record display (cursor) according to further another embodiment of the present invention.

FIG. 59 shows an example in which a shape of a cursor 840 changes to a record disclosure mode 841 and to an anonymity mode 842 corresponding to the access record. Not only the shape of cursor is changed corresponding to the access record but also color and size may be changed. Further, additional information such as; who and when accessed may be arranged around the cursor. Further, in an example of FIG. 59, although a cursor is changed corresponding to the access record permission information, the cursor may be changed for each user (for example, a footprint of dog is assigned as the access record of a person A, a footprint of bird is assigned as the access record of a person B, and so on.)

Figure 60:
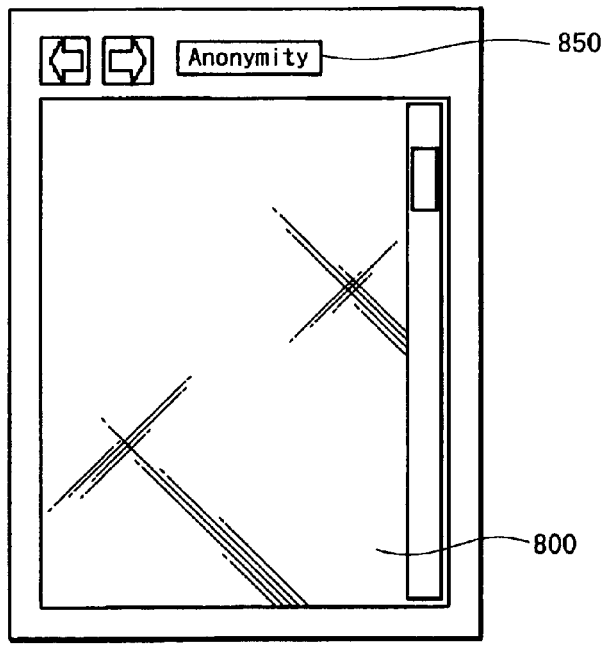
FIG. 60 is a view showing an access record display (except for content display section-1) according to further another embodiment of the present invention.
Figure 61:
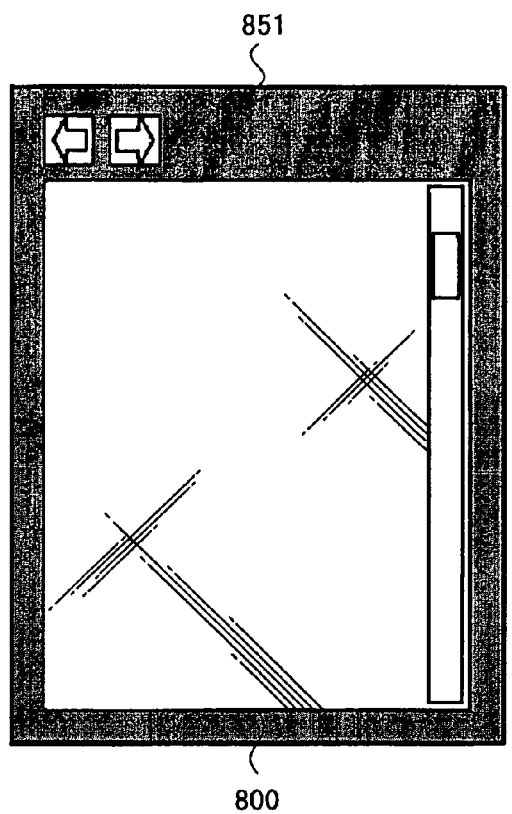
FIG. 61 is a view showing an access record display (except for content display section-2) according to further another embodiment of the present invention.

FIGS. 60 and 61 show an example in which the access record is displayed on a place other than a content display section 800, respectively. In FIG. 60, an access record display section 850 is provided in the frame of the content display section 800, and the disclosure level, that is, anonymity in this example is displayed. Further, in FIG. 61 the whole frame is made into an access record display section 851, and the access record can be confirmed by the color of the frame. As described above, the access record can be read without impairing the design and display convenience of content by displaying the access record at a different place from that of the content or by changing appearance other than the content.

Figure 62:
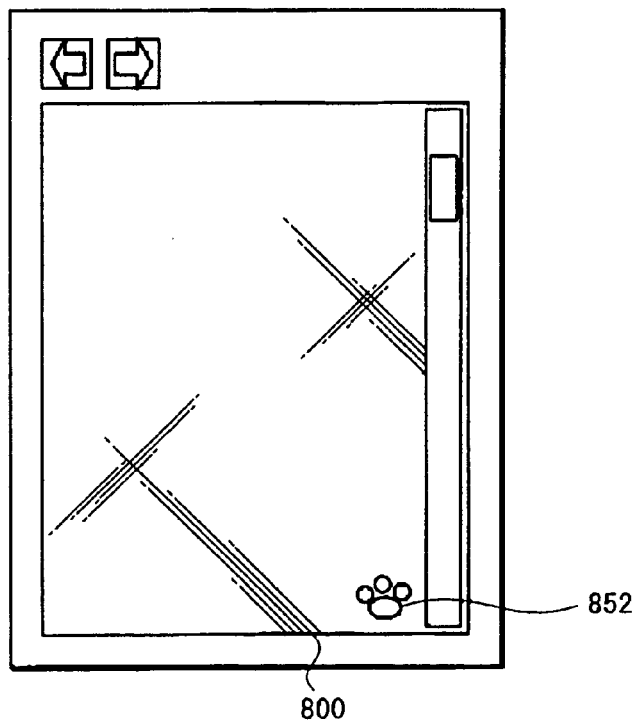
FIG. 62 is a view showing an access record display (imposed on content display section) according to further another embodiment of the present invention.

On the other hand, FIG. 62 shows an example in which the access record is displayed overlapping with the content display section 800. It has an advantage that a part of content which is accessed can be read by overlapping an access record display mark 852 with the content display section 800.

Further, as shown in FIGS. 63 to 65, the access record may be displayed with changing the content itself such as a font of letter, modification, background, image and so on, of content. The whole or a part of the content may be changed.

FIGS. 63A and 63B show an example of the access record display according to the change of letters of content, and FIG. 63A shows an anonymity mode and FIG. 63B shows a record disclosure mode. The font of letters displayed on the content display section 800 is changed.

Figure 64B:
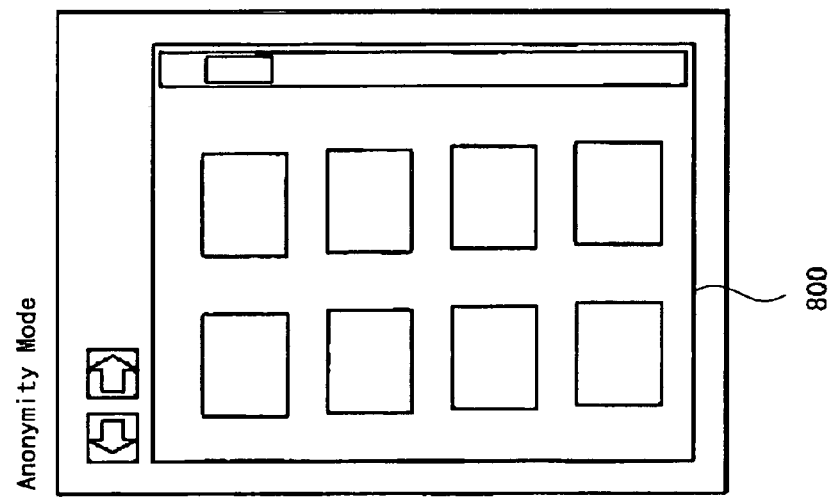
FIGS. 64A and 64B are views showing access record displays (background of content) according to further another embodiment of the present invention.
Figure 64A:
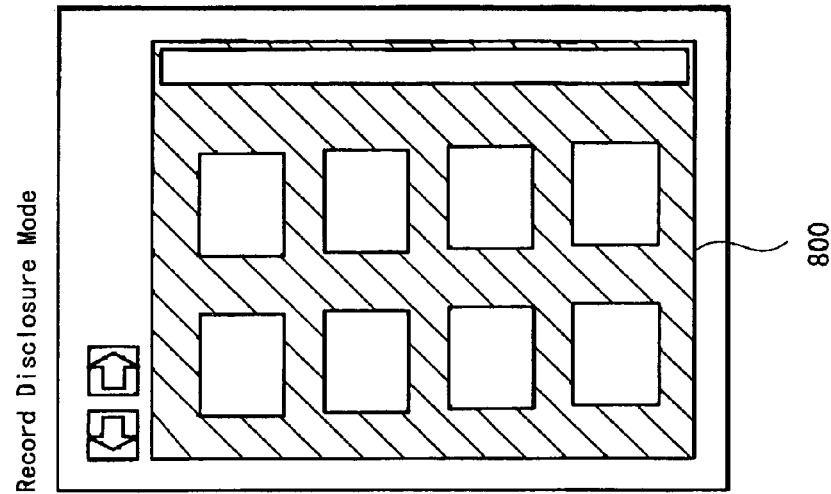

FIGS. 64A and 64B show an example of the access record display according to the change of background of content, and FIG. 64A shows an anonymity mode and FIG. 64B shows a record disclosure mode. The background of content is changed as shown with slash marks in FIG. 64B.

FIGS. 65A and 65B show an example of the access record display according to the change of content itself, and FIG. 64A shows an anonymity mode and FIG. 64B shows a record disclosure mode. As shown with slash marks in FIG. 65A, the color of content of a picture 853 is changed, in this example.

Further, FIGS. 66A and 66B show an example in which the access record for a link within content is displayed instead of the content itself that is being read. FIG. 66A is an example in which the record of link address is disclosed, and if a cursor 841a is moved to a link section 860 of a link address that is disclosed, the cursor becomes a footprint of cat. Further, FIG. 66B is an example in which the record of a link address is not disclosed, and if a cursor 842a is moved to a link section 861 of a link address that is not disclosed, the cursor becomes an arrow display. As described above, content that a plurality of user read can be easily found by recognizing the access record of link address in advance.

Further, the display of access record may be changed by a lapse of time. For example, as time lapses from the time when accessed, the display size may become small and an unnecessary access record may not be displayed such that an access record display mark 852a shown in FIG. 67A becomes an access record display mark 852b shown in FIG. 67B. Alternatively, transparency of a display icon may be changed. Furthermore, the information itself stored in the access record preservation section may be erased depending as time lapses.

The display methods explained above can be set by a user who decides a display method used when a client performs reading. Alternatively, the display method may be set for each user who accessed. For example, an access record of the user himself/herself is displayed by modifying the mouse shape and the access record that a friend and family have left is displayed on the content and the access record that others left is displayed outside the content.

Alternatively, in reverse, the client who leaves the access record may establish how the record of himself/herself is displayed. For example, such setting in which a photograph of the face is left on the content as the access record can be conceivable.

According to the embodiment explained using FIGS. 43 to 67, the access record to the contents can be notified to the owner of the content and other readers. Furthermore, a real name is disclosed or anonymity is maintained, by setting the disclosure level of an access record, and the density of communication can be modified.

Note that, in the importance level judgment function in the system of FIGS. 25 and 36 described above, the importance level judgment function shown in FIG. 9 may be applied to or may be used together.

It should be understood by those skilled in the art that various modifications, combinations, sub-combinations and alterations may occur depending on design requirements and other factors insofar as they are within the scope of the appended claims or the equivalents thereof.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A content sharing system in which content including multimedia data on a server is shared with a first client of a first user and a second client of a second user, the content sharing system comprising:
   a processor; and
   a memory device storing instructions which when executed by the processor, cause the processor to:

(a) extract user taste from user performance of at least one of: (i) the content; (ii) user profile information; and (iii) user group information;
(b) acquire first position information of the first client;
(c) calculate an importance level of said content for each user with respect to at least one other user by using:
a similarity level between the first user and the second user, said similarity level being calculated by:
(A) acquiring first attribute information of the first user, wherein the first attribute information belongs to a first type;
(B) acquiring second attribute information of the second user, wherein the second attribute information belongs to a second type;
(C) determining whether the first type is the same as the second type;
(D) if the first type is the same as the second type, determining whether:
(x) the first attribute information includes a first subordinate data; and
(y) the second attribute information includes a second subordinate data;
(E) if the first attribute information includes the first subordinate data and the second attribute information includes the second subordinate data, calculating a similarity level of the first subordinate data and the second subordinate data;
(F) determining whether the first subordinate data is the same as the second subordinate data; and
(G) if the first subordinate data is the same as the second subordinate data, for additional subordinate data, repeating steps (D) to (F);
(ii) existing data;
(iii) metadata of the content, said metadata being set by the first user, said content being stored in the server by the first user, wherein the metadata set by the first user is indicative of said first user's desire for said second user to view said content stored by the first user, said metadata having second position information; and
(iv) a user environment including a distance determined by using the acquired first position information of the first client and the second position information of the metadata of the content; and
(d) preserve a notice rule;
(e) judge a client condition;
(f) change a notice rule setting based on said client condition or an instruction from said client; and
(g) issue a notice message to an appropriate address based on:
(i) said calculated content importance level; and
(ii) said notice rule.

2. The content sharing system of claim 1, wherein said metadata set by the first user is manually set when the first user registers the content.

3. The content sharing system of claim 2, wherein:
(a) the instructions, when executed by the processor, cause the processor to extract a specific string; and
(b) the existing data includes keywords extracted from said content.

4. The content sharing system of claim 1, wherein:
(a) the instructions, when executed by the processor, cause the processor to manage user communication record information of a user that includes a content contribution record and a content browsing record; and
(b) the existing data includes said content contribution record.

5. The content sharing system of claim 1, wherein the position information of said first client is acquired using GPS.

6. The content sharing system of claim 1, wherein the user environment includes information of an outside application that a user simultaneously uses.

7. The content sharing system of claim 1, wherein the instructions, when executed by the processor, cause the processor to:
(a) preserve information about user taste;
(b) set preserved user taste data; and
(c) judge content importance level based on information on said content and said user taste data.

8. The content sharing system of claim 7, wherein the instructions, when executed by the processor, cause the processor to automatically modify user taste data based on feedback of said client to the notice.

9. The content sharing system of claim 7, wherein the instructions, when executed by the processor, cause the processor to:
(a) extract operation information in the past from said user communication record data; and
(b) automatically modify said user taste data based on said extracted operation information.

10. The content sharing system of claim 7, wherein the instructions, when executed by the processor, cause the processor to automatically modify said user taste data based on a client condition.

11. The content sharing system of claim 7, wherein the instructions, when executed by the processor, cause the processor to modify said user taste data by detecting that importance level threshold setting means displayed on a user interface of said content sharing system is operated or that importance level threshold setting means installed in a terminal computer in which said client is installed is operated.

12. The content sharing system of claim 7, wherein the instructions, when executed by the processor, cause the processor to calculate a content importance level based on a recommendation level of said content that is set by a content producer and said user taste data.

13. The content sharing system of claim 1, wherein the instructions, when executed by the processor, cause the processor to issue a notice message to said client or said outside application based on said calculated content importance level and said notice rule.

14. The content sharing system of claim 13, wherein the instructions, when executed by the processor, cause the processor to automatically determine, or dynamically by manual operation of a user a notice destination of said notice message based on active level information that is an index indicating whether or not notice in said notice rule is issued.

15. The content sharing system of claim 13, wherein a notice method in said first client is modified in accordance with said content importance level.

16. The content sharing system of claim 1, wherein the instructions, when executed by the processor, cause the processor to:
(a) preserve content data and access right data with respect to each content;
(b) preserve:
(i) an access record table in which a record of a request command from said client is recorded;
(ii) a permission table in which permission information including a user as disclosure object and a disclosure level is recorded;
(iii) a user data table; and
(iv) a user group data table; and (c) perform predetermined processing with respect to content (d) preserve a record of the command, wherein said client sets permission information on a content access record.

17. A content importance level judging method in which content including multimedia data on a server is shared with a first client of a first user and a second client of a second user, the method comprising:
- extracting user taste from user performance of at least one of: (a) the content; (b) user profile information; and (c) user group information;
- acquiring first position information of the first client;
- calculating an importance level of said content for each user with respect to at least one other user by using:
  - (a) a similarity level between the first user and the second user, said similarity level being calculated by:
    - (i) acquiring first attribute information of the first user, wherein the first attribute information belongs to a first type;
    - (ii) acquiring second attribute information of the second user, wherein the second attribute information belongs to a second type;
    - (iii) determining whether the first type is the same as the second type;
    - (iv) if the first type is the same as the second type, determining whether:
      - (A) the first attribute information includes a first subordinate data; and
      - (B) the second attribute information includes a second subordinate data;
    - (v) if the first attribute information includes the first subordinate data and the second attribute information includes the second subordinate data, calculating a similarity level of the first subordinate data and the second subordinate data;
    - (vi) determining whether the first subordinate data is the same as the second subordinate data; and
    - (vii) if the first subordinate data is the same as the second subordinate data, for additional subordinate data, repeating steps (iv) to (vi);
  - (b) existing data;
  - (c) metadata of the content, said metadata being set by the first user, said content being stored in the server by the first user, wherein the metadata set by the first user is indicative of said first user's desire for said second user to view said content stored by the first user, said metadata having second position information; and
  - (d) a user environment including a distance determined by using the acquired first position information of the first client and the second position information of the metadata of the content;
- judging a condition of said client;
- modifying a notice rule setting in accordance with said client condition or an instruction from said client; and
- issuing a notice message to an appropriate address based on:
  - (a) said calculated content importance level; and
  - (b) said notice rule.

18. The content importance level judging method of claim 17, which includes issuing a notice message to said client or said outside application based on said content importance level calculated and said notice rule.

19. The content importance level judging method of claim 17, which includes:
- preserving an access right data with respect to each content data and content;
- preserving an access record table in which record of a request command from said client is recorded, a permission table in which permission information including a user as disclosure subject and a disclosure level is recorded, a user data table, and a user group data table;
- performing predetermined processing with respect to said content and preserving a record of the command in an access record preservation section; and
- setting permission information on a content access record by said client.

20. The content sharing system of claim 1, wherein the instructions, when executed by the processor, cause the processor to calculate a content importance level by comparing the similarity of content from at least two users.

21. The content sharing system of claim 1, wherein the instructions, when executed by the processor, cause the processor to calculate a content importance level based on a user communication record.

22. The content sharing system of claim 1, wherein the instructions, when executed by the processor, cause the processor to calculate a content importance level by comparing the similarity of profile information from at least two users.

23. The content importance level judging method of claim 17, which includes calculating the importance level by comparing the similarity of content from at least two users.

24. The content importance level judging method of claim 17, which includes calculating the importance level by comparing the similarity of profile information from at least two users.

25. The content sharing system of claim 1, wherein the acquired first position information of the first client is manually input after a user searches for said first position information of the first client.

26. The content importance level judging method of claim 17, wherein the acquired first position information of the first client is manually input after a user searches for the said first position information of the first client.

27. The content importance level judging method of claim 17, wherein said metadata set by the first user is manually set when the first user registers the content.

28. The content sharing system of claim 1, wherein the instructions, when executed by the processor, cause the processor to automatically add said metadata set by the first user.

29. The content importance level judging method of claim 17, wherein said metadata set by the first user is automatically added.

30. The content sharing system of claim 1, wherein the calculated similarity level of the first subordinate data and the second subordinate data indicates a geographical distance.

* * * * *